US012749240B2

(12) United States Patent
Jonker et al.

(10) Patent No.: US 12,749,240 B2
(45) Date of Patent: Sep. 29, 2026

(54) AUTHORING CONTEXT AWARE POLICIES WITH INTELLIGENT SUGGESTIONS

(71) Applicant: Meta Platforms Technologies, LLC, Menlo Park, CA (US)

(72) Inventors: Tanya Renee Jonker, Seattle, WA (US); Ting Zhang, Santa Clara, CA (US); Frances Cin-Yee Lai, York (CA); Anna Camilla Martinez, Seattle, WA (US); Ruta Parimal Desai, Mountlake Terrace, WA (US); Yan Xu, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 380 days.

(21) Appl. No.: 18/458,576

(22) Filed: Aug. 30, 2023

(65) Prior Publication Data

US 2024/0069700 A1 Feb. 29, 2024

Related U.S. Application Data

(60) Provisional application No. 63/373,910, filed on Aug. 30, 2022.

(51) Int. Cl.

| | |
|---|---|
| ***G06F 3/0484*** | (2022.01) |
| ***G06F 3/0482*** | (2013.01) |
| ***G06N 20/00*** | (2019.01) |
| ***G06T 11/60*** | (2006.01) |
| ***G06V 20/20*** | (2022.01) |

(52) U.S. Cl.

CPC .......... *G06F 3/0484* (2013.01); *G06F 3/0482* (2013.01); *G06N 20/00* (2019.01); *G06T 11/60* (2013.01); *G06V 20/20* (2022.01); *G06T 2200/24* (2013.01)

(58) Field of Classification Search

CPC ...... G06F 3/0484; G06F 3/0482; G06F 3/011; G06F 3/012; G06F 3/013; G06N 20/00; G06N 5/01; G06T 11/60; G06T 2200/24; G06V 20/20

See application file for complete search history.

(56) References Cited

U.S. PATENT DOCUMENTS

| | | | | |
|---|---|---|---|---|
| 10,949,760 | B1 * | 3/2021 | Kritzinger | G06F 16/9035 |
| 2014/0282270 | A1 * | 9/2014 | Slonneger | G06F 3/017<br>715/863 |
| 2015/0381670 | A1 * | 12/2015 | Jain | G06F 16/437<br>715/753 |
| 2019/0236967 | A1 * | 8/2019 | Dohring | G09B 19/00 |
| 2019/0384488 | A1 * | 12/2019 | Kapinos | G06F 3/016 |
| 2021/0248490 | A1 * | 8/2021 | Ma | G06F 3/0487 |
| 2021/0405736 | A1 * | 12/2021 | Zavesky | H04L 67/75 |
| 2022/0264028 | A1 * | 8/2022 | Manzari | H04N 23/635 |
| 2023/0393833 | A1 * | 12/2023 | Cain, Jr. | H04L 9/3247 |

* cited by examiner

*Primary Examiner* — Stephen S Hong

(74) *Attorney, Agent, or Firm* — Morgan, Lewis & Bockius LLP

(57) ABSTRACT

Features described herein generally relate to generating and modifying policies with an artificial intelligence (AI) platform based on user activities. Particularly, data comprising characteristics of activities performed by a user in real-world and virtual environments is collected, a control structure is predicted based on the data and model parameters learned from historical policies, and a new policy is generated or a pre-existing policy is modified based on the control structure.

13 Claims, 24 Drawing Sheets

Context-aware policy (CAP)

Detection:
- Vision (objects, gesture, ...)
- Sound
- Location (SLAM, GPS)
- IoT Sensor (temperature, humidity, ...)

Affordance:
- Smart home devices (TV, music, lights,...)
- AR applications (calendar, health tracker,...)
- Web services (posts, messages,...)

- If I am working in the office, play soft music.
- Otherwise if I am in the kitchen in the morning, play pop music while I am eating meal.
    - Otherwise if I am not eating and I am using the coffee machine, play jazz music

535

530

| Priority | Time | Location | Activity | Object | Action |
|---|---|---|---|---|---|
| 1 | - | Office | Working | - | Soft music |
| 2 | Morning | Kitchen | Eating | - | Pop music |
| 3 | Morning | Kitchen | - | Coffee machine | Jazz music |

FIG. 5G

AUTHORING CONTEXT AWARE POLICIES WITH INTELLIGENT SUGGESTIONS

CROSS-REFERENCE TO RELATED APPLICATIONS

The present application is a non-provisional application of and claims the benefit of and priority to under 35 U.S.C. § 119(e) of U.S. Provisional Application No. 63/373,910 having a filing date of Aug. 30, 2022, the entire contents of which is incorporated herein by reference for all purposes.

FIELD

The present disclosure relates generally to defining and modifying behavior in an extended reality environment, and more particularly, to techniques for defining and modifying behavior in an extended reality environment based on intelligent suggestions.

BACKGROUND

A virtual assistant is an artificial intelligence (AI) enabled software agent that can perform tasks or services including: answer questions, provide information, play media, and provide an intuitive interface for connected devices (e.g., smart home devices) for an individual based on voice or text utterances (e.g., commands or questions). Conventional virtual assistants process the words a user speaks or types and converts them into digital data that the software can analyze. The software uses a speech and/or text recognition-algorithm to find the most likely answer, solution to a problem, information, or command for a given task. As the number of utterances increase, the software learns over time what users want when they supply various utterances. This helps improve the reliability and speed of responses and services. In addition to their self-learning ability, their customizable features and scalability have led virtual assistants to gain popularity across various domain spaces including website chat, computing devices (e.g., smart phones and vehicles), and standalone passive listening devices (e.g., smart speakers).

Even though virtual assistants have proven to be a powerful tool, these domain spaces have also proven to be an inappropriate venue for such a tool. The virtual assistant will continue to be an integral part in these domain spaces but will always likely be viewed as a complementary feature or limited use case, but not a crucial must have feature. Recently, developers have been looking for a better suited domain space for deploying virtual assistants. That domain space is extended reality. Extended reality is a form of reality that has been adjusted in some manner before presentation to a user and generally includes virtual reality (VR), augmented reality (AR), mixed reality (MR), hybrid reality, some combination thereof, and/or derivatives thereof.

Extended reality content may include generated virtual content or generated virtual content that is combined with physical content (e.g., physical or real-world objects). The extended reality content may include digital images, animations, video, audio, haptic feedback, and/or some combination thereof, and any of which may be presented in a single channel or in multiple channels (e.g., stereo video that produces a three-dimensional effect to the viewer). Extended reality may be associated with applications, products, accessories, services, and the like that can be used to create extended reality content and/or used in (e.g., perform activities in) an extended reality. An extended reality system that provides such content may be implemented on various platforms, including a head-mounted display (HMD) connected to a host computer system, a standalone HMD, a mobile device or computing system, and/or any other hardware platform capable of providing extended reality content to one or more viewers.

However, extended reality headsets and devices are limited in the way users interact with applications. Some provide hand controllers, but controllers betray the point of freeing the user's hands and limit the use of extended reality headsets. Others have developed sophisticated hand gestures for interacting with the components of extended reality applications. Hand gestures are a good medium, but they have their limits. For example, given the limited field of view that extended reality headsets have, hand gestures require users to keep their arms extended so that they enter the active area of the headset's sensors. This can cause fatigue and again limit the use of the headset. This is why virtual assistants have become important as a new interface for extended reality devices such as headsets. Virtual assistants can easily blend in with all the other features that the extended reality devices provide to their users. Virtual assistants can help users accomplish tasks with their extended reality devices that previously required controller input or hand gestures on or in view of the extended reality devices. Users can use virtual assistants to open and close applications, activate features, or interact with virtual objects. When combined with other technologies such as eye tracking, virtual assistants can become even more useful. For instance, users can query for information about the object they are staring at, or ask the virtual assistant to revolve, move, or manipulate a virtual object without using gestures.

SUMMARY

Embodiments described herein pertain to techniques for defining and modifying behavior in an extended reality environment based on intelligent suggestions.

In various embodiments, an extended reality system is provided that includes a head-mounted device that has a display for displaying content to a user and one or more cameras for capturing images of a visual field of the user wearing the head-mounted device; one or more processors; and one or more memories that are accessible to the one or more processors and that store instructions that are executable by the one or more processors and, when executed by the one or more processors, cause the one or more processors to generate and modify policies with an AI platform based on user activities.

In some embodiments, the AI platform generates and modifies policies based on user activities by collecting, at least using one or more cameras, data including characteristics of activities performed by a user in a real-world environment, a virtual environment, or a combination thereof; predicting a control structure based on the data and model parameters learned from historical policies, wherein the control structure includes one or more actions and one or more conditions for executing the one or more actions, and wherein the one or more actions and one or more conditions are determined from the characteristics of the activities; and generating a new policy or modifying a pre-existing policy based on the control structure, wherein the new policy or the modified pre-existing policy includes one or more conditional statements for executing the one or more actions based on evaluation of the one or more conditions.

In some embodiments, at least part of the new policy or the modified pre-existing policy can be executed in response to determining that at least one condition of the one or more conditional statements has been satisfied. In some implementations, the determination is made after receiving user approval of the new policy or the modified pre-existing policy. In some implementations, user approval may be obtained by displaying a user interface that includes the new policy or the modified pre-existing policy and a request for approval of the new policy or the modified pre-existing policy from the user.

In some embodiments, prior to the collecting the data, a user permission status may be acquired that represents whether or not the user has consented to collecting the data and data may be collected only in response to determining that the user has consented to collecting the data. In some implementations, prior to the collecting the data, a user may request for their activities to be observed and learned from while performing those activities in the real-world environment, the virtual environment, or the combination thereof. In some implementations, the request can be a natural language request, a gesture, a selection from a menu on a user interface, or any combination thereof.

In some embodiments, the user may request to enter a test mode to test the new policy and/or the modified pre-existing policy and the test mode may be initiated in response the user's request. In some implementations, at least part of the new policy or the modified pre-existing policy is executed in the test mode. In some implementations, the test mode includes collecting, at least using the one or more cameras, additional data includes characteristics of activities performed by the user in the real-world environment, the virtual environment, or the combination thereof; predicting a revised control structure based on the additional data and model parameters learned from historical policies, wherein the revised control structure includes one or more actions and one or more conditions for executing the one or more actions, and wherein the one or more actions and one or more conditions are determined from the characteristics of the activities; and generating a revised policy based on the revised control structure, wherein the revised policy includes one or more conditional statements for executing the one or more actions based on evaluation of the one or more conditions. In some implementations, model parameters can be fine-tuned based on the revised policy.

In various embodiments, an extended reality system is provided that includes a head-mounted device comprising a display that displays content to a user and one or more cameras that capture images of a visual field of the user wearing the head-mounted device; a processing system; at least one memory storing instructions that, when executed by the processing system, cause the extended reality system to perform operations comprising: in response to the user launching an authoring session to generate a context aware policy, accessing data collected from user interactions in extended reality; inputting the data into a machine learning model trained to provide context aware policy suggestions, wherein each context aware policy defines an action to be triggered upon satisfaction of one or more context conditions within the extended reality; predicting, by the machine learning model, most likely action classes for context within the data; calculating, by the machine learning model, correlation coefficients between each portion of the context and each target action of the most likely action classes; generating one or more suggested policies for the context aware policy, wherein the generating, for each suggest policy, comprises combining one or more portions of the context with a target action based on the correlation coefficients; and rendering the one or more suggested policies in a user interface during the authoring session as a suggestion for the context aware policy.

In some embodiments, the context aware policy defines an action to be triggered upon satisfaction of one or more conditions within the extended reality environment.

In some embodiments, the operations further comprise modifying, via the user interface, the one or more conditions or the action defined by the context aware policy with a modified version of the one or more conditions or the action defined by the one or more suggested policies to generate an updated context aware policy.

In some embodiments, the operations further comprise executing the updated context aware policy, and wherein executing the updated context aware policy comprises: determining that the one or more conditions defined by the updated context aware policy have been satisfied and, in response to determining the one or more conditions have been satisfied, executing the action defined by the updated context aware policy.

In some embodiments, the data is collected from the user interactions while using the context aware policy in the extended reality environment, and wherein the context aware policy defines an action to be triggered upon satisfaction of one or more conditions within the extended reality environment.

In some embodiments, the operations further comprise: determining a support set for the context aware policy based on the data, wherein the support set is a subset of the data where the context aware policy has been correct as determined by the user interactions while using the context aware policy; determining a confidence score for the context aware policy based on the data, wherein the confidence score is a measure of certainty that the one or more conditions will lead to a correct action for the user as determined by the user interactions while using the context aware policy; generating a set of replacement policies for the context aware policy, wherein each replacement policy of the set of replacement policies defines a modified version of the one or more conditions or the action from the context aware policy; and rendering the set of replacement policies with the one or more suggested policies in the user interface during the authoring session as the suggestion for the context aware policy.

In some embodiments, the operations further comprise modifying, via the user interface, the one or more conditions or the action defined by the context aware policy with a modified version of the one or more conditions or the action defined by the set of replacement policies or the one or more suggested policies to generate an updated context aware policy.

In some embodiments, a computer-implemented method is provided that includes steps which, when executed, perform part or all of the one or more processes or operations disclosed herein.

In some embodiments, one or more non-transitory computer-readable media are provide for storing computer-readable instructions that, when executed by at least one processing system, cause a system to perform part or all of the one or more processes or operations disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIGS. 5A-5H illustrate various aspects of context aware policies in accordance with various embodiments.

DETAILED DESCRIPTION

Figure 1:
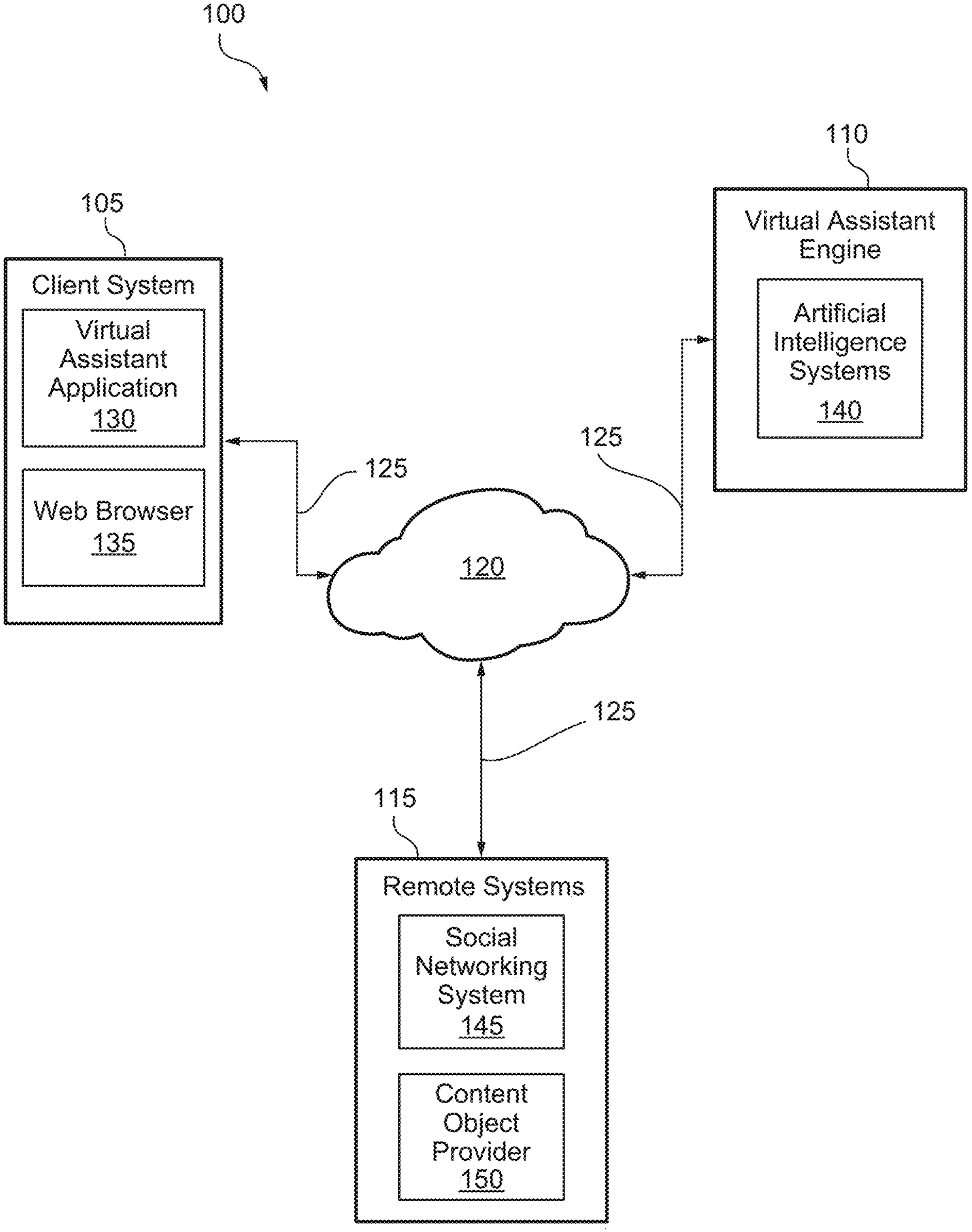
FIG. 1 is a simplified block diagram of a network environment in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

Extended reality systems are becoming increasingly ubiquitous with applications in many fields, such as computer gaming, health and safety, industrial, and education. As a few examples, extended reality systems are being incorporated into mobile devices, gaming consoles, personal computers, movie theaters, and theme parks. Typical extended reality systems include one or more devices for rendering and displaying content to users. As one example, an extended reality system may incorporate a head-mounted device (TIMID) worn by a user and configured to output extended reality content to the user. The extended reality content may be generated in a wholly or partially simulated environment (extended reality environment) that people sense and/or interact with via an electronic system. The simulated environment may be a virtual reality (VR) environment, which is designed to be based entirely on computer-generated sensory inputs (e.g., virtual content) for one or more user senses, or a mixed reality (MR) environment, which is designed to incorporate sensory inputs (e.g., a view of the physical surroundings) from the physical environment, or a representation thereof, in addition to including computer-generated sensory inputs (e.g., virtual content). Examples of MR include augmented reality (AR) and augmented virtuality (AV). An AR environment is a simulated environment in which one or more virtual objects are superimposed over a physical environment, or a representation thereof, or a simulated environment in which a representation of a physical environment is transformed by computer-generated sensory information. An AV environment is a simulated environment in which a virtual or computer-generated environment incorporates one or more sensory inputs from the physical environment. In any instance, during operation in a VR, MR, AR, or AV environment, the user typically interacts with and within the extended reality system to interact with extended reality content.

In many activities undertaken via VR, MR, AR, or AV, users freely roam through simulated and physical environments and are provided with content that contains information that may be important and/or relevant to a user's experience within the simulated and physical environments. For example, an extended reality system may assist a user with performance of a task in simulated and physical environments by providing them with content such as information about their environment and instructions for performing the task. While the content is typically relevant to the users' states and/or activities, these extended reality systems do not provide a means to generating and modifying policies based on the users' activities in the simulated and physical environments.

In order to overcome this and other challenges, techniques are disclosed herein for generating and modifying policies with an artificial intelligence (AI) platform based on user activities. In exemplary embodiments, an extended reality system is provided that includes a head-mounted device that has a display for displaying content to a user and one or more cameras for capturing images of a visual field of the user wearing the head-mounted device; one or more processors; and one or more memories that are accessible to the one or more processors and that store instructions that are executable by the one or more processors and, when executed by the one or more processors, cause the one or more processors to generate and modify policies with an AI platform based on user activities. The AI platform generates and modifies policies based on user activities by collecting, at least using one or more cameras, data including characteristics of activities performed by a user in a real-world environment, a virtual environment, or a combination thereof; predicting a control structure based on the data and model parameters learned from historical policies, wherein the control structure includes one or more actions and one or more conditions for executing the one or more actions, and wherein the one or more actions and one or more conditions are determined from the characteristics of the activities; and generating a new policy or modifying a pre-existing policy based on the control structure, wherein the new policy or the modified pre-existing policy includes one or more conditional statements for executing the one or more actions based on evaluation of the one or more conditions.

In order to overcome this and other challenges, techniques are also disclosed herein for a mixed-initiative policy authoring system. By providing users with intelligent interactive suggestions, generated by a computational authoring agent, the system reduces user effort and expertise required to author entirely new AI policies for extended reality environments. In exemplary embodiments, an extended reality system is provided that includes a head-mounted device comprising a display that displays content to a user and one or more cameras that capture images of a visual field of the user wearing the head-mounted device; a processing system; at least one memory storing instructions that, when executed by the processing system, cause the extended reality system to perform operations comprising: in response to the user launching an authoring session to generate a context aware policy, accessing data collected from user interactions in extended reality; inputting the data into a machine learning model trained to provide context aware policy suggestions, wherein each context aware policy defines an action to be triggered upon satisfaction of one or more context conditions within the extended reality; predicting, by the machine learning model, most likely action classes for context within the data; calculating, by the machine learning model, correlation coefficients between each portion of the context and each target action of the most likely action classes; generating one or more suggested policies for the context aware policy, wherein the generating, for each suggest policy, comprises combining one or more portions of the context with a target action based on the correlation coefficients; and rendering the one or more suggested policies in a user interface during the authoring session as a suggestion for the context aware policy.

Extended Reality System Overview

FIG. 1 illustrates an example network environment 100 associated with an extended reality system in accordance with aspects of the present disclosure. Network environment 100 includes a client system 105, a virtual assistant engine 110, and remote systems 115 connected to each other by a network 120. Although FIG. 1 illustrates a particular arrangement of the client system 105, the virtual assistant engine 110, the remote systems 115, and the network 120, this disclosure contemplates any suitable arrangement. As an example, and not by way of limitation, two or more of the client system 105, the virtual assistant engine 110, and the remote systems 115 may be connected to each other directly, bypassing the network 120. As another example, two or more of the client system 105, the virtual assistant engine 110, and the remote systems 115 may be physically or logically co-located with each other in whole or in part. Moreover, although FIG. 1 illustrates a particular number of the client system 105, the virtual assistant engine 110, the remote systems 115, and the network 120, this disclosure contemplates any suitable number of client systems 105, virtual assistant engine 110, remote systems 115, and networks 120. As an example, and not by way of limitation, network environment 100 may include multiple client systems, such as client system 105; virtual assistant engines, such as virtual assistant engine 110; remote systems, such as remote systems 115; and networks, such as network 120.

This disclosure contemplates that network 120 may be any suitable network. As an example, and not by way of limitation, one or more portions of a network 120 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Additionally, the network 120 may include one or more networks.

Links 125 may connect the client system 105, the virtual assistant engine 110, and the remote systems 115 to the network 120, to another communication network (not shown), or to each other. This disclosure contemplates links 125 may include any number and type of suitable links. In particular embodiments, one or more of the links 125 include one or more wireline links (e.g., Digital Subscriber Line or Data Over Cable Service Interface Specification), wireless links (e.g., Wi-Fi or Worldwide Interoperability for Microwave Access), or optical links (e.g., Synchronous Optical Network or Synchronous Digital Hierarchy). In particular embodiments, each link of the links 125 includes an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 125, or a combination of two or more such links. Links 125 need not necessarily be the same throughout a network environment 100. For example, some links of the links 125 may differ in one or more respects from some other links of the links 125.

In various embodiments, the client system 105 is an electronic device including hardware, software, or embedded logic components or a combination of two or more such components and capable of carrying out the appropriate extended reality functionalities in accordance with techniques of the disclosure. As an example, and not by way of limitation, the client system 105 may include a desktop computer, notebook or laptop computer, netbook, a tablet computer, e-book reader, global positioning system (GPS) device, camera, personal digital assistant, handheld electronic device, cellular telephone, smartphone, a VR, MR, AR, or AV headset or HMD, any suitable electronic device capable of displaying extended reality content, or any suitable combination thereof. In particular embodiments, the client system 105 is a VR/AR HMD, such as described in detail with respect to FIG. 2. This disclosure contemplates any suitable client system 105 that is configured to generate and output extended reality content to the user. The client system 105 may enable its user to communicate with other users at other client systems.

In various embodiments, the client system 105 includes a virtual assistant application 130. The virtual assistant application 130 instantiates at least a portion of a virtual assistant, which can provide information or services to a user based on user input, contextual awareness (such as clues from the physical environment or clues from user behavior), and the capability to access information from a variety of online sources (such as weather conditions, traffic information, news, stock prices, user schedules, and/or retail prices). As used herein, when an action is "based on" something, this means the action is based at least in part on at least a part of the something. The user input may include text (e.g., online chat), especially in an instant messaging application or other applications, voice, eye-tracking, user motion, such as gestures or running, or a combination of them. The virtual assistant may perform concierge-type services (e.g., making dinner reservations, purchasing event tickets, making travel arrangements, and the like), provide information (e.g., reminders, information concerning an object in an environment, information concerning a task or interaction, answers to questions, training regarding a task or activity, and the like), provide goal assisted services (e.g., generating and implementing a recipe to cook a meal in a certain amount of time, implementing tasks to clean in a most efficient manner, generating and executing a construction plan including allocation of tasks to two or more workers, and the like), execute policies in accordance with context aware policies (CAPs), and similar types of extended reality services. The virtual assistant may also perform management or data-handling tasks based on online information and events without user initiation or interaction. Examples of those tasks that may be performed by the virtual assistant may include schedule management (e.g., sending an alert to a dinner date to which a user is running late due to traffic conditions, updating schedules for both parties, and changing the restaurant reservation time). The virtual assistant may be enabled in an extended reality environment by a combination of the client system 105, the virtual assistant engine 110, application programming interfaces (APIs), and the proliferation of applications on user devices, such as the remote systems 115.

A user at the client system 105 may use the virtual assistant application 130 to interact with the virtual assistant engine 110. In some instances, the virtual assistant application 130 is a stand-alone application or integrated into another application, such as a social-networking application or another suitable application (e.g., an artificial simulation application). In some instances, the virtual assistant application 130 is integrated into the client system 105 (e.g., part of the operating system of the client system 105), an assistant hardware device, or any other suitable hardware devices. In some instances, the virtual assistant application 130 may be accessed via a web browser 135. In some instances, the virtual assistant application 130 passively listens to and observes interactions of the user in the real-world, and processes what it hears and sees (e.g., explicit input, such as audio commands or interface commands, contextual awareness derived from audio or physical actions of the user, objects in the real-world, environmental triggers such as weather or time, and the like) in order to interact with the user in an intuitive manner.

In particular embodiments, the virtual assistant application 130 receives or obtains input from a user, the physical environment, a virtual reality environment, or a combination thereof via different modalities. As an example, and not by way of limitation, the modalities may include audio, text, image, video, motion, graphical or virtual user interfaces, orientation, and/or sensors. The virtual assistant application 130 communicates the input to the virtual assistant engine 110. Based on the input, the virtual assistant engine 110 analyzes the input and generates responses (e.g., text or audio responses, device commands, such as a signal to turn on a television, virtual content such as a virtual object, or the like) as output. The virtual assistant engine 110 may send the generated responses to the virtual assistant application 130, the client system 105, the remote systems 115, or a combination thereof. The virtual assistant application 130 may present the response to the user at the client system 105 (e.g., rendering virtual content overlaid on a real-world object within the display). The presented responses may be based on different modalities, such as audio, text, image, and video. As an example, and not by way of limitation, context concerning activity of a user in the physical world may be analyzed and determined to initiate an interaction for completing an immediate task or goal, which may include the virtual assistant application 130 retrieving traffic information (e.g., via remote systems 115). The virtual assistant application 130 may communicate the request for traffic information to virtual assistant engine 110. The virtual assistant engine 110 may accordingly contact a third-party system and retrieve traffic information as a result of the request and send the traffic information back to the virtual assistant application 110. The virtual assistant application 110 may then present the traffic information to the user as text (e.g., as virtual content overlaid on the physical environment, such as real-world object) or audio (e.g., spoken to the user in natural language through a speaker associated with the client system 105).

In some embodiments, the client system 105 may collect or otherwise be associated with data. In some embodiments, the data may be collected from or pertain to any suitable computing system or application (e.g., a social-networking system, other client systems, a third-party system, a messaging application, a photo-sharing application, a biometric data acquisition application, an artificial-reality application, a virtual assistant application).

In some embodiments, privacy settings (or "access settings") may be provided for the data. The privacy settings may be stored in any suitable manner (e.g., stored in an index on an authorization server). A privacy setting for the data may specify how the data or particular information associated with the data can be accessed, stored, or otherwise used (e.g., viewed, shared, modified, copied, executed, surfaced, or identified) within an application (e.g., an extended reality application). When the privacy settings for the data allow a particular user or other entity to access that the data, the data may be described as being "visible" with respect to that user or other entity. For example, a user of an extended reality application or virtual assistant application may specify privacy settings for a user profile page that identifies a set of users that may access the extended reality application or virtual assistant application information on the user profile page and excludes other users from accessing that information. As another example, an extended reality application or virtual assistant application may store privacy policies/guidelines. The privacy policies/guidelines may specify what information of users may be accessible by which entities and/or by which processes (e.g., internal research, advertising algorithms, machine-learning algorithms) to ensure only certain information of the user may be accessed by certain entities or processes.

In some embodiments, privacy settings for the data may specify a "blocked list" of users or other entities that should not be allowed to access certain information associated with the data. In some cases, the blocked list may include third-party entities. The blocked list may specify one or more users or entities for which the data is not visible.

In some embodiments, privacy settings associated with the data may specify any suitable granularity of permitted access or denial of access. As an example, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. In some embodiments, different pieces of the data of the same type associated with a user may have different privacy settings. In addition, one or more default privacy settings may be set for each piece of data of a particular data type.

In various embodiments, the virtual assistant engine 110 assists users to retrieve information from different sources, request services from different service providers, assist users to learn or complete goals and tasks using different sources and/or service providers, execute policies or services, and combinations thereof. In some instances, the virtual assistant engine 110 receives input data from the virtual assistant application 130 and determines one or more interactions based on the input data that could be executed to request information, services, and/or complete a goal or task of the user. The interactions are actions that could be presented to a user for execution in an extended reality environment. In some instances, the interactions are influenced by other actions associated with the user. The interactions are aligned with affordances, goals, or tasks associated with the user. Affordances may include actions or services associated with smart home devices, extended reality applications, web services, and the like. Goals may include things that a user wants to occur or desires (e.g., as a meal, a piece of furniture, a repaired automobile, a house, a garden, a clean apartment, and the like). Tasks may include things that need to be done or activities that should be carried out in order to accomplish a goal or carry out an aim (e.g., cooking a meal using one or more recipes, building a piece of furniture, repairing a vehicle, building a house, planting a garden, cleaning one or more rooms of an apartment, and the like). Each goal and task may be associated with a workflow of actions or sub-tasks for performing the task and achieving the goal. For example, for preparing a salad, a workflow of actions or sub-tasks may include the ingredients needed, equipment needed for the steps (e.g., a knife, a stove top, a pan, a salad spinner), sub-tasks for preparing ingredients (e.g., chopping onions, cleaning lettuce, cooking chicken), and sub-tasks for combining ingredients into subcomponents (e.g., cooking chicken with olive oil and Italian seasonings).

The virtual assistant engine 110 may use artificial intelligence (AI) systems 140 (e.g., rule-based systems and/or machine-learning based systems) to analyze the input based on a user's profile and other relevant information. The result of the analysis may include different interactions associated with an affordance, task, or goal of the user. The virtual assistant engine 110 may then retrieve information, request services, and/or generate instructions, recommendations, or virtual content associated with one or more of the different interactions for executing the actions associated with the affordances and/or completing tasks or goals. In some instances, the virtual assistant engine 110 interacts with remote systems 115, such as a social-networking system 145 when retrieving information, requesting service, and/or generating instructions or recommendations for the user. The virtual assistant engine 110 may generate virtual content for the user using various techniques, such as natural language generating, virtual object rendering, and the like. The virtual content may include, for example, the retrieved information; the status of the requested services; a virtual object, such as a glimmer overlaid on a physical object such as an appliance, light, or piece of exercise equipment; a demonstration for a task, and the like. In particular embodiments, the virtual assistant engine 110 enables the user to interact with it regarding the information, services, or goals using a graphical or virtual interface, a stateful and multi-turn conversation using dialog-management techniques, and/or a stateful and multi-action interaction using task-management techniques.

In various embodiments, remote systems 115 may include one or more types of servers, one or more data stores, one or more interfaces, including but not limited to APIs, one or more web services, one or more content sources, one or more networks, or any other suitable components, e.g., that servers may communicate with. A remote system 115 may be operated by a same entity or a different entity from an entity operating the virtual assistant engine 110. In particular embodiments, however, the virtual assistant engine 110 and third-party systems may operate in conjunction with each other to provide virtual content to users of the client system 105. For example, a social-networking system 145 may provide a platform, or backbone, which other systems, such as third-party systems, may use to provide social-networking services and functionality to users across the Internet, and the virtual assistant engine 110 may access these systems to provide virtual content on the client system 105.

In particular embodiments, the social-networking system 145 may be a network-addressable computing system that can host an online social network. The social-networking system 145 may generate, store, receive, and send social-networking data, such as user-profile data, concept-profile data, social-graph information, or other suitable data related to the online social network. The social-networking system 145 may be accessed by the other components of network environment 100 either directly or via a network 120. As an example, and not by way of limitation, the client system 105 may access the social-networking system 145 using a web browser 135, or a native application associated with the social-networking system 145 (e.g., a mobile social-networking application, a messaging application, another suitable application, or any combination thereof) either directly or via a network 120. The social-networking system 145 may provide users with the ability to take actions on various types of items or objects, supported by the social-networking system 145. As an example, and not by way of limitation, the items and objects may include groups or social networks to which users of the social-networking system 145 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 145 or by an external system of the remote systems 115, which is separate from the social-networking system 145 and coupled to the social-networking system via the network 120.

Remote systems 115 may include a content object provider 150. A content object provider 150 includes one or more sources of virtual content objects, which may be communicated to the client system 105. As an example, and not by way of limitation, virtual content objects may include information regarding things or activities of interest to the user, such as movie show times, movie reviews, restaurant reviews, restaurant menus, product information and reviews, instructions on how to perform various tasks, exercise regimens, cooking recipes, or other suitable information. As another example and not by way of limitation, content objects may include incentive content objects, such as coupons, discount tickets, gift certificates, or other suitable incentive objects. As another example and not by way of limitation, content objects may include virtual objects, such as virtual interfaces, two-dimensional (2D) or three-dimensional (3D) graphics, media content, or other suitable virtual objects.

Figure 2A:
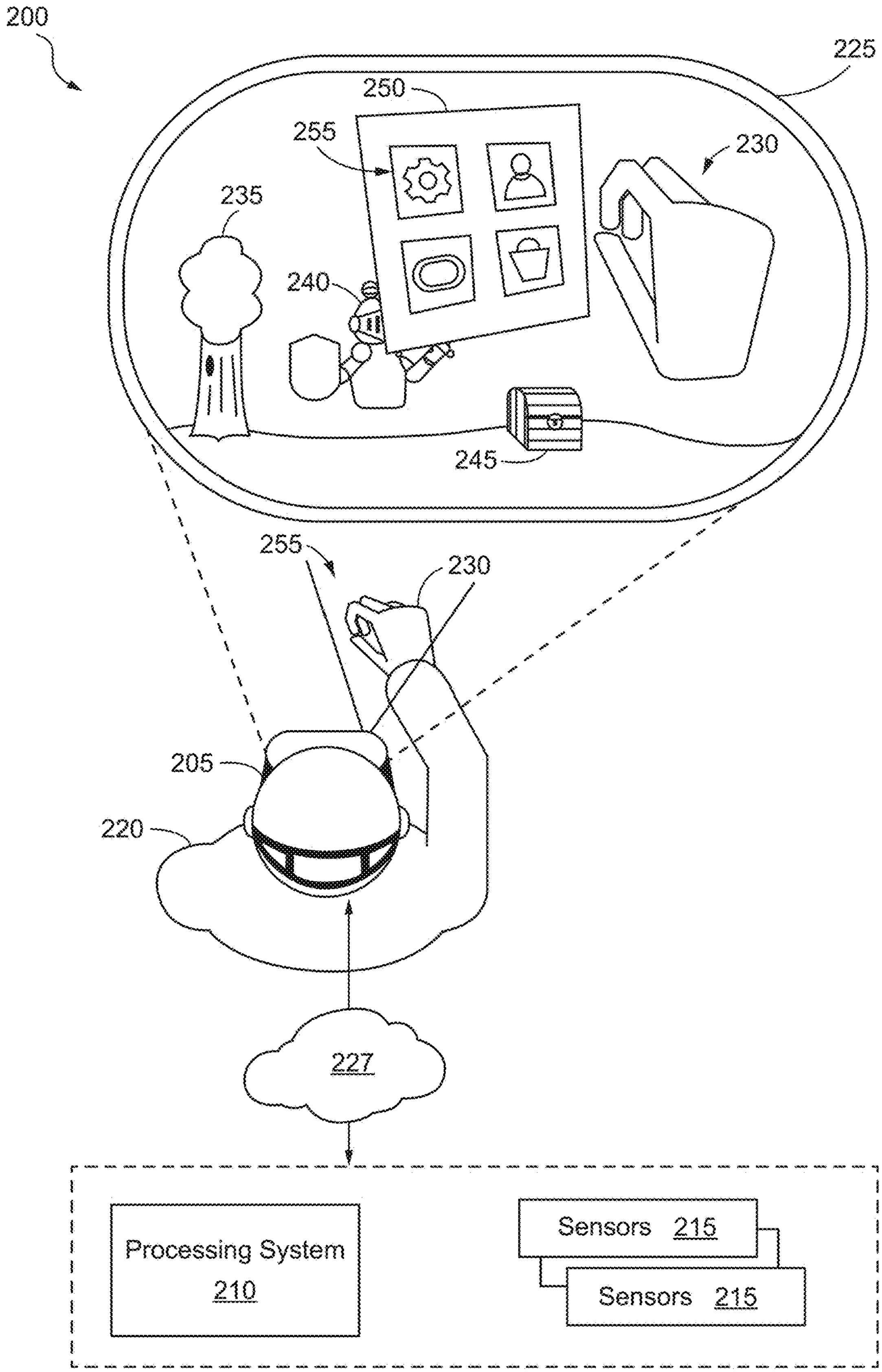
FIG. 2A is an illustration depicting an example extended reality system that presents and controls user interface elements within an extended reality environment in accordance with various embodiments.

FIG. 2A illustrates an example client system 200 (e.g., client system 105 described with respect to FIG. 1) in accordance with aspects of the present disclosure. Client system 200 includes an extended reality system 205 (e.g., an HMD), a processing system 210, and one or more sensors 215. As shown, extended reality system 205 is typically worn by user 220 and includes an electronic display (e.g., a transparent, translucent, or solid display), optional controllers, and optical assembly for presenting extended reality content 225 to the user 220. The one or more sensors 215 may include motion sensors (e.g., accelerometers) for tracking motion of the extended reality system 205 and may include one or more image capturing devices (e.g., cameras, line scanners) for capturing images and other information of the surrounding physical environment. In this example, processing system 210 is shown as a single computing device, such as a gaming console, workstation, a desktop computer, or a laptop. In other examples, processing system 210 may be distributed across a plurality of computing devices, such as a distributed computing network, a data center, or a cloud computing system. In other examples, processing system 210 may be integrated with the HMD. Extended reality system 205, processing system 210, and the one or more sensors 215 are communicatively coupled via a network 227, which may be a wired or wireless network, such as Wi-Fi, a mesh network, or a short-range wireless communication medium, such as Bluetooth wireless technology, or a combination thereof. Although extended reality system 205 is shown in this example as in communication with, e.g., tethered to or in wireless communication with, the processing system 210, in some implementations, extended reality system 205 operates as a stand-alone, mobile extended reality system.

In general, client system 200 uses information captured from a real-world, physical environment to render extended reality content 225 for display to the user 220. In the example of FIG. 2A, the user 220 views the extended reality content 225 constructed and rendered by an extended reality application executing on processing system 210 and/or extended reality system 205. In some examples, the extended reality content 225 viewed through the extended reality system 205 includes a mixture of real-world imagery (e.g., the user's hand 230 and physical objects 235) and virtual imagery (e.g., virtual content, such as information or objects 240, 245 and virtual user interface 250) to produce mixed reality and/or augmented reality. In some examples, virtual information or objects 240, 245 may be mapped (e.g., pinned, locked, placed) to a particular position within extended reality content 225. For example, a position for virtual information or objects 240, 245 may be fixed, as relative to one of walls of a residence or surface of the earth, for instance. A position for virtual information or objects 240, 245 may be variable, as relative to a physical object 235 or the user 220, for instance. In some examples, the particular position of virtual information or objects 240, 245 within the extended reality content 225 is associated with a position within the real world, physical environment (e.g., on a surface of a physical object 235).

In the example shown in FIG. 2A, virtual information or objects 240, 245 are mapped at a position relative to a physical object 235. As should be understood, the virtual imagery (e.g., virtual content, such as information or objects 240, 245 and virtual user interface 250) does not exist in the real-world, physical environment. Virtual user interface 250 may be fixed, as relative to the user 220, the user's hand 230, physical objects 235, or other virtual content, such as virtual information or objects 240, 245, for instance. As a result, client system 200 renders, at a user interface position that is locked relative to a position of the user 220, the user's hand 230, physical objects 235, or other virtual content in the extended reality environment, virtual user interface 250 for display at extended reality system 205 as part of extended reality content 225. As used herein, a virtual element 'locked' to a position of virtual content or a physical object is rendered at a position relative to the position of the virtual content or physical object so as to appear to be part of or otherwise tied in the extended reality environment to the virtual content or physical object.

In some implementations, the client system 200 generates and renders virtual content (e.g., GIFs, photos, applications, live-streams, videos, text, a web-browser, drawings, animations, representations of data files, or any other visible media) on a virtual surface. A virtual surface may be associated with a planar or other real-world surface (e.g., the virtual surface corresponds to and is locked to a physical surface, such as a wall, table, or ceiling). In the example shown in FIG. 2A, the virtual surface is associated with the sky and ground of the physical environment. In other examples, a virtual surface can be associated with a portion of a surface (e.g., a portion of the wall). In some examples, only the virtual content items contained within a virtual surface are rendered. In other examples, the virtual surface is generated and rendered (e.g., as a virtual plane or as a border corresponding to the virtual surface). In some examples, a virtual surface can be rendered as floating in a virtual or real-world physical environment (e.g., not associated with a particular real-world surface). The client system 200 may render one or more virtual content items in response to a determination that at least a portion of the location of virtual content items is in a field of view of the user 220. For example, client system 200 may render virtual user interface 250 only if a given physical object (e.g., a lamp) is within the field of view of the user 220.

During operation, the extended reality application constructs extended reality content 225 for display to user 220 by tracking and computing interaction information (e.g., tasks for completion) for a frame of reference, typically a viewing perspective of extended reality system 205. Using extended reality system 205 as a frame of reference and based on a current field of view as determined by a current estimated interaction of extended reality system 205, the extended reality application renders extended reality content 225 which, in some examples, may be overlaid, at least in part, upon the real-world, physical environment of the user 220. During this process, the extended reality application uses sensed data received from extended reality system 205 and sensors 215, such as movement information, contextual awareness, and/or user commands, and, in some examples, data from any external sensors, such as third-party information or device, to capture information within the real world, physical environment, such as motion by user 220 and/or feature tracking information with respect to user 220. Based on the sensed data, the extended reality application determines interaction information to be presented for the frame of reference of extended reality system 205 and, in accordance with the current context of the user 220, renders the extended reality content 225.

Client system 200 may trigger generation and rendering of virtual content based on a current field of view of user 220, as may be determined by real-time gaze 265 tracking of the user, or other conditions. More specifically, image capture devices of the sensors 215 capture image data representative of objects in the real-world, physical environment that are within a field of view of image capture devices. During operation, the client system 200 performs object recognition within images captured by the image capturing devices of extended reality system 205 to identify objects in the physical environment, such as the user 220, the user's hand 230, and/or physical objects 235. Further, the client system 200 tracks the position, orientation, and configuration of the objects in the physical environment over a sliding window of time. Field of view typically corresponds with the viewing perspective of the extended reality system 205. In some examples, the extended reality application presents extended reality content 225 that includes mixed reality and/or augmented reality.

As illustrated in FIG. 2A, the extended reality application may render virtual content, such as virtual information or objects 240, 245 on a transparent display such that the virtual content is overlaid on real-world objects, such as the portions of the user 220, the user's hand 230, or physical objects 235, that are within a field of view of the user 220. In other examples, the extended reality application may render images of real-world objects, such as the portions of the user 220, the user's hand 230, or physical objects 235, that are within a field of view along with virtual objects, such as virtual information or objects 240, 245 within extended reality content 225. In other examples, the extended reality application may render virtual representations of the portions of the user 220, the user's hand 230, and physical objects 235 that are within a field of view (e.g., render real-world objects as virtual objects) within extended reality content 225. In either example, user 220 is able to view the portions of the user 220, the user's hand 230, physical objects 235 and/or any other real-world objects or virtual content that are within a field of view within extended reality content 225. In other examples, the extended reality application may not render representations of the user 220 and the user's hand 230; the extended reality application may instead only render the physical objects 235 and/or virtual information or objects 240, 245.

In various embodiments, the client system 200 renders to extended reality system 205 extended reality content 225 in which virtual user interface 250 is locked relative to a position of the user 220, the user's hand 230, physical objects 235, or other virtual content in the extended reality environment. That is, the client system 205 may render a virtual user interface 250 having one or more virtual user interface elements at a position and orientation that are based on and correspond to the position and orientation of the user 220, the user's hand 230, physical objects 235, or other virtual content in the extended reality environment. For example, if a physical object is positioned in a vertical position on a table, the client system 205 may render the virtual user interface 250 at a location corresponding to the position and orientation of the physical object in the extended reality environment. Alternatively, if the user's hand 230 is within the field of view, the client system 200 may render the virtual user interface at a location corresponding to the position and orientation of the user's hand 230 in the extended reality environment. Alternatively, if other virtual content is within the field of view, the client system 200 may render the virtual user interface at a location corresponding to a general predetermined position of the field of view (e.g., a bottom of the field of view) in the extended reality environment. Alternatively, if other virtual content is within the field of view, the client system 200 may render the virtual user interface at a location corresponding to the position and orientation of the other virtual content in the extended reality environment. In this way, the virtual user interface 250 being rendered in the virtual environment may track the user 220, the user's hand 230, physical objects 235, or other virtual content such that the user interface appears, to the user, to be associated with the user 220, the user's hand 230, physical objects 235, or other virtual content in the extended reality environment.

Figure 2B:
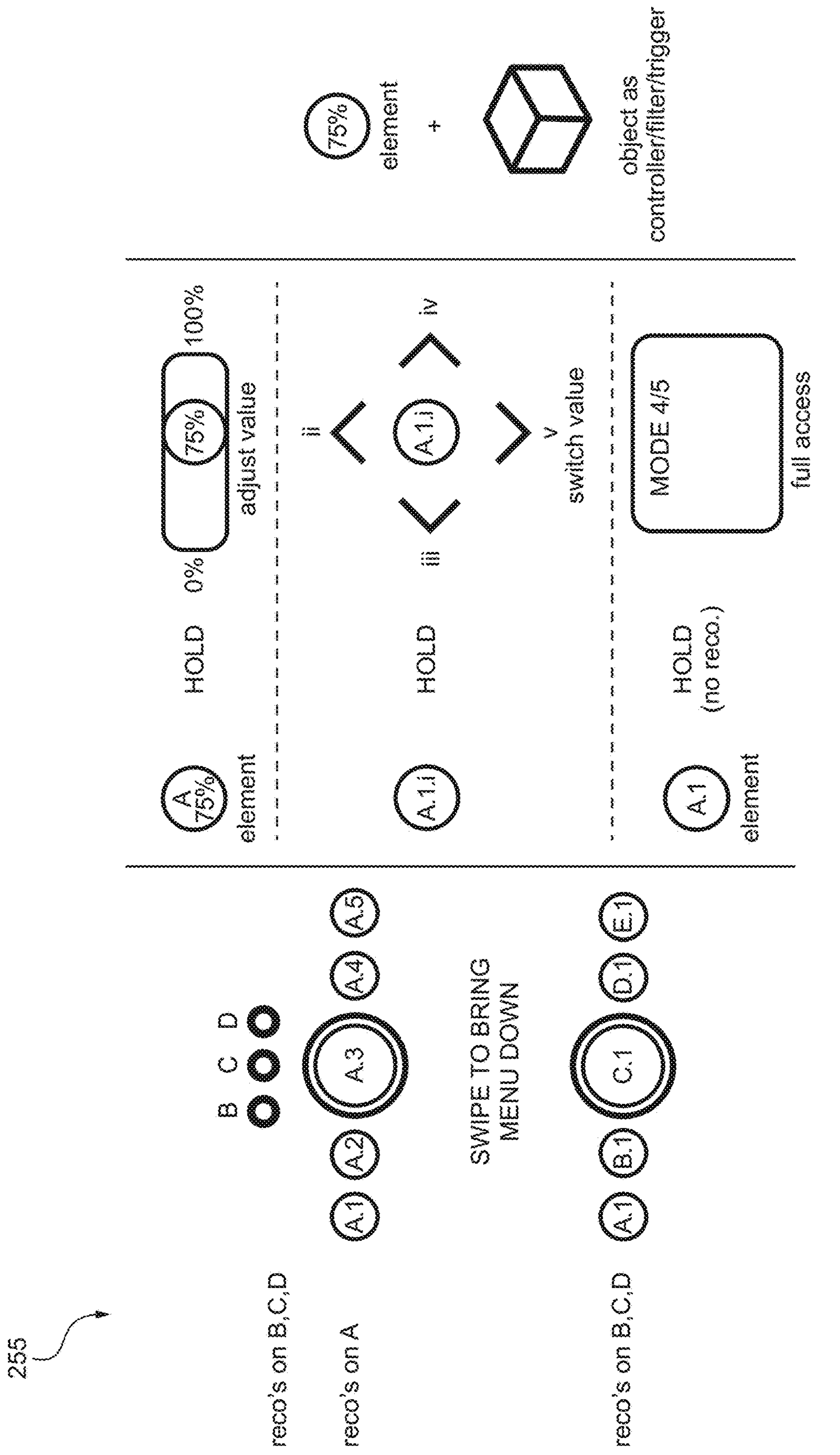
FIG. 2B is an illustration depicting user interface elements in accordance with various embodiments.

As shown in FIGS. 2A and 2B, virtual user interface 250 includes one or more virtual user interface elements. Virtual user interface elements may include, for instance, a virtual drawing interface; a selectable menu (e.g., a drop-down menu); virtual buttons, such as button element 255; a virtual slider or scroll bar; a directional pad; a keyboard; other user-selectable user interface elements including glyphs, display elements, content, user interface controls, and so forth. The particular virtual user interface elements for virtual user interface 250 may be context-driven based on the current extended reality applications engaged by the user 220 or real-world actions/tasks being performed by the user 220. When a user performs a user interface gesture in the extended reality environment at a location that corresponds to one of the virtual user interface elements of virtual user interface 250, the client system 200 detects the gesture relative to the virtual user interface elements and performs an action associated with the gesture and the virtual user interface elements. For example, the user 220 may press their finger at a button element 255 location on the virtual user interface 250. The button element 255 and/or virtual user interface 250 location may or may not be overlaid on the user 220, the user's hand 230, physical objects 235, or other virtual content, e.g., correspond to a position in the physical environment, such as on a light switch or controller at which the client system 200 renders the virtual user interface button. In this example, the client system 200 detects this virtual button press gesture and performs an action corresponding to the detected press of a virtual user interface button (e.g., turns the light on). The client system 205 may also, for instance, animate a press of the virtual user interface button along with the button press gesture.

The client system 200 may detect user interface gestures and other gestures using an inside-out or outside-in tracking system of image capture devices and or external cameras. The client system 200 may alternatively, or in addition, detect user interface gestures and other gestures using a presence-sensitive surface. That is, a presence-sensitive interface of the extended reality system 205 and/or controller may receive user inputs that make up a user interface gesture. The extended reality system 205 and/or controller may provide haptic feedback to touch-based user interaction by having a physical surface with which the user can interact (e.g., touch, drag a finger across, grab, and so forth). In addition, peripheral extended reality system 205 and/or controller may output other indications of user interaction using an output device. For example, in response to a detected press of a virtual user interface button, extended reality system 205 and/or controller may output a vibration or "click" noise, or extended reality system 205 and/or controller may generate and output content to a display. In some examples, the user 220 may press and drag their finger along physical locations on the extended reality system 205 and/or controller corresponding to positions in the virtual environment at which the client system 205 renders virtual user interface elements of virtual user interface 250. In this example, the client system 205 detects this gesture and performs an action according to the detected press and drag of virtual user interface elements, such as by moving a slider bar in the virtual environment. In this way, client system 200 simulates movement of virtual content using virtual user interface elements and gestures.

Various embodiments disclosed herein may include or be implemented in conjunction with various types of extended reality systems. Extended reality content generated by the extended reality systems may include completely computer-generated content or computer-generated content combined with captured (e.g., real-world) content. The extended reality content may include video, audio, haptic feedback, or some combination thereof, any of which may be presented in a single channel or in multiple channels (e.g., stereo video that produces a 3D effect to the viewer). Additionally, in some embodiments, extended reality may also be associated with applications, products, accessories, services, or some combination thereof, that are used to, for example, create content in an extended reality and/or are otherwise used in (e.g., to perform activities in) an extended reality.

The extended reality systems may be implemented in a variety of different form factors and configurations. Some extended reality systems may be designed to work without near-eye displays (NEDs). Other extended reality systems may include an NED that also provides visibility into the real world (e.g., augmented reality system 300 in FIG. 3A) or that visually immerses a user in an extended reality (e.g., virtual reality system 350 in FIG. 3B). While some extended reality devices may be self-contained systems, other extended reality devices may communicate and/or coordinate with external devices to provide an extended reality experience to a user. Examples of such external devices include handheld controllers, mobile devices, desktop computers, devices worn by a user, devices worn by one or more other users, and/or any other suitable external system.

Figure 3A:
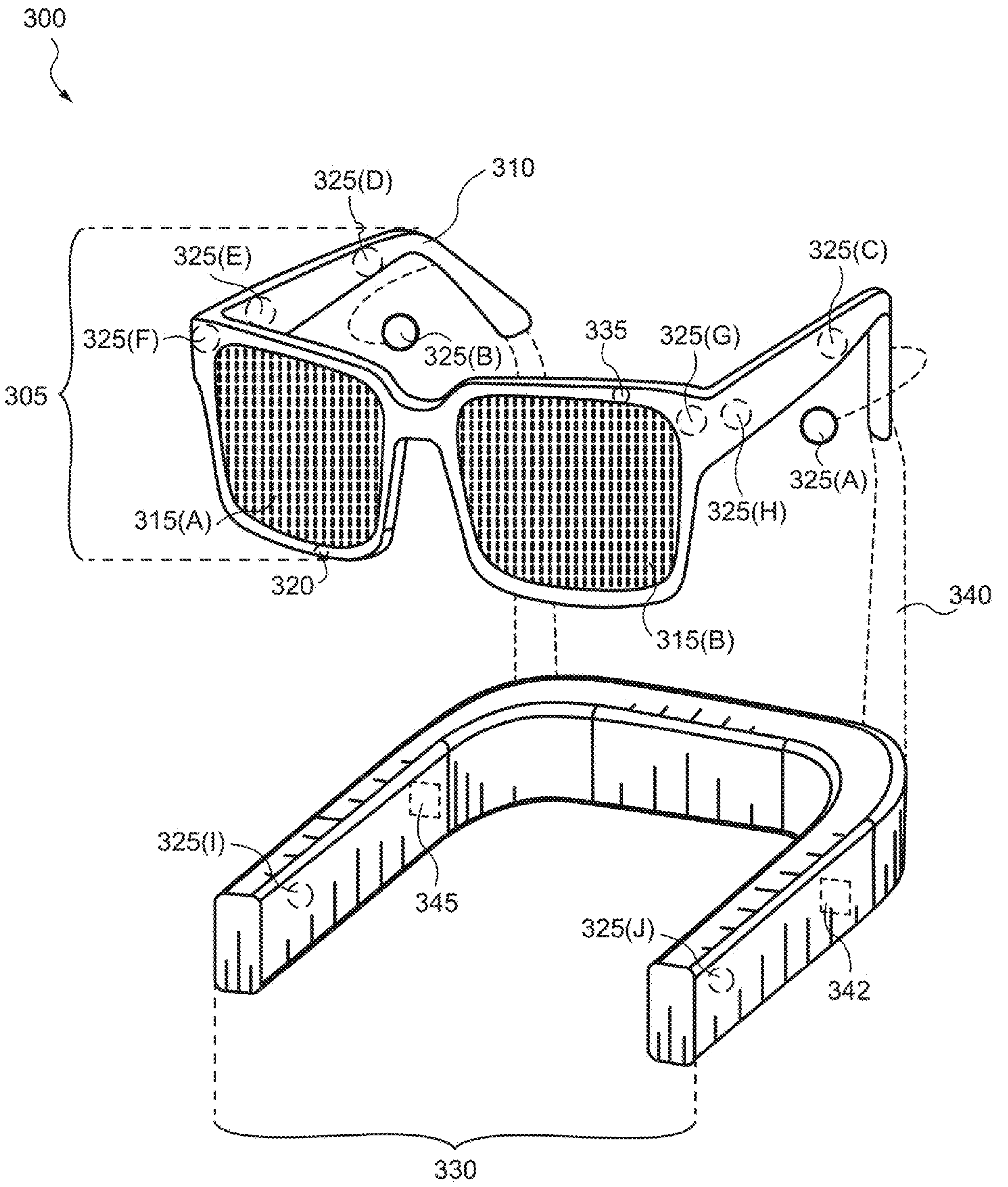
FIG. 3A is an illustration of an augmented reality system in accordance with various embodiments.

As shown in FIG. 3A, augmented reality system 300 may include an eyewear device 305 with a frame 310 configured to hold a left display device 315(A) and a right display device 315(B) in front of a user's eyes. Display devices 315(A) and 315(B) may act together or independently to present an image or series of images to a user. While augmented reality system 300 includes two displays, embodiments of this disclosure may be implemented in augmented reality systems with a single NED or more than two NEDs.

In some embodiments, augmented reality system 300 may include one or more sensors, such as sensor 320. Sensor 320 may generate measurement signals in response to motion of augmented reality system 300 and may be located on substantially any portion of frame 310. Sensor 320 may represent one or more of a variety of different sensing mechanisms, such as a position sensor, an inertial measurement unit (IMU), a depth camera assembly, a structured light emitter and/or detector, or any combination thereof. In some embodiments, augmented reality system 300 may or may not include sensor 320 or may include more than one sensor. In embodiments in which sensor 320 includes an IMU, the IMU may generate calibration data based on measurement signals from sensor 320. Examples of sensor 320 may include, without limitation, accelerometers, gyroscopes, magnetometers, other suitable types of sensors that detect motion, sensors used for error correction of the IMU, or some combination thereof.

In some examples, augmented reality system 300 may also include a microphone array with a plurality of acoustic transducers 325(A)-325(J), referred to collectively as acoustic transducers 325. Acoustic transducers 325 may represent transducers that detect air pressure variations induced by sound waves. Each acoustic transducer 325 may be configured to detect sound and convert the detected sound into an electronic format (e.g., an analog or digital format). The microphone array in FIG. 3A may include, for example, ten acoustic transducers: 325(A) and 325(B), which may be designed to be placed inside a corresponding ear of the user, acoustic transducers 325(C), 325(D), 325(E), 325(F), 325(G), and 325(H), which may be positioned at various locations on frame 310, and/or acoustic transducers 325(I) and 325(J), which may be positioned on a corresponding neckband 330.

In some embodiments, one or more of acoustic transducers 325(A)-(J) may be used as output transducers (e.g., speakers). For example, acoustic transducers 325(A) and/or 325(B) may be earbuds or any other suitable type of headphone or speaker. The configuration of acoustic transducers 325 of the microphone array may vary. While augmented reality system 300 is shown in FIG. 3A as having ten acoustic transducers, the number of acoustic transducers 325 may be greater or less than ten. In some embodiments, using higher numbers of acoustic transducers 325 may increase the amount of audio information collected and/or the sensitivity and accuracy of the audio information. In contrast, using a lower number of acoustic transducers 325 may decrease the computing power required by an associated controller 335 to process the collected audio information. In addition, the position of each acoustic transducer 325 of the microphone array may vary. For example, the position of an acoustic transducer 325 may include a defined position on the user, a defined coordinate on frame 310, an orientation associated with each acoustic transducer 325, or some combination thereof.

Acoustic transducers 325(A) and 325(B) may be positioned on different parts of the user's ear, such as behind the pinna, behind the tragus, and/or within the auricle or fossa. Alternatively, or additionally, there may be additional acoustic transducers 325 on or surrounding the ear in addition to acoustic transducers 325 inside the ear canal. Having an acoustic transducer 325 positioned next to an ear canal of a user may enable the microphone array to collect information on how sounds arrive at the ear canal. By positioning at least two of acoustic transducers 325 on either side of a user's head (e.g., as binaural microphones), augmented reality system 300 may simulate binaural hearing and capture a 3D stereo sound field around a user's head. In some embodiments, acoustic transducers 325(A) and 325(B) may be connected to augmented reality system 300 via a wired connection 340, and in other embodiments acoustic transducers 325(A) and 325(B) may be connected to augmented reality system 300 via a wireless connection (e.g., a Bluetooth connection). In still other embodiments, acoustic transducers 325(A) and 325(B) may not be used at all in conjunction with augmented reality system 300.

Acoustic transducers 325 on frame 310 may be positioned in a variety of different ways, including along the length of the temples, across the bridge, above or below display devices 315(A) and 315(B), or some combination thereof. Acoustic transducers 325 may also be oriented such that the microphone array is able to detect sounds in a wide range of directions surrounding the user wearing the augmented reality system 300. In some embodiments, an optimization process may be performed during manufacturing of augmented reality system 300 to determine relative positioning of each acoustic transducer 325 in the microphone array.

In some examples, augmented reality system 300 may include or be connected to an external device (e.g., a paired device), such as neckband 330. Neckband 330 generally represents any type or form of paired device. Thus, the following discussion of neckband 330 may also apply to various other paired devices, such as charging cases, smart watches, smart phones, wrist bands, other wearable devices, hand-held controllers, tablet computers, laptop computers, and/or other external computing devices.

As shown, neckband 330 may be coupled to eyewear device 305 via one or more connectors. The connectors may be wired or wireless and may include electrical and/or non-electrical (e.g., structural) components. In some cases, eyewear device 305 and neckband 330 may operate independently without any wired or wireless connection between them. While FIG. 3A illustrates the components of eyewear device 305 and neckband 330 in example locations on eyewear device 305 and neckband 330, the components may be located elsewhere and/or distributed differently on eyewear device 305 and/or neckband 330. In some embodiments, the components of eyewear device 305 and neckband 330 may be located on one or more additional peripheral devices paired with eyewear device 305, neckband 330, or some combination thereof.

Pairing external devices, such as neckband 330, with augmented reality eyewear devices may enable the eyewear devices to achieve the form factor of a pair of glasses while still providing sufficient battery and computation power for expanded capabilities. Some or all of the battery power, computational resources, and/or additional features of augmented reality system 300 may be provided by a paired device or shared between a paired device and an eyewear device, thus reducing the weight, heat profile, and form factor of the eyewear device overall while still retaining desired functionality. For example, neckband 330 may allow components that would otherwise be included on an eyewear device to be included in neckband 330 since users may tolerate a heavier weight load on their shoulders than they would tolerate on their heads. Neckband 330 may also have a larger surface area over which to diffuse and disperse heat to the ambient environment. Thus, neckband 330 may allow for greater battery and computation capacity than might otherwise have been possible on a stand-alone eyewear device. Since weight carried in neckband 330 may be less invasive to a user than weight carried in eyewear device 305, a user may tolerate wearing a lighter eyewear device and carrying or wearing the paired device for greater lengths of time than a user would tolerate wearing a heavy standalone eyewear device, thereby enabling users to incorporate extended reality environments more fully into their day-to-day activities.

Neckband 330 may be communicatively coupled with eyewear device 305 and/or to other devices. These other devices may provide certain functions (e.g., tracking, localizing, depth mapping, processing, storage) to augmented reality system 300. In the embodiment of FIG. 3A, neckband 330 may include two acoustic transducers (e.g., 325(I) and 325(J)) that are part of the microphone array (or potentially form their own microphone subarray). Neckband 330 may also include a controller 342 and a power source 345.

Acoustic transducers 325(I) and 325(J) of neckband 330 may be configured to detect sound and convert the detected sound into an electronic format (analog or digital). In the embodiment of FIG. 3A, acoustic transducers 325(I) and 325(J) may be positioned on neckband 330, thereby increasing the distance between the neckband acoustic transducers 325(I) and 325(J) and other acoustic transducers 325 positioned on eyewear device 305. In some cases, increasing the distance between acoustic transducers 325 of the microphone array may improve the accuracy of beamforming performed via the microphone array. For example, if a sound is detected by acoustic transducers 325(C) and 325(D) and the distance between acoustic transducers 325(C) and 325(D) is greater than, e.g., the distance between acoustic transducers 325(D) and 325(E), the determined source location of the detected sound may be more accurate than if the sound had been detected by acoustic transducers 325(D) and 325(E).

Controller 342 of neckband 330 may process information generated by the sensors on neckband 330 and/or augmented reality system 300. For example, controller 342 may process information from the microphone array that describes sounds detected by the microphone array. For each detected sound, controller 342 may perform a direction-of-arrival (DOA) estimation to estimate a direction from which the detected sound arrived at the microphone array. As the microphone array detects sounds, controller 342 may populate an audio data set with the information. In embodiments in which augmented reality system 300 includes an inertial measurement unit, controller 342 may compute all inertial and spatial calculations from the IMU located on eyewear device 305. A connector may convey information between augmented reality system 300 and neckband 330 and between augmented reality system 300 and controller 342. The information may be in the form of optical data, electrical data, wireless data, or any other transmittable data form. Moving the processing of information generated by augmented reality system 300 to neckband 330 may reduce weight and heat in eyewear device 305, making it more comfortable to the user.

Power source 345 in neckband 330 may provide power to eyewear device 305 and/or to neckband 330. Power source 345 may include, without limitation, lithium-ion batteries, lithium-polymer batteries, primary lithium batteries, alkaline batteries, or any other form of power storage. In some cases, power source 345 may be a wired power source. Including power source 345 on neckband 330 instead of on eyewear device 305 may help better distribute the weight and heat generated by power source 345.

As noted, some extended reality systems may, instead of blending an extended reality with actual reality, substantially replace one or more of a user's sensory perceptions of the real world with a virtual experience. One example of this type of system is a head-worn display system, such as virtual reality system 350 in FIG. 3B, that mostly or completely covers a user's field of view. Virtual reality system 350 may include a front rigid body 355 and a band 360 shaped to fit around a user's head. Virtual reality system 350 may also include output audio transducers 365(A) and 365(B). Furthermore, while not shown in FIG. 3B, front rigid body 355 may include one or more electronic elements, including one or more electronic displays, one or more inertial measurement units (IMUs), one or more tracking emitters or detectors, and/or any other suitable device or system for creating an extended reality experience.

Extended reality systems may include a variety of types of visual feedback mechanisms. For example, display devices in augmented reality system 300 and/or virtual reality system 350 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These extended reality systems may include a single display screen for both eyes or may provide a display screen for each eye, which may allow for additional flexibility for varifocal adjustments or for correcting a user's refractive error. Some of these extended reality systems may also include optical subsystems having one or more lenses (e.g., conventional concave or convex lenses, Fresnel lenses, adjustable liquid lenses) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (e.g., a single lens configuration that directly collimates light but results in so-called pincushion distortion) and/or a pupil-forming architecture (e.g., a multi-lens configuration that produces so-called barrel distortion to nullify pincushion distortion).

In addition to or instead of using display screens, some of the extended reality systems described herein may include one or more projection systems. For example, display devices in augmented reality system 300 and/or virtual reality system 350 may include micro-LED projectors that project light (using, e.g., a waveguide) into display devices, such as clear combiner lenses that allow ambient light to pass through. The display devices may refract the projected light toward a user's pupil and may enable a user to simultaneously view both extended reality content and the real world. The display devices may accomplish this using any of a variety of different optical components, including waveguide components (e.g., holographic, planar, diffractive, polarized, and/or reflective waveguide elements), light-manipulation surfaces and elements (e.g., diffractive, reflective, and refractive elements and gratings), and/or coupling elements. Extended reality systems may also be configured with any other suitable type or form of image projection system, such as retinal projectors used in virtual retina displays.

The extended reality systems described herein may also include various types of computer vision components and subsystems. For example, augmented reality system 300 and/or virtual reality system 350 may include one or more optical sensors, such as 2D or 3D cameras, structured light transmitters and detectors, time-of-flight depth sensors, single-beam or sweeping laser rangefinders, 3D LiDAR sensors, and/or any other suitable type or form of optical sensor. An extended reality system may process data from one or more of these sensors to identify a location of a user, to map the real world, to provide a user with context about real-world surroundings, and/or to perform a variety of other functions.

The extended reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the extended reality systems described herein may also include tactile (e.g., haptic) feedback systems, which may be incorporated into headwear, gloves, body suits, handheld controllers, environmental devices (e.g., chairs, floormats), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other extended reality devices, within other extended reality devices, and/or in conjunction with other extended reality devices.

By providing haptic sensations, audible content, and/or visual content, extended reality systems may create an entire virtual experience or enhance a user's real-world experience in a variety of contexts and environments. For instance, extended reality systems may assist or extend a user's perception, memory, or cognition within a particular environment. Some systems may enhance a user's interactions with other people in the real world or may enable more immersive interactions with other people in a virtual world. Extended reality systems may also be used for educational purposes (e.g., for teaching or training in schools, hospitals, government organizations, military organizations, business enterprises), entertainment purposes (e.g., for playing video games, listening to music, watching video content), and/or for accessibility purposes (e.g., as hearing aids, visual aids). The embodiments disclosed herein may enable or enhance a user's extended reality experience in one or more of these contexts and environments and/or in other contexts and environments.

As noted, extended reality systems 300 and 350 may be used with a variety of other types of devices to provide a more compelling extended reality experience. These devices may be haptic interfaces with transducers that provide haptic feedback and/or that collect haptic information about a user's interaction with an environment. The extended reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 4A:
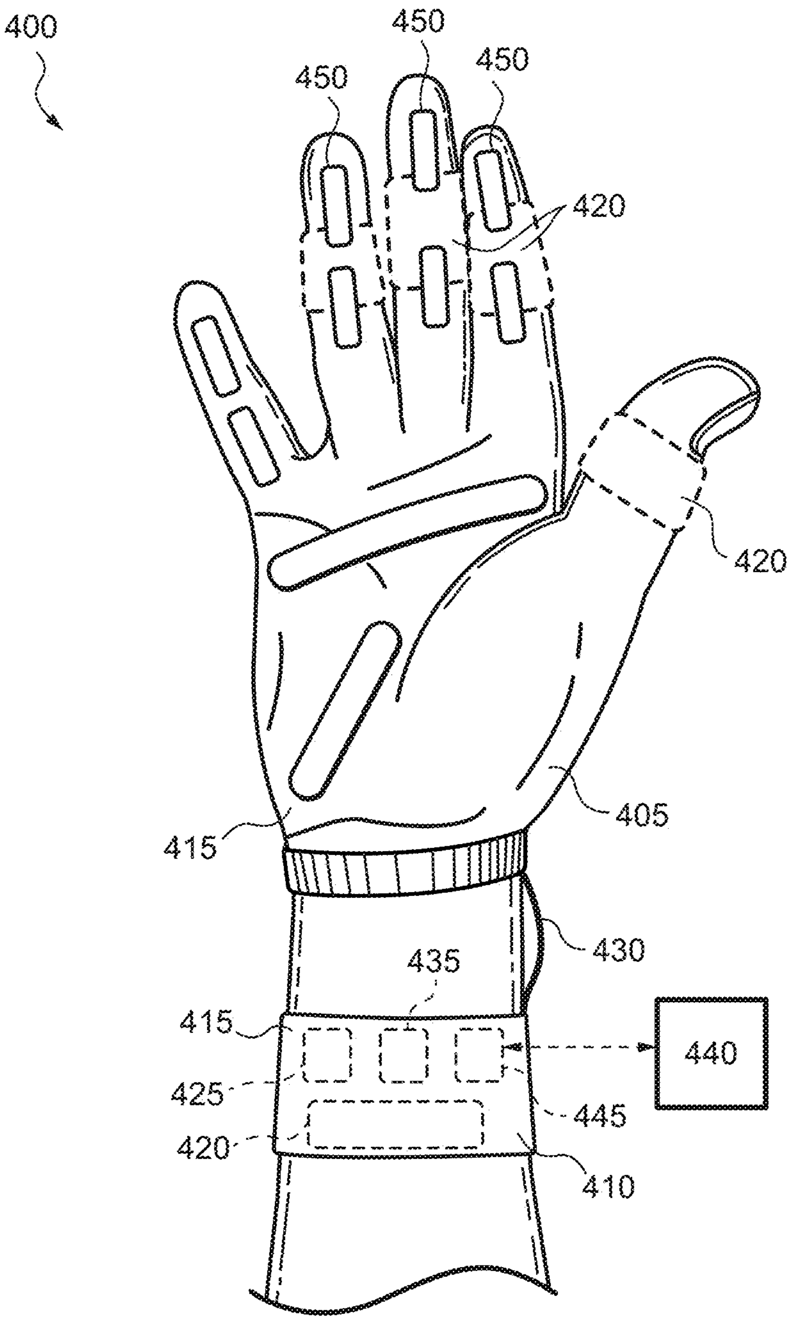
FIG. 4A is an illustration of haptic devices in accordance with various embodiments.

Haptic feedback may be provided by interfaces positioned within a user's environment (e.g., chairs, tables, floors) and/or interfaces on articles that may be worn or carried by a user (e.g., gloves, wristbands). As an example, FIG. 4A illustrates a vibrotactile system 400 in the form of a wearable glove (haptic device 405) and wristband (haptic device 410). Haptic device 405 and haptic device 410 are shown as examples of wearable devices that include a flexible, wearable textile material 415 that is shaped and configured for positioning against a user's hand and wrist, respectively.

This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 420 may be positioned at least partially within one or more corresponding pockets formed in textile material 415 of vibrotactile system 400. Vibrotactile devices 420 may be positioned in locations to provide a vibrating sensation (e.g., haptic feedback) to a user of vibrotactile system 400. For example, vibrotactile devices 420 may be positioned against the user's finger(s), thumb, or wrist, as shown in FIG. 4A. Vibrotactile devices 420 may, in some examples, be sufficiently flexible to conform to or bend with the user's corresponding body part(s).

A power source 425 (e.g., a battery) for applying a voltage to the vibrotactile devices 420 for activation thereof may be electrically coupled to vibrotactile devices 420, such as via conductive wiring 430. In some examples, each of vibrotactile devices 420 may be independently electrically coupled to power source 425 for individual activation. In some embodiments, a processor 435 may be operatively coupled to power source 425 and configured (e.g., programmed) to control activation of vibrotactile devices 420.

Vibrotactile system 400 may be implemented in a variety of ways. In some examples, vibrotactile system 400 may be a standalone system with integral subsystems and components for operation independent of other devices and systems. As another example, vibrotactile system 400 may be configured for interaction with another device or system 440. For example, vibrotactile system 400 may, in some examples, include a communications interface 445 for receiving and/or sending signals to the other device or system 440. The other device or system 440 may be a mobile device, a gaming console, an extended reality (e.g., virtual reality, augmented reality, mixed reality) device, a personal computer, a tablet computer, a network device (e.g., a modem, a router), and a handheld controller. Communications interface 445 may enable communications between vibrotactile system 400 and the other device or system 440 via a wireless (e.g., Wi-Fi, Bluetooth, cellular, radio) link or a wired link. If present, communications interface 445 may be in communication with processor 435, such as to provide a signal to processor 435 to activate or deactivate one or more of the vibrotactile devices 420.

Vibrotactile system 400 may optionally include other subsystems and components, such as touch-sensitive pads 450, pressure sensors, motion sensors, position sensors, lighting elements, and/or user interface elements (e.g., an on/off button, a vibration control element). During use, vibrotactile devices 420 may be configured to be activated for a variety of different reasons, such as in response to the user's interaction with user interface elements, a signal from the motion or position sensors, a signal from the touch-sensitive pads 450, a signal from the pressure sensors, and a signal from the other device or system 440.

Although power source 425, processor 435, and communications interface 445 are illustrated in FIG. 4A as being positioned in haptic device 410, the present disclosure is not so limited. For example, one or more of power source 425, processor 435, or communications interface 445 may be positioned within haptic device 405 or within another wearable textile.

Figure 4B:
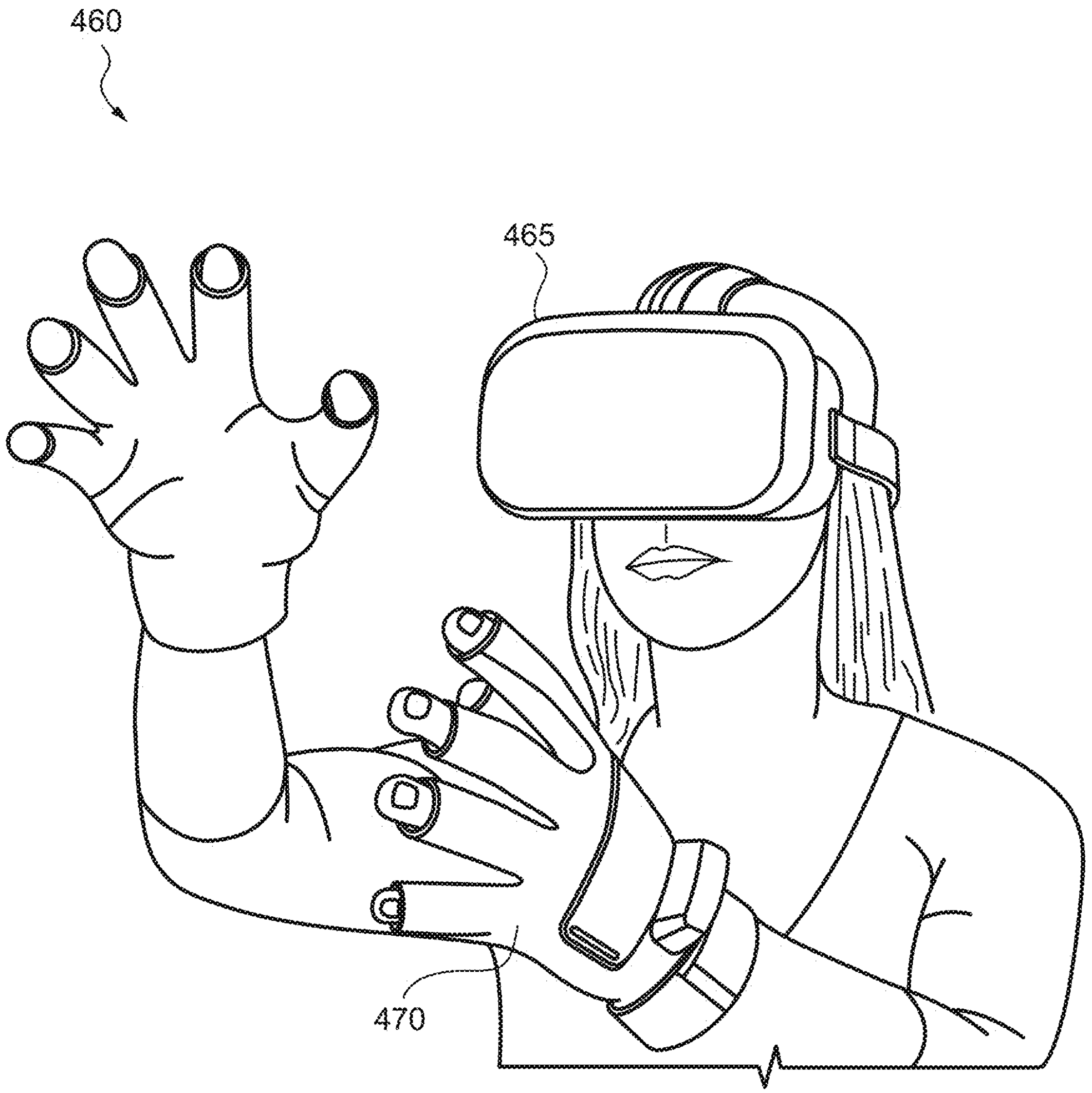
FIG. 4B is an illustration of an exemplary virtual reality environment in accordance with various embodiments.

Haptic wearables, such as those shown in and described in connection with FIG. 4A, may be implemented in a variety of types of extended reality systems and environments. FIG. 4B shows an example extended reality environment 460 including one head-mounted virtual reality display and two haptic devices (e.g., gloves), and in other embodiments any number and/or combination of these components and other components may be included in an extended reality system. For example, in some embodiments, there may be multiple head-mounted displays each having an associated haptic device, with each head-mounted display, and each haptic device communicating with the same console, portable computing device, or other computing system.

Figure 3B:
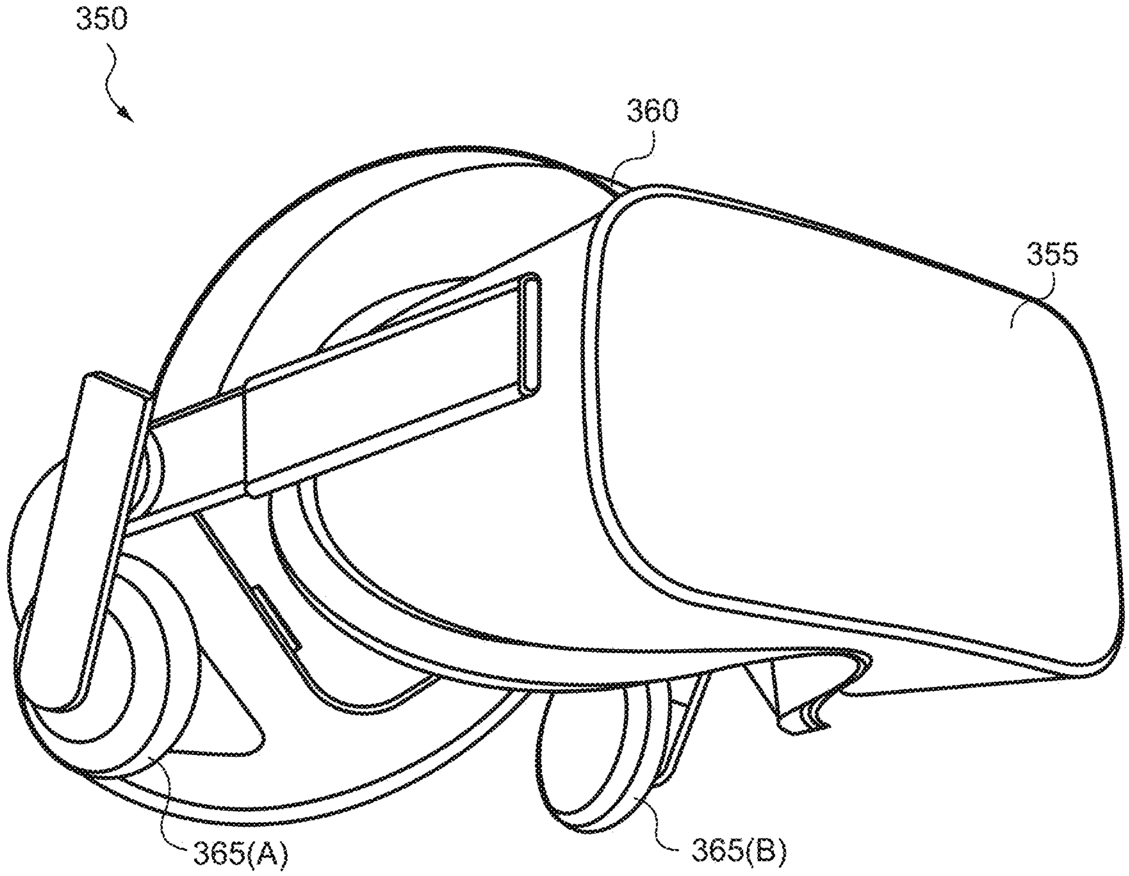
FIG. 3B is an illustration of a virtual reality system in accordance with various embodiments.

HMD 465 generally represents any type or form of virtual reality system, such as virtual reality system 350 in FIG. 3B. Haptic device 470 generally represents any type or form of wearable device, worn by a user of an extended reality system, that provides haptic feedback to the user to give the user the perception that he or she is physically engaging with a virtual object. In some embodiments, haptic device 470 may provide haptic feedback by applying vibration, motion, and/or force to the user. For example, haptic device 470 may limit or augment a user's movement. To give a specific example, haptic device 470 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 470 to send action requests to a console. Examples of action requests include, without limitation, requests to start an application and/or end the application and/or requests to perform a particular action within the application.

Figure 4C:
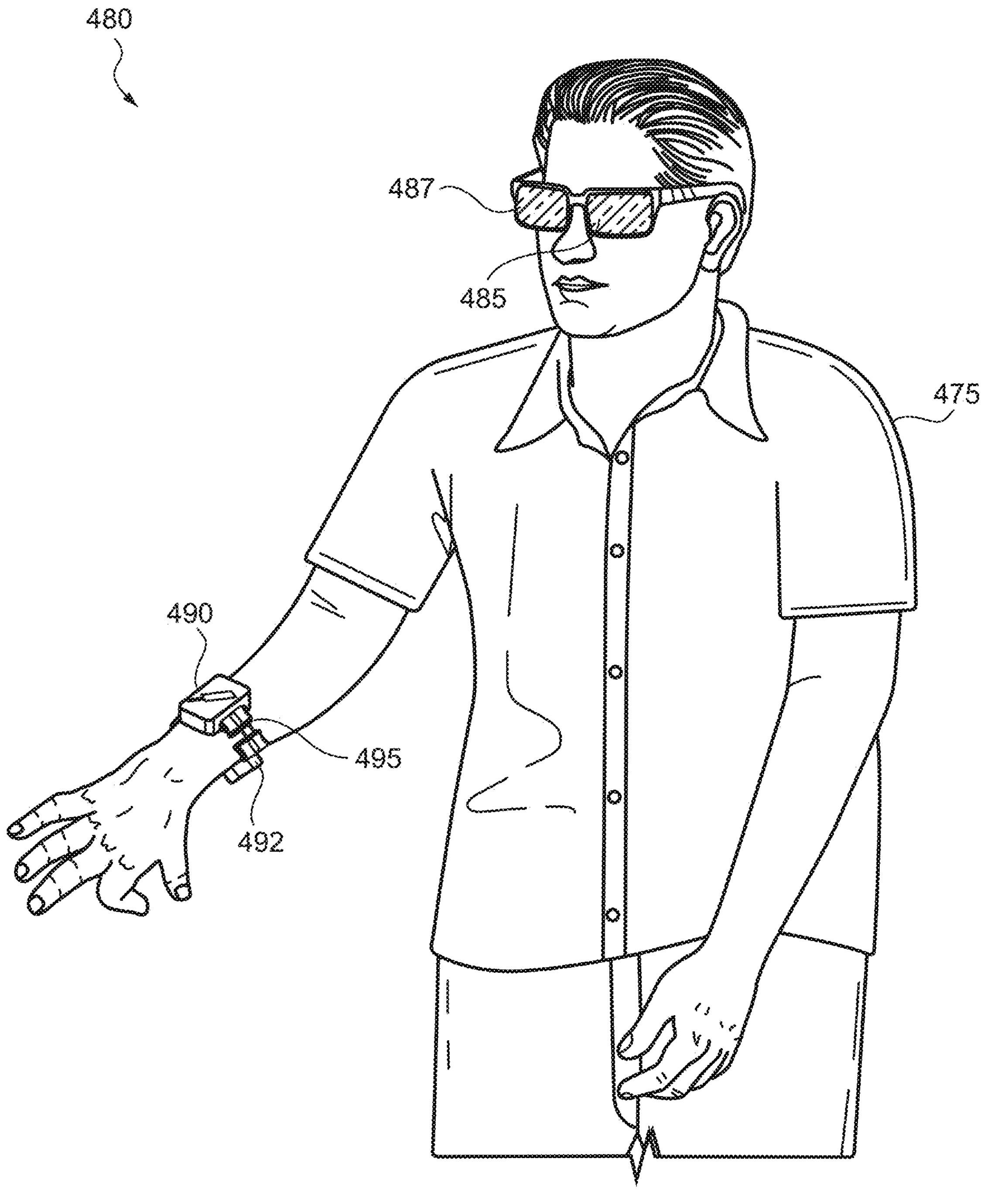
FIG. 4C is an illustration of an exemplary augmented reality environment in accordance with various embodiments.

While haptic interfaces may be used with virtual reality systems, as shown in FIG. 4B, haptic interfaces may also be used with augmented reality systems, as shown in FIG. 4C. FIG. 4C is a perspective view of a user 475 interacting with an augmented reality system 480. In this example, user 475 may wear a pair of augmented reality glasses 485 that may have one or more displays 487 and that are paired with a haptic device 490. In this example, haptic device 490 may be a wristband that includes a plurality of band elements 492 and a tensioning mechanism 495 that connects band elements 492 to one another.

One or more of band elements 492 may include any type or form of actuator suitable for providing haptic feedback. For example, one or more of band elements 492 may be configured to provide one or more of various types of cutaneous feedback, including vibration, force, traction, texture, and/or temperature. To provide such feedback, band elements 492 may include one or more of various types of actuators. In one example, each of band elements 492 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 405, 410, 470, and 490 may include any suitable number and/or type of haptic transducer, sensor, and/or feedback mechanism. For example, haptic devices 405, 410, 470, and 490 may include one or more mechanical transducers, piezoelectric transducers, and/or fluidic transducers. Haptic devices 405, 410, 470, and 490 may also include various combinations of different types and forms of transducers that work together or independently to enhance a user's extended reality experience. In one example, each of band elements 492 of haptic device 490 may include a vibrotactor (e.g., a vibrotactile actuator) configured to vibrate in unison or independently to provide one or more various types of haptic sensations to a user.

CAPs and Authoring of CAPs in General

Extended reality systems can assist users with performance of tasks in simulated and physical environments by providing these users with content such as information about the environments and instructions for performing the tasks. Extended reality systems can also assist users by providing content and/or performing tasks or services for users based on policies and contextual features within the environments. The rules and policies are generally created prior to the content being provided and the tasks being performed. Simulated and physical environments are often dynamic. Additionally, user preferences frequently change, and unforeseen circumstances often arise. While some extended reality systems provide users with interfaces for guiding and/or informing policies, these extended reality systems do not provide users with a means to refine polices after they have been created. As a result, the content provided and tasks performed may not always align with users' current environments or their current activities, which reduces performance and limits broader applicability of extended reality systems. The techniques disclosed herein overcome these challenges and others by providing users of extended reality systems with a means to intuitively author, i.e., create and modify, policies such as CAPs.

Figure 5A:
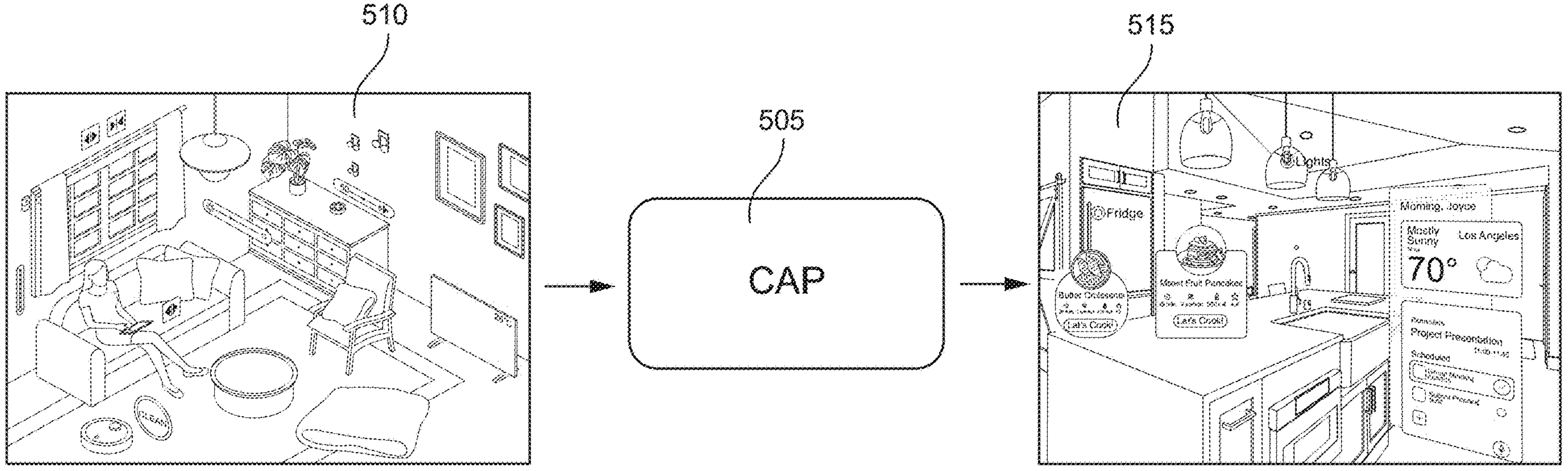

A policy such as a CAP is a core part of a contextually predictive extended reality user interface. As shown in FIG. 5A, a CAP 505 maps the context information 510 (e.g., vision, sounds, location, sensor data, etc.) detected or obtained by the client system (e.g., sensors associated with HMD that is part of client system 105 described with respect to FIG. 1) to the affordances 515 of the client system (e.g., IoT or smart home devices, extended reality applications, or web-based services associated with the client system 105 described with respect to FIG. 1). The CAP 505 is highly personalized and thus each end user should have the ability to author their own policies.

Figure 5B:
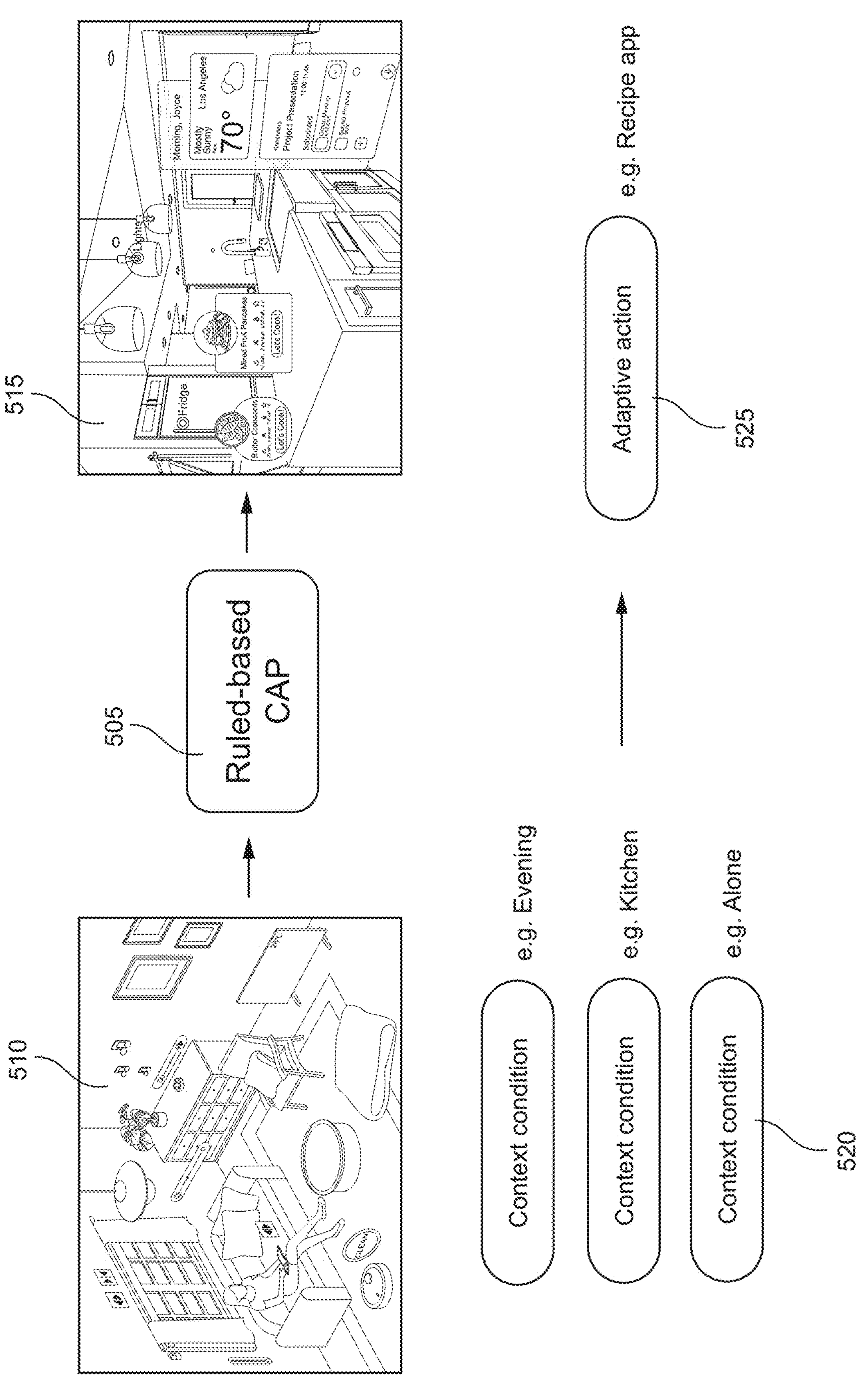
Figure 5C:
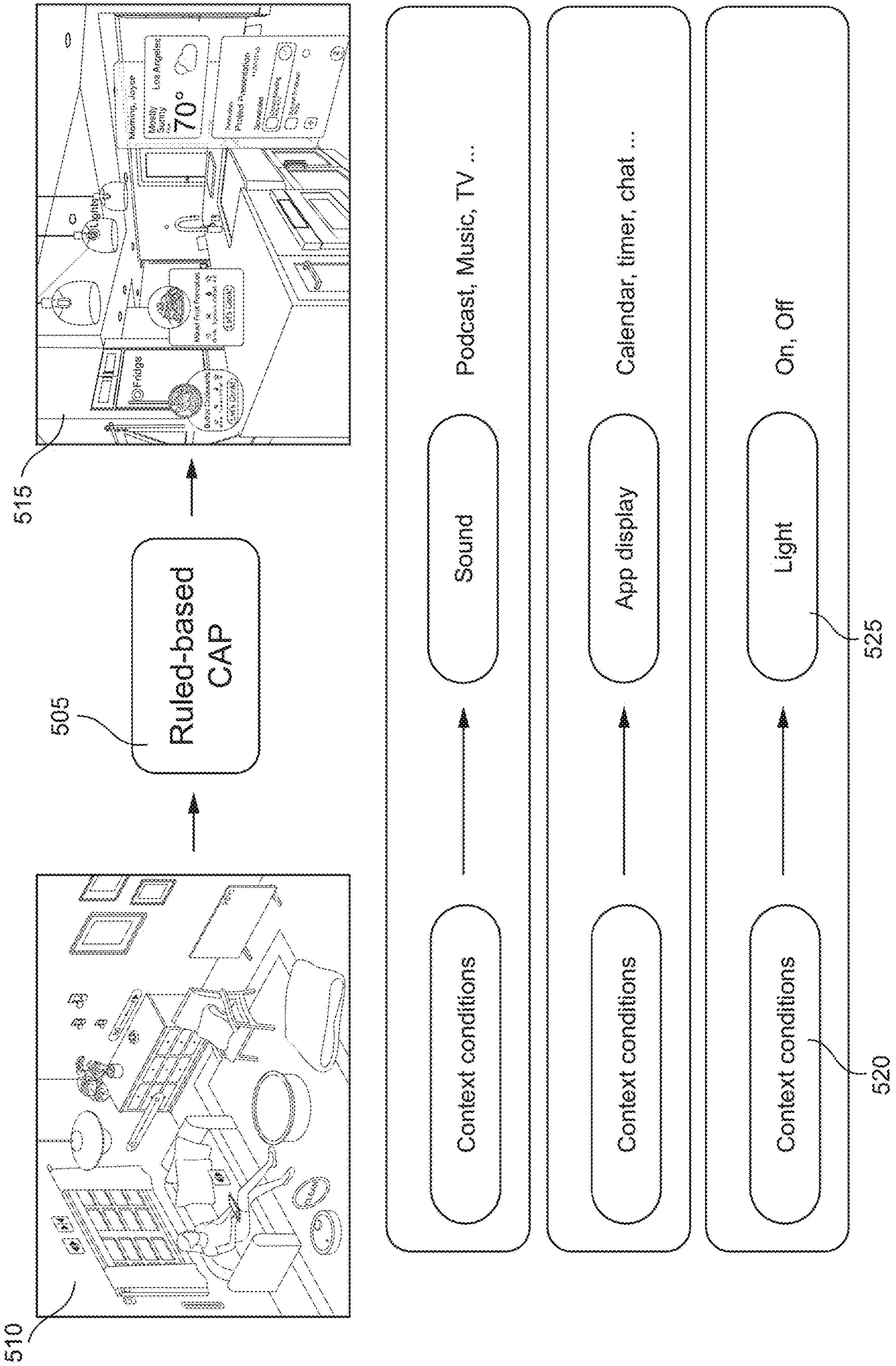

A rule-based CAP is a straightforward choice when considered in the context of end user authoring. As shown in FIG. 5B, a rule for a CAP 505 comprises one or more conditions 520 and one action 525. Once the once or more conditions 520 are met, the one action 525 is triggered. FIG. 5C shows an exemplary CAP scheme whereby each CAP 505 is configured to only control one broad action 525 at a time for affordances 515 (e.g., application display, generation of sound, control of IoT device, etc.). Each CAP 505 controls a set of actions that fall under the broader action 525 and are incompatible with each other. To control multiple things or execute multiple actions together, multiple CAPs 505 can be used. For example, a user can listen to music while checking the email and turning on a light. But the user cannot listen to music and a podcast at the same time. So, for podcast and music, one CAP 505 is configured fro the broader action 525 (sound) to control them.

Figure 5D:
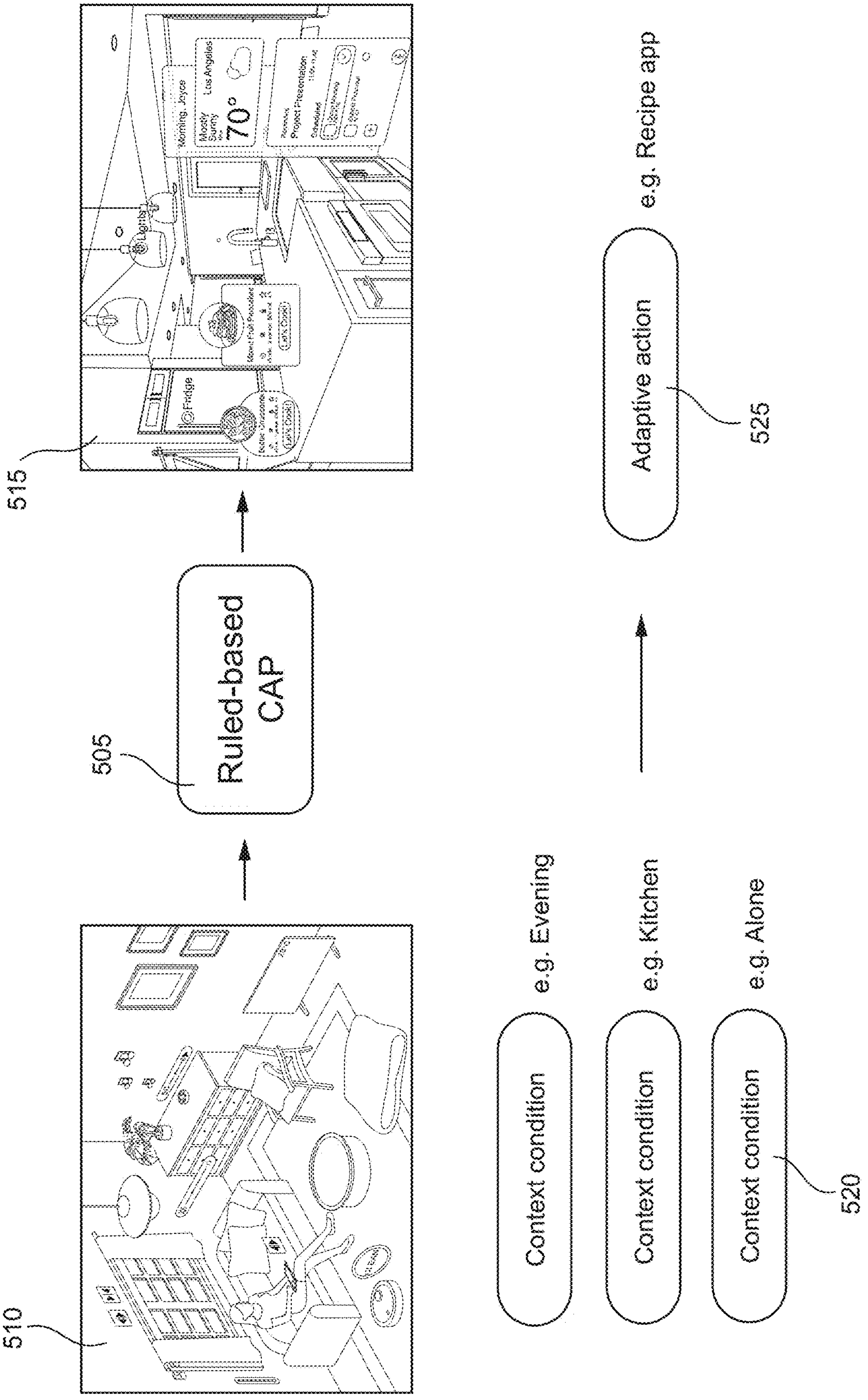
Figure 5E:
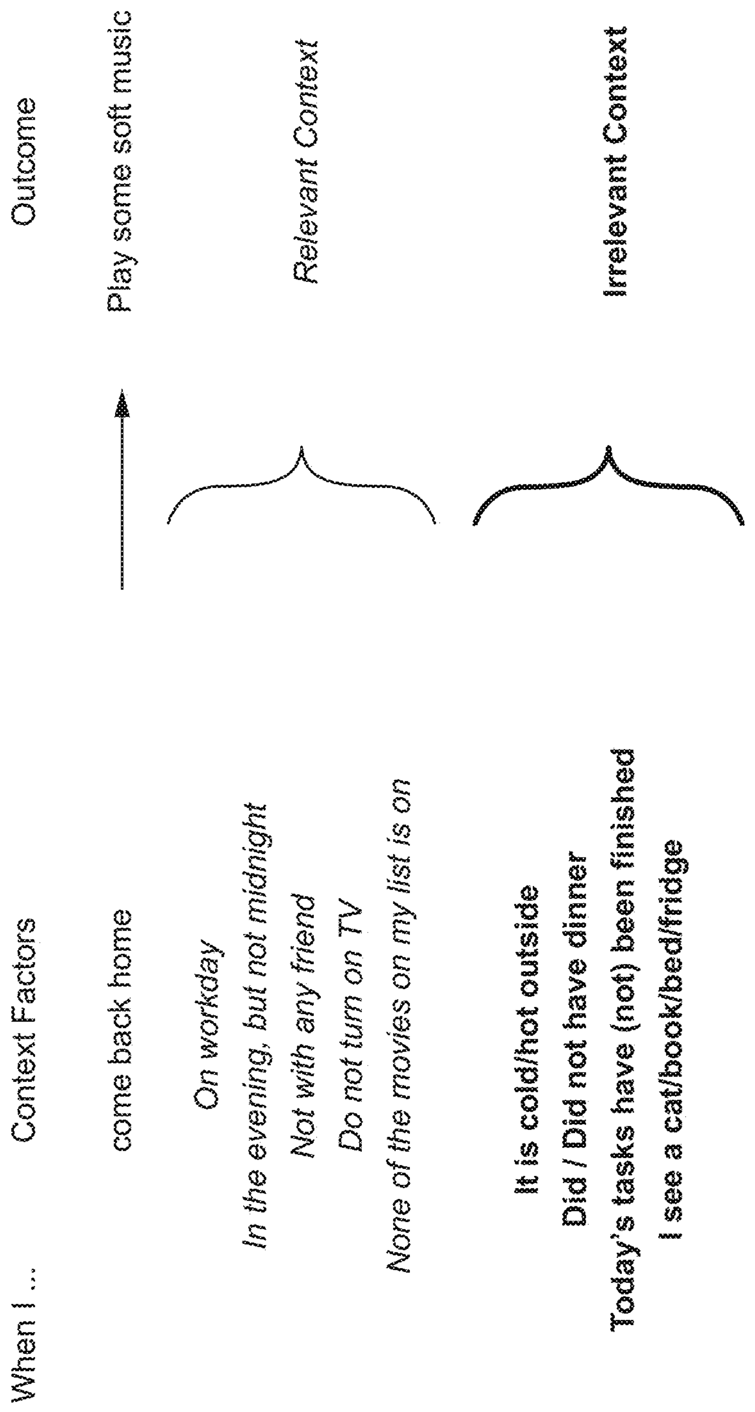
Figure 5F:
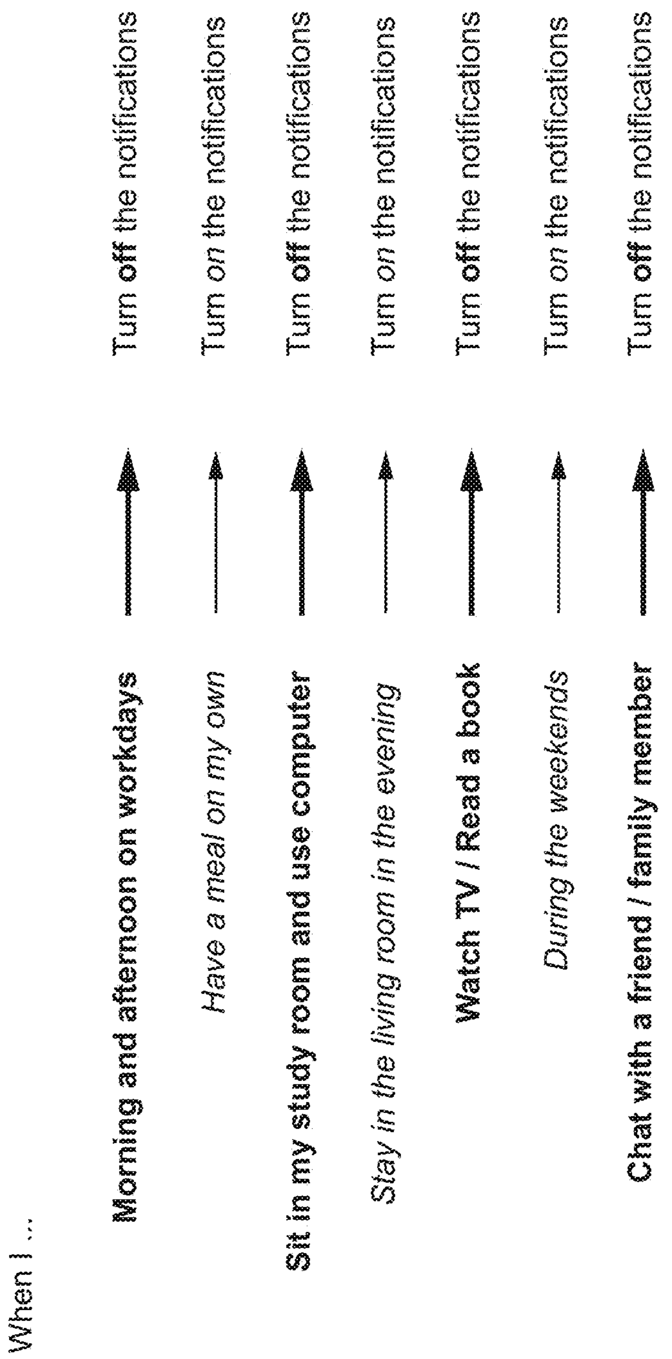

The rule-based CAP is a fairly simple construct readily understood by the users, and the users can create them by selecting some conditions and actions (e.g., via an extended reality or web-based interface). However, as shown in FIGS. 5D, 5E, and 5F, it can be a challenge for users to create good rules that can cover all the relevant context accurately because there may be a lot of conditions that are involved, and the user's preference may change overtime. FIG. 5E shows some examples that demonstrate the complexity of the CAP. For example, when a user wants to create a rule of playing music when arriving back home, but the user did not realize that there are many other relevant contexts like workday, evening, not occupied with others, etc. that needed to be considered when authoring the CAP. Meanwhile there are also many irrelevant contexts like the weather that should not be considered in authoring the CAP.

FIG. 5F shows another example that demonstrates an instance where many rules may be needed for controlling one action such as a social media notification based on various relevant contexts. Some rules override others. The user usually wants to turn off the notifications during the workdays, but the user probably wants to get some social media push when they are having a meal and not meeting with others. Consequently, in some instances a CAP mis authored to comprise multiple rules, and the rules may conflict with each other. As shown in FIG. 5G, in order to address these instances, the rules 530 for a CAP 505 can be placed in a priority queue or list 535. The CAP 505 can be configured such that the extended reality system first checks the rule 530 (1) in the priority queue or list 535 with the highest priority, if that rule fits the current context, the action can be triggered. If not, the extended reality system continues to refer to the rules 530 (2)-(3) in the priority queue or list 535 with lower priority. All the rules 530 together form a decision tree that can handle the complex situations. Meanwhile, any single rule can be added, deleted or changed without influencing others significantly. To author such a CAP 505, the user needs to figure out what rules should be include in the CAP 505, then, the user should maintain the accuracy of the CAP 505 by adjusting the conditions in some rules and adjust the priority of the rules.

Figure 5H:
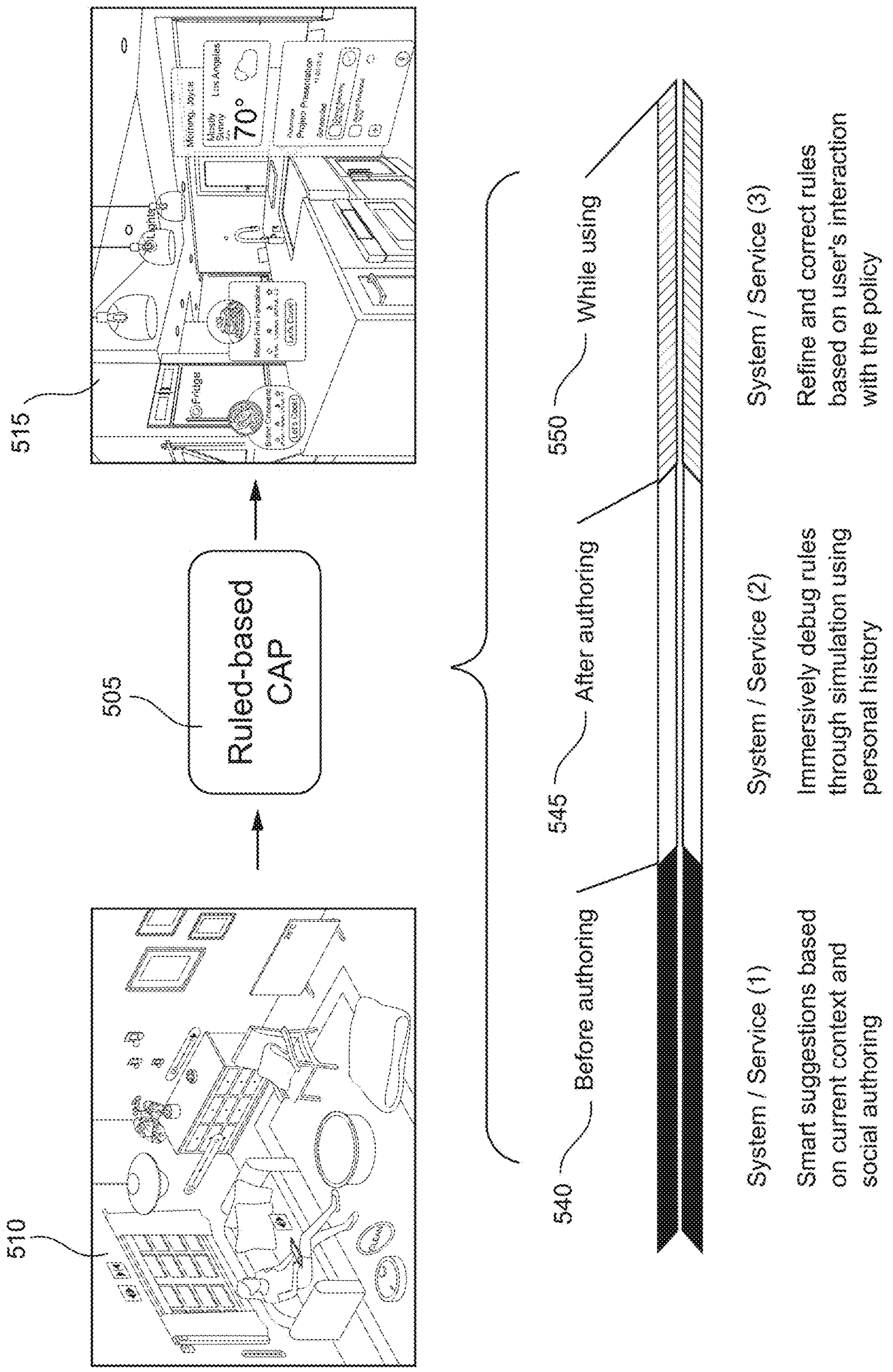

As shown in FIG. 5H, multiple efforts have been developed to assist users to create CAPs. Before the users start authoring, the virtual assistant uses an artificial intelligence-based subsystem/service 540 that provides gives users suggestions about the rules they can author based on a current context. Thereafter, another artificial intelligence-based subsystem/service 545 simulates different context so that users can debug their CAPs immersively. Based on user's interaction, another artificial intelligence-based subsystem/service 550 gives users hints and suggestions to update and refine the CAP. Advantageously, this allows the users create and maintain the CAP model without creating new rules from scratch or paying attention to the complex multi-context/multi-rule CAP.

System for Executing and Authoring CAPs

Figure 6:
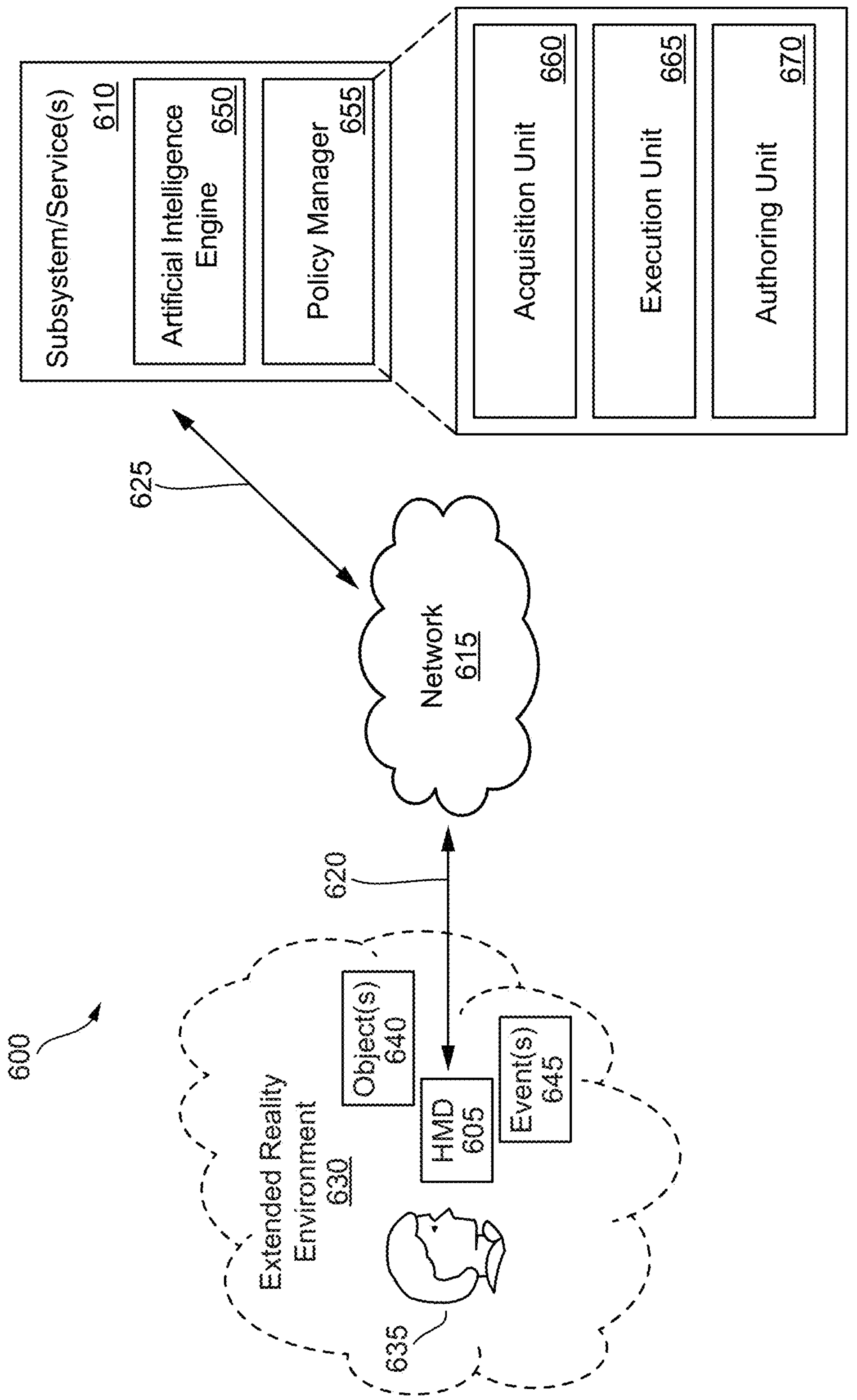
FIG. 6 is a simplified block diagram of a system for executing and authoring policies in accordance with various embodiments.

FIG. 6 is a simplified block diagram of a policy authoring and execution system 600 for authoring policies in accordance with various embodiments. The policy authoring and execution system 600 includes an HMD 605 (e.g., an HMD that is part of client system 105 described with respect to FIG. 1) and one or more extended reality subsystems/services 610 (e.g., a subsystem or service that is part of client system 105, virtual assistant engine 110, and/or remote systems 115 described with respect to FIG. 1). The HMD 605 and subsystems/services 610 are in communication with each via a network 615. The network 615 can be any kind of wired or wireless network that can facilitate communication among components of the policy authoring and execution system 600, as described in detail herein with respect to FIG. 1. For example, the network 615 can facilitate communication between and among the HMD 605 and the subsystems/services 610 using communication links such as communication channels 620, 625. The network 615 can include one or more public networks, one or more private networks, or any combination thereof. For example, the network 615 can be a local area network, a wide area network, the Internet, a Wi-Fi network, a Bluetooth® network, and the like.

The HMD 605 is configured to be operable in an extended reality environment 630 ("environment 630"). The environment 630 can include a user 635 wearing HMD 605, one or more objects 640, and one or more events 645 that can exist and/or occur in the environment 630. The user 635 wearing the HMD 605 can perform one or more activities in the environment 630 such as performing a sequence of actions, interacting with the one or more objects 640, interacting with, initiating, or reacting to the one or more events 645 in the environment 630, interacting with one or more other users, and the like.

The HMD 605 is configured to acquire information about the user 635, one or more objects 640, one or more events 645, and environment 630 and send the information through the communication channel 620, 625 to the subsystems/services 610. In response, the subsystems/services 610 can generate a virtual environment and send the virtual environment to the HMD 605 through the communication channel 620, 625. The HMD 605 is configured to present the virtual environment to the user 635 using one or more displays and/or interfaces of the HMD 605. Content and information associated with the virtual environment can be presented to the user 635 as part of the environment 630. Examples of content include audio, images, video, graphics, Internet-based content (e.g., webpages and application data), user interfaces, and the like.

The HMD 605 is configured with hardware and software to provide an interface that enables the user 635 to view and interact with the content within the environment 630 and author CAPs using a part of or all the techniques disclosed herein. In some embodiments, the HMD 605 can be implemented as the HMD described above with respect to FIG. 2A. Additionally, or alternatively, the HMD 605 can be implemented as an electronic device such as the electronic device 1100 shown in FIG. 11. The foregoing is not intended to be limiting and the HMD 605 can be implemented as any kind of electronic or computing device that can be configured to provide access to one or more interfaces for enabling users to view and interact with the content within environment 630 and author policies using a part of or all the techniques disclosed herein.

The subsystems/services 610 includes an artificial intelligence engine 650 and a policy manager 655. The subsystems/services 610 can include one or more special-purpose or general-purpose processors. Such special-purpose processors can include processors that are specifically designed to perform the functions of the artificial intelligence engine 650 and the policy manager 655. Additionally, the artificial intelligence engine 650 and the policy manager 655 can include one or more special-purpose or general-purpose processors that are specifically designed to perform the functions of those units. Such special-purpose processors may be application-specific integrated circuits (ASICs), field-programmable gate arrays (FPGAs), programmable logic devices (PLDs), and graphic processing units (GPUs), which are general-purpose components that are physically and electrically configured to perform the functions detailed herein. Such general-purpose processors can execute special-purpose software that is stored using one or more non-transitory processor-readable mediums, such as random-access memory (RAM), flash memory, a hard disk drive (HDD), or a solid-state drive (SSD). Further, the functions of the artificial intelligence engine 650 and the policy manager 655 can be implemented using a cloud-computing platform, which is operated by a separate cloud-service provider that executes code and provides storage for clients.

The artificial intelligence engine 650 is configured to receive information about the user 635, one or more objects 640, one or more events 645, environment 630, IoT or smart home devices, and remote systems from the HMD 605 and provide inferences (e.g., object detection or context prediction) concerning the user 635, one or more objects 640, one or more events 645, environment 630, IoT or smart home devices, and remote systems to the HMD 605, the policy manager 655, or another application for the generation and presentation of content to the user 635. In some embodiments, the content can be the extended reality content 225 described above with respect to FIG. 2A. Other examples of content include audio, images, video, graphics, Internet-based content (e.g., webpages and application data), and the like. The subsystems/services 610 is configured to provide an interface (e.g., a graphical user interface) that enables the user 635 to use the HMD 605 to view and interact with the content and within the environment 630 and in some instances author policies using a part of or all the techniques disclosed herein based on the content.

Figure 7:
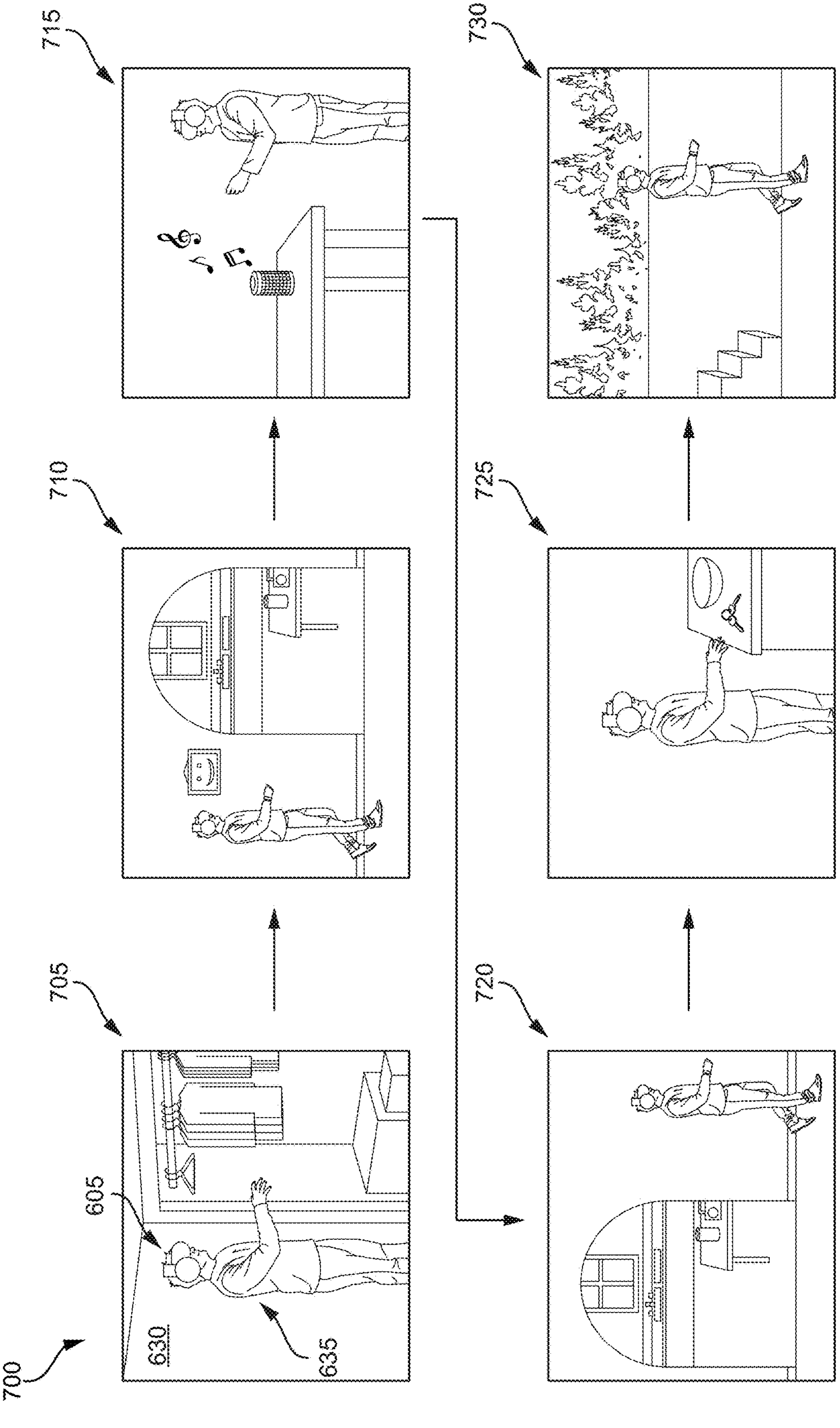
FIG. 7 is an illustration of an exemplary scenario of a user performing an activity in an extended reality environment in accordance with various embodiments.

Policy manager 655 includes an acquisition unit 660, an execution unit 665, and an authoring unit 670. The acquisition unit 660 is configured to acquire context concerning an event 645 or activity within the environment 630. The context is the circumstances that form the setting for an event or activity (e.g., what is the time of day, who is present, what is the location of the event/activity, etc.). An event 645 generally includes anything that takes place or happens within the environment 630. An activity generally includes the user 635 performing an action or sequence of actions in the environment 630 while wearing HMD 605. For example, the user 635 walking along a path while wearing HMD 605. An activity can also generally include the user 635 performing an action or sequence of actions with respect to the one or more objects 640, the one or more events 645, and other users in the environments 530 while wearing HMD 605. For example, the user 635 standing from being seated in a chair and walking into another room while wearing HMD 605. An activity can also include the user 635 interacting with the one or more objects 640, the one or more events 645, other users in the environment 630 while wearing HMD 605. For example, the user 635 organizing books on shelf and talking to a nearby friend while wearing HMD 605. FIG. 7 illustrates an exemplary scenario of a user performing an activity in an environment. As shown in FIG. 7, a user 635 in environment 630 can start a sequence of actions in their bedroom by waking up, putting on HMD 605, and turning on the lights. The user 635 can then, at scene 705, pick out clothes from their closet and get dressed. The user 635 can then, at scenes 710 and 715, walk from their bedroom to the kitchen and turn on the lights and a media playback device (e.g., a stereo receiver, a smart speaker, a television) in the kitchen. The user 635 can then, at scenes 720, 725, and 730, walk from the kitchen to the entrance of their house, pick up their car keys, and leave their house. The context of these events 645 and activities acquired by the acquisition unit 660 may include bedroom, morning, lights, clothes, closet in bedroom, waking up, kitchen, lights, media player, car keys, leaving house, etc.

To recognize and acquire context for an event or activity, the acquisition unit 660 is configured to collect data from HMD 605 while the user is wearing HMD 605. The data can represent characteristics of the environment 630, user 635, one or more objects 640, one or more events 645, and other users. In some embodiments, the data can be collected using one or more sensors of HMD 605 such as the one or more sensors 215 as described with respect to FIG. 2A. For example, the one or more sensors 215 can capture images, video, and/or audio of the user 635, one or more objects 640, and one or more events 645 in the environment 630 and send image, video, and/or audio information corresponding to the images, video, and audio through the communication channel 620, 625 to the subsystems/services 610. The acquisition unit 660 can be configured to receive the image, video, and audio information and can format the information into one or more formats suitable for suitable for image recognition processing, video recognition processing, audio recognition processing, and the like.

The acquisition unit 660 can be configured to start collecting the data from HMD 605 when HMD 605 is powered on and when the user 635 puts HMD 605 on and stop collecting the data from HMD 605 when either HMD 605 is powered off or the user 635 takes HMD 605 off. For example, at the start of an activity, the user 635 can power on or put on HMD 605 and, at the end of an activity, the user 635 can power down or take off HMD 605. The acquisition unit 660 can also be configured to start collecting the data from HMD 605 and stop collecting the data from HMD 605 in response to one or more natural language statements, gazes, and/or gestures made by the user 635 while wearing HMD 605. In some embodiments, the acquisition unit 660 can monitor HMD 605 for one or more natural language statements, gazes, and/or gestures made by the user 635 while the user 635 is interacting within environment 630 that reflect a user's desire for data to be collected (e.g., when a new activity is being learned or recognized) and/or for data to stop being collected (e.g., after an activity has been or recognized). For example, while the user 635 is interacting within environment 630, the user 635 can utter the phrase "I'm going to start my morning weekday routine" and "My morning weekday routine has been demonstrated" and HMD 605 can respectively start and/or stop the collecting the data in response thereto.

In some embodiments, the acquisition unit 660 is configured to determine whether the user 635 has permitted the acquisition unit 660 to collect data. For example, the acquisition unit 660 can be configured to present a data collection authorization message to the user 635 on HMD 605 and request the user's 635 permission for the acquisition unit 660 to collect the data. The data collection authorization message can serve to inform the user 635 of what types or kinds of data that can be collected, how and when that data will be collected, and how that data will be used by the policy authoring and execution system and/or third parties. In some embodiments, the user 635 can authorize data collection and/or deny data collection authorization using one or more natural language statements, gazes, and/or gestures made by the user 635. In some embodiments, the acquisition unit 660 can request the user's 635 authorization on a periodic basis (e.g., once a month, whenever software is updated, and the like).

The acquisition unit 660 is further configured to use the collected data to recognize an event 645 or activity performed by the user 635. To recognize an event or activity, the acquisition unit 660 is configured to recognize characteristics of the activity. The characteristics of the activity include but are not limited to: i. the actions or sequences of actions performed by the user 635 in the environment 630 while performing the activity; ii. the actions or sequences of actions performed by the user 635 with respect to the one or more objects 640, the one or more events 645, and other users in the environment 630 while performing the activity; and iii. the interactions between the user 635 and the one or more objects 640, the one or more events 645, and other users in the environment 630 while performing the activity. The characteristics of the activity can also include context of the activity such as times and/or time frames and a location and/or locations in which the activity was performed by the user 635.

In some embodiments, the acquisition unit 660 can be configured to recognize and acquire the characteristics or context of the activity using one or more recognition algorithms such as image recognition algorithms, video recognition algorithms, semantic segmentation algorithms, instance segmentation algorithms, human activity recognition algorithms, audio recognition algorithms, speech recognition algorithms, event recognition algorithms, and the like. Additionally, or alternatively, the acquisition unit 660 can be configured to recognize and acquire the characteristics or context of the activity using one or more machine learning models (e.g., neural networks, generative networks, discriminative networks, transformer networks, and the like) via the artificial intelligence engine 650. The one or more machine learning models may be trained to detect and recognize characteristics or context. In some embodiments, the one or more machine learning models include one or more pre-trained models such as models in the GluonCV and GluonNLP toolkits. In some embodiments, the one or more machine learning models can be trained based on unlabeled and/or labeled training data. For example, the training data can include data representing characteristics or context of previously recognized activities, the data used to recognize those activities, and labels identifying those characteristics or context. The one or more machine learning models can be trained and/or fine-tuned using one or more training and fine-tuning techniques such as unsupervised learning, semi-supervised learning, supervised learning, reinforcement learning, and the like. In some embodiments, training and fine-tuning the one or more machine learning models can include optimizing the one or more machine learning models using one or more optimization techniques such as back-propagation, Adam optimization, and the like. The foregoing implementations are not intended to be limiting and other arrangements are possible.

The acquisition unit 660 may be further configured to generate and store data structures for characteristics, context, events, and activities that have been acquired and/or recognized. The acquisition unit 660 can be configured to generate and store a data structure for the characteristics, context, events, and activities that have been acquired and/or recognized. A data structure for a characteristic, context, event, or activity can include an identifier that identifies the characteristic, context, event, or activity and information about the characteristic, context, event, or activity. In some embodiments, the data structure can be stored in a data store (not shown) of the subsystems/services 610. In some embodiments, the data structure can be organized in the data store by identifiers of the data structures stored in the data store. For example, the identifiers for the data structures stored in the data store can be included in a look-up table, which can point to the various locations where the data structures are stored in the data store. In this way, upon selection of an identifier in the look-up table, the data structure corresponding to the identifier can be retrieved, and the information stored in the activity data structure can be used for further processing such as for policy authoring and execution as described below.

The execution unit 665 is configured to execute policies based on the data acquired by the acquisition unit 660. The execution unit 665 may be configured to start executing policies when HMD 605 is powered on and when the user 635 puts HMD 605 on and stop executing policies when either HMD 605 is powered off or the user 635 takes HMD 605 off. For example, at the start of an activity or the day, the user 635 can power on or put on HMD 605 and, at the end of an activity or day, the user 635 can power down or take off HMD 605. The execution unit 665 can also be configured to start and stop executing policies in response to one or more natural language statements, gazes, and/or gestures made by the user 635 while wearing HMD 605. In some embodiments, the execution unit 665 can monitor HMD 605 for one or more natural language statements, gazes, and/or gestures made by the user 635 while the user 635 is interacting within environment 630 that reflect user's desire for the HMD 605 to start and stop executing policies (e.g., the user 635 performs a gesture that indicates the user's desire for HMD 605 to start executing policies and subsequent gesture at a later time that indicates the user's desire for HMD 605 to stop executing policies) and/or for a policy to stop being executed (e.g., the user 635 performs another gesture that indicates that the user 635 has just finished a routine).

The execution unit 665 is configured to execute policies by determining whether the current characteristics or context acquired by the acquisition unit 660 satisfies or match the one or more conditions of a policy or rule. For example, the execution unit 665 is configured to determine whether the current characteristics or context of activity performed by the user 635 in the environment 630 satisfy/match the one or more conditions of a CAP. In another example, the execution unit 665 is configured to determine whether the current characteristics or context of activity performed by the user 635 with respect to the one or more objects 640, the one or more events 645, and other users in the environment 630 satisfy/match the one or more conditions of a CAP. The satisfaction or match can be a complete satisfaction or match or a substantially complete satisfaction or match. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

Once it is determined that the characteristics or context acquired by the acquisition unit 660 satisfy or match the one or more conditions of a policy or rule, the execution unit 665 is further configured to cause the client system (e.g., virtual assistant) to execute one or more actions for the policy or rule in which one or more conditions have been satisfied or matched. For example, the execution unit 665 is configured to determine that one or more conditions of a policy have been satisfied or matched by characteristics acquired by the acquisition unit 660 and cause the client system to perform one or more actions of the policy. The execution unit 665 is configured to cause the client system to execute the one or more actions by communicating the one or more actions for execution to the client system. For example, the execution unit 665 can be configured to cause the client system to provide content to the user 635 using a display screen and/or one or more sensory devices of the HMD 605. In another example, and continuing with the exemplary scenario of FIG. 7, the execution unit 665 can determine that the user 635 has satisfied a condition of a CAP by entering and turning on the lights in the kitchen and causes the client system to provide an automation such as causing the HMD 605 to display a breakfast recipe to the user 635.

The authoring unit 670 is configured to allow for the authoring of policies or rules such as CAPs. The authoring unit 670 is configured to author policies by facilitating the creation of policies (e.g., via an extend reality or web-based interface), simulation of policy performance, evaluation of policy performance, and refinement of policies based on simulation and/or evaluation of policy performance. To evaluate policy performance, the authoring unit 670 is configured to collect feedback from the user 635 for policies executed by the execution unit 665 or simulated by the authoring unit 670. The feedback can be collected passively, actively, and/or a combination thereof. In some embodiments, the feedback can represent that the user 635 agrees with the automation and/or is otherwise satisfied with the policy (i.e., a true positive state). The feedback can also represent that the user 635 disagrees with the automation and/or is otherwise dissatisfied with the policy (i.e., a false positive state). The feedback can also represent that the automation is opposite of the user's 635 desire (i.e., a true negative state). The feedback can also represent that the user 635 agrees that an automation should not be performed (i.e., a false negative state).

The authoring unit 670 is configured to passively collect feedback by monitoring the user's 635 reaction or reactions to performance and/or non-performance of an automation of the policy by the client system during execution of the policy. For example, and continuing with the exemplary scenario of FIG. 7, the execution unit 665 can cause the HMD 605 to display a breakfast recipe to the user 635 in response to determining that the user 635 has entered and turned on the lights in the kitchen. In response, the user 635 can express dissatisfaction with the automation by canceling the display of the breakfast recipe, giving a negative facial expression when the breakfast recipe is displayed, and the like. In another example, the user 635 can express satisfaction with the automation by leaving the recipe displayed, uttering the phase "I like the recipe," and the like.

The authoring unit 670 is configured to actively collect feedback by requesting feedback from the user 635 while a policy is executing, or the execution is being simulated. The authoring unit 670 is configured to request feedback from the user 635 by generating a feedback user interface and presenting the feedback user interface on a display of HMD 605. In some embodiments, the feedback user interface can include a textual and/or visual description of the policy and one or more automations of the policy that have been performed by the client system and a set of selectable icons. In some embodiments, the set of selectable icons can include an icon which when selected by the user 635 represents that the user 635 agrees with the one or more automations of the policy (e.g., an icon depicting a face having a smiling facial expression), an icon which when selected by the user 635 represents that the user 635 neither agrees nor disagrees (i.e., neutral) with the one or more automations of the policy (e.g., an icon depicting a face having a neutral facial expression), and an icon which when selected by the user 635 represents that the user 635 disagrees with the one or more automations (e.g., an icon depicting a face having a negative facial expression). Upon presenting the feedback user interface on the display of the HMD 605, the authoring unit 670 can be configured to determine whether the user 635 has selected an icon by determining whether the user 635 has made one or more natural language utterances, gazes, and/or gestures that indicate the user's 635 sentiment towards one particular icon. For example, upon viewing the feedback user interface, the user 635 can perform a thumbs up gesture and the authoring unit 670 can determine that the user 635 has selected the icon which represents the user's 635 agreement with the one or more automations of the policy. In another example, upon viewing the feedback user interface, the user 635 may utter a phrase "ugh" and the authoring unit 670 can determine that the user 635 has selected the icon which represents that the user 635 neither agrees nor disagrees with the one or more automations.

The authoring unit 670 is configured to determine context (also referred to herein as context factors) associated with the feedback while the authoring unit 670 is collecting feedback from the user 635. A context factor, as used herein, generally refers to conditions and characteristics of the environment 630 and/or one or more objects 640, the one or more events 645, and other users that exist and/or occur in the environment 630 while a policy is executing. A context factor can also refer to a time and/or times frames and a location or locations in which the feedback is being collected from the user 635. For example, the context factors can include a time frame during which feedback was collected for a policy, a location where the user 635 was located when the feedback was collected, an indication of the automation performed, an indication of the user's 635 feedback, and an indication of whether the user's 635 feedback reflects an agreement and/or disagreement with the automation.

The authoring unit 670 is configured to generate a feedback table in a data store (not shown) of the subsystems/services 610 for policies executed or simulated by the execution unit 665 or authoring unit 670. The feedback table stored the context evaluated for execution or simulation of the policy, the action triggered by the execution or simulation of the policy, and the feedback provided by the user in reaction to the action triggered by the execution or simulation of the policy. More specifically, the feedback table can be generated to include rows representing instances when the policy was executed and columns representing the context, actions, and the feedback for each execution instance. For example, and continuing with the exemplary scenario of FIG. 7, for a policy that causes the HMD 605 to display information regarding the weather for the day to the user 635, the authoring unit 670 can store, for an execution instance of the policy, context that include a time frame between 8-10 AM or morning and a location that is the user's home or bedroom, an indication that the policy caused the HMD 605 to perform the action—display weather information, and feedback comprising an indication that the user 635 selected an icon representative of the user's agreement with the automation (e.g., an icon depicting a face having a smiling facial expression).

The authoring unit 670 is configured to evaluate performance of a policy based on the information (i.e., context, action, and feedback) in the feedback table. In some instances, the authoring unit 670 is configured to evaluate performance of a policy using an association rule learning algorithm. To evaluate performance of a policy, the authoring unit 670 is configured to calculate and compare the performance of a policy using the metrics of support and confidence. Support is the subset of the dataset within the feedback table where that the policy has been correct ((conditions→Action)=N(Factors, Action). The frequency that the rule has been correct. The confidence is the certainty that the context will lead to the correct action ((conditions→Action)=N(Factors, Action)/N(Factors)). To calculate the confidence, the authoring unit 670 is configured to: i. determine a number of execution instances of the policy; ii. determine a number of execution instances for the policy in which the context factors of the respective execution instances match the context factors of the execution instances of the policy included in the support set; iii. divide the first number i by the second number ii; and iv. express the results of the division as a percentage.

The authoring unit 670 is configured to determine that a policy is eligible for refinement when the confidence for the existing policy is below a predetermined confidence threshold. In some embodiments, the predetermined confidence threshold is any value between 50% and 100%. The authoring unit 670 is configured to refine the policy when the authoring unit 670 determines that the policy is eligible for refinement. A policy refinement, as used herein, refers to a modification of at least one condition or action of the policy.

To refine a policy, the authoring unit 670 is configured to generate a set of replacement policies for the policy and determine which replacement policy included in the set of replacement policies can serve as a candidate replacement policy for replacing the policy that is eligible for replacement. The authoring unit 670 is configured to generate a set of replacement policies for the policy by applying a set of policy refinements to the existing policy. The authoring unit 670 is configured to apply a set of policy refinements to the existing policy by selecting a refinement from a set of refinements and modifying the existing policy according to the selected refinement. The set of refinements can include but is not limited to changing an automation, changing a condition, changing an arrangement of conditions (e.g., first condition and second condition to first condition or second condition), adding a condition, and removing a condition. For example, for a policy that causes the client system to turn on the lights when the user 635 is at home at 12 PM (i.e., noon), the authoring unit 670 can generate a replacement policy that modifies the existing policy to cause the client system to turn off the lights rather than turn them on. In another example, for the same policy, the authoring unit 670 can generate a replacement policy that modifies the existing policy to cause the client system to turn on the lights when the user 635 is at home at night rather than at noon, turn on the lights when the user 635 is home at night or at noon, or turn on the lights when the user 635 is at home, in the kitchen, at noon, turn on the lights when the user 635 is simply at home, and the like. In a further example, for the same policy, the authoring unit 670 can generate a replacement policy that causes the client system to turn off the lights and a media playback device when the user 635 is not at home in the morning. In some embodiments, rather than applying a policy refinement to the existing policy, the authoring unit 670 can be configured to generate a new replacement policy and add the generated new replacement policy to the set of replacement policies. In some embodiments, at least one characteristic of the generated new replacement policy (e.g., a condition or automation) is the same as at least one characteristic of the existing policy. In some embodiments, rather than generating a set of replacement policies for the existing policy and determining which replacement policy of the set of replacement policies should replace the existing policy, the authoring unit 670 can be configured to remove and/or otherwise disable the policy (e.g., by deleting, erasing, overwriting, etc., the policy data structure for the policy stored in the data store).

The authoring unit 670 is configured to determine which replacement policy included in the set of replacement policies for an existing policy can serve as a candidate replacement policy for replacing the existing policy. The authoring unit 670 is configured to determine the candidate replacement policy by extracting a replacement support for each replacement policy included in the set of replacement policies from the feedback table for the existing policy and calculating a replacement confidence for each replacement support. The authoring unit 670 is configured to extract a replacement support for a replacement policy by identifying rows of the feedback table for the existing policy in which the user's 635 feedback indicates an agreement with an automation included in the replacement policy and extracting the context factors for each row that is identified. In some embodiments, the authoring unit 670 is configured to prune the replacement support for the replacement policy by comparing the replacement support to the extracted support for the existing policy (see discussion above) and removing any execution instances included in the replacement support that are not included in the support for the existing policy. To calculate a replacement confidence for a replacement support, the authoring unit 670 is configured to: i. determine a number of execution instances of the existing policy included in the respective replacement support (i.e., a first number); ii. determine a number of execution instances of the existing policy in which the context of the respective execution instances match the context of the execution instances of the policy included in the replacement support (i.e., a second number); iii. divide the first number by the second number; and iv. express the results of the division as a percentage. The authoring unit 670 is configured to determine that a replacement policy included in the set of replacement policies can serve as a candidate replacement policy if the replacement confidence for the respective replacement policy is greater than the confidence for the existing policy (see discussion above).

The authoring unit 670 is configured to determine a candidate replacement policy for each policy executed by the execution unit 528 and present the candidate replacement policies to the user 635. The authoring unit 670 is configured to present candidate replacement policies to the user 635 by generating a refinement user interface and presenting the refinement user interface on a display of HMD 605. In some embodiments, the refinement user interface can include a textual and/or visual description of the candidate replacement policies and an option to manually refine the policies. For example, for a policy that causes the extended reality system 500 to turn on the lights when the user 635 is at home at 12 PM (i.e., noon), the authoring unit 670 can determine a replacement policy that causes the client system to turn off the lights under the same conditions to be a suitable candidate replacement policy and can present the candidate replacement policy to the user 635 in a refinement user interface 700 using a textual and visual description 702 of the candidate replacement policy and an option 704 to manually refine the candidate replacement policy. Upon presenting the refinement user interface on the display of the HMD 605, the authoring unit 670 can be configured to determine whether the user 635 has accepted or approved the candidate replacement policy or indicated a desire manually refine the policy. For example, the authoring unit 670 can be configured to determine whether the user 635 has made one or more natural language utterances, gazes, and/or gestures that are indicative of the user sentiment towards candidate replacement policy and/or the option to manually refine the policy. In some embodiments, upon selecting the manual refinement option, the authoring unit 670 can be configured to generate a manual refinement user interface for manually refining the policy. The manual refinement user interface can include one or more selectable buttons representing options for manually refining the policy. In some embodiments, the authoring unit 670 can be configured to provide suggestions for refining the policy. In this case, the authoring unit 670 can derive the suggestions from characteristics of the replacement policies in the set of replacement policies for the existing policy. For example, a manual refinement user interface 706 can include a set of selectable buttons that represent options for modifying the policy and one or more suggestions for refining the candidate replacement policy. In some embodiments, the authoring unit 670 can be configured to present the refinement user interface on the display of the HMD 605 for a policy when the policy fails (e.g., by failing to detect the satisfaction of a condition and/or by failing to perform an automation). In other embodiments, the authoring unit 670 can be configured to present the refinement user interface on the display of the HMD 605 whenever a candidate replacement policy is determined for the existing policy. In some embodiments, rather than obtaining input from the user 635, the authoring unit 670 can be configured to automatically generate a replacement policy for an existing policy without input from the user 635.

The authoring unit 670 is configured to replace the existing policy with the candidate replacement policy approved, manually refined, and/or otherwise accepted by the user 635. The authoring unit 670 is configured to replace the existing policy by replacing the policy data structure for the existing policy stored in the data store with a replacement policy data structure for the replacement policy. In some embodiments, when a policy has been replaced, the authoring unit 670 is configured to discard the feedback table for the policy and store collected feedback for the replacement policy in a feedback table for the replacement policy. In this way, policies can continuously be refined based on collected feedback.

Using the techniques described herein, policies can be modified in real-time based on the users' experiences in dynamically changing environments. Rules and policies under which extended reality systems provide content and assist users with performing tasks are generally created prior to the content being provided and the tasks being performed. As such, the content provided and tasks performed do not always align with users' current environments and activities, which reduces performance and limits broader applicability of extended reality systems. Using the policy refinement techniques described herein, these challenges and others can be overcome.

Generating And Modifying Policies with an AI Platform

Figure 8:
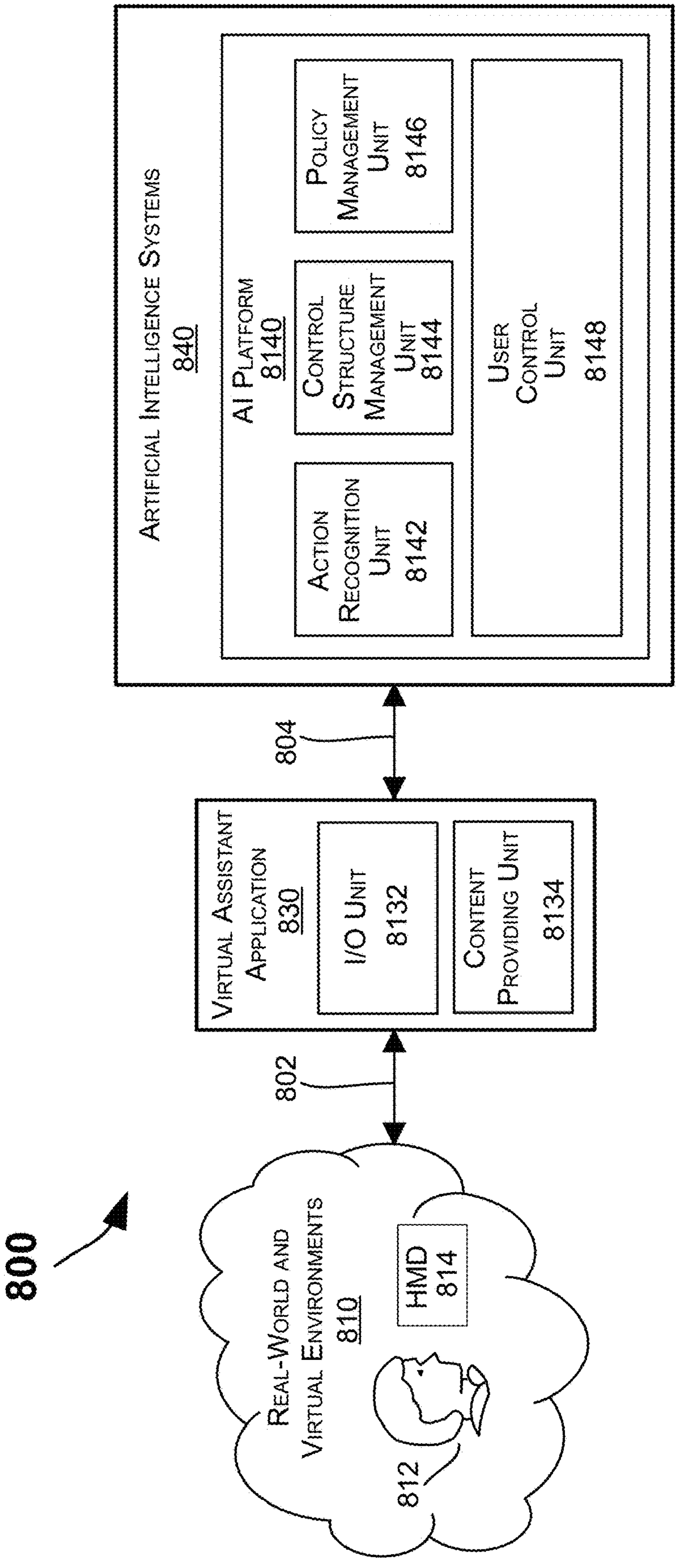
FIG. 8 is an illustration of an extended reality system for generating and modifying policies with an artificial intelligence (AI) platform based on user activities in accordance with various embodiments.

FIG. 8 illustrates an embodiment of an extended reality system 800. As shown in FIG. 8, the extended reality system 800 includes real-world and virtual environments 810, a virtual assistant application 830, and AI systems 840. In some embodiments, the extended reality system 800 forms part of a network environment, such as the network environment 100 described above with respect to FIG. 1. Real-world and virtual environments 810 include a user 812 performing activities while wearing HMD 814. The virtual environment of the real-world and virtual environments 810 is provided by the HMD 814. For example, the HMD 814 may generate the virtual environment. In some embodiments, the virtual environment of the real-world and virtual environments 810 may be provided by another device. The virtual environment may be generated based on data received from the virtual assistant application 830 through a first communication channel 802. The HMD 814 can be configured to monitor the real-world and virtual environments 810 to obtain information about the user 812 and the environments 810 and send that information through the first communication channel 802 to the virtual assistant application 830. The HMD 814 can also be configured to receive content and information through the first communication channel 802 and present that content to the user 812 while the user 812 is performing activities in the real-world and virtual environments 810. In some embodiments, the first communication channel 802 can be implemented as links 125 as described above with respect to FIG. 1.

Figure 14:
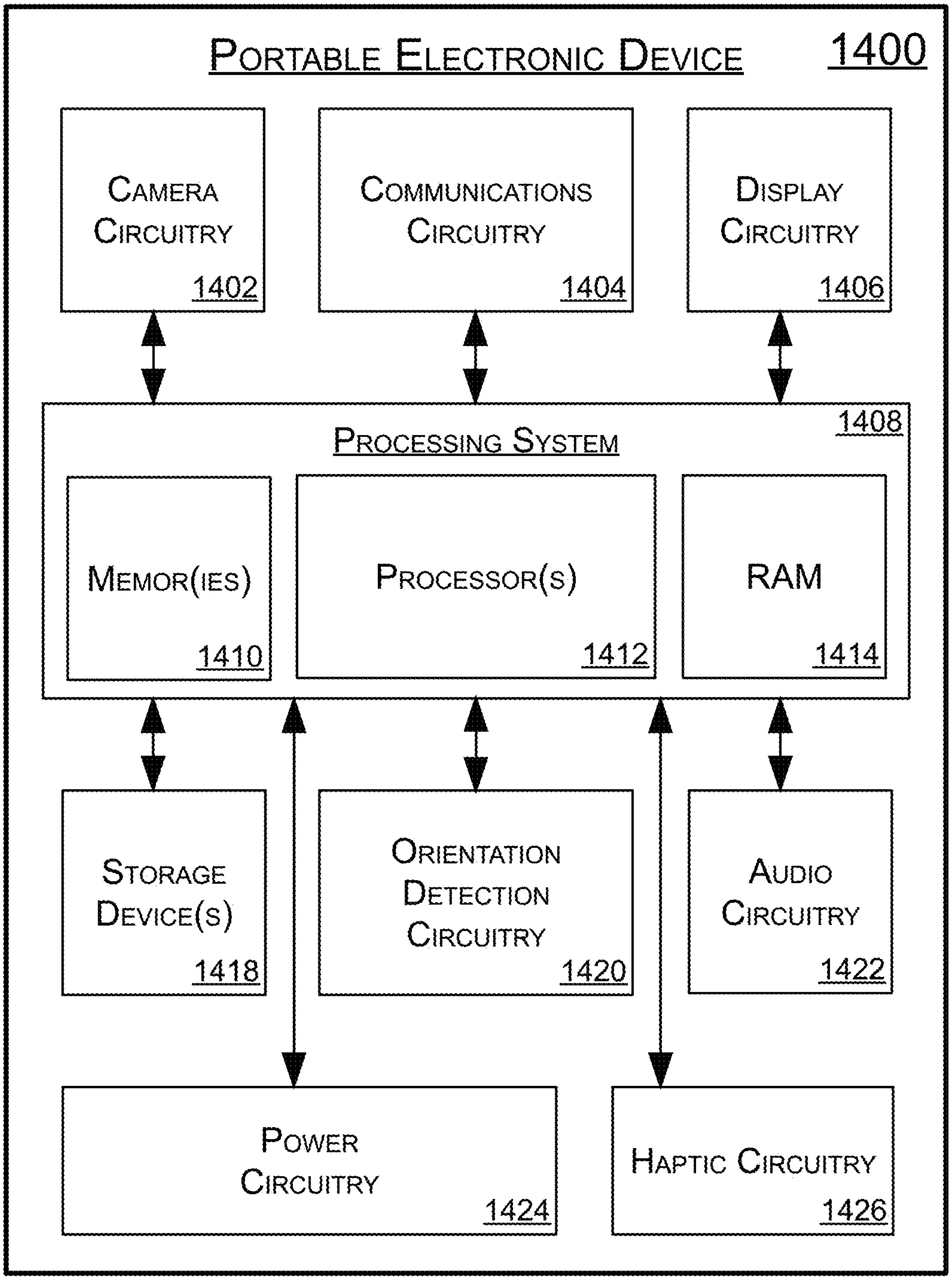
FIG. 14 is an illustration of an electronic device in accordance with various embodiments.

In some embodiments, the user 812 may perform activities while holding or wearing a computing device in addition to HMD 814 or instead of HMD 814. The computing device can be configured to monitor the user's activities and present content to the user in response to those activities. The computing device may be implemented as any device described above or the portable electronic device 1400 as shown in FIG. 14. In some embodiments, the computing device may be implemented as a wearable device (e.g., a head-mounted device, smart eyeglasses, smart watch, and smart clothing), communication device (e.g., a smart, cellular, mobile, wireless, portable, and/or radio telephone), and/or portable computing device (e.g., a tablet, phablet, notebook, and laptop computer; and a personal digital assistant). The foregoing implementations are not intended to be limiting and the computing device may be any kind of electronic device that is configured to provide an extended reality system using a part of all of the methods disclosed herein.

The virtual assistant application 830 may be configured to provide an interface between the real-world and virtual environments 810. In some embodiments, the virtual assistant application 830 may be configured as virtual assistant application 130 described above with respect to FIG. 1. The virtual assistant application 830 may be incorporated in a client system, such as client system 105 as described above with respect to FIG. 1. In some embodiments, the virtual assistant application 830 may be incorporated in HMD 814. In this case, the first communication channel 802 may be a communication channel within the HMD 814. In some embodiments, the virtual assistant application 830 is configured as a software application. In other embodiments, the virtual assistant application 830 is configured with hardware and software that enable the virtual assistant application 830 to provide the interface between the real-world and virtual environments 810. In further embodiments, the virtual assistant application 830 includes one or more special-purpose or general-purpose processors. Such special-purpose processors may include processors that are specifically designed to perform the functions of the virtual assistant application 830.

The virtual assistant application 830 includes an input/output (I/O) unit 8132 and a content-providing unit 8134. The I/O unit 8132 is configured to receive the information about the user 812 and the environments 810 from the HMD 814 through the first communication channel 802. In some embodiments, the I/O unit 8132 may be configured to receive information about the user 812 and the real-world environment of environments 810 from one or more sensors, such as the one or more sensors 215 as described above with respect to FIG. 2A or other communication channels. The I/O unit 8132 is further configured to format the information into a format suitable for other system components (e.g., AI systems 840). In some embodiments, the information about the user 812 and the environments 810 is received as raw sensory data and the I/O unit 8132 may be configured to format the raw sensory data into formats for suitable further processing, such as image data for image recognition, audio data for natural language processing, and the like. The I/O unit 8132 is further configured to send the formatted information through the second communication channel 804 to AI systems 840.

The content-providing unit 8134 is configured to provide content to the HMD 814 for presentation to the user 812. In some embodiments, the content-providing unit 8134 may be configured to provide content to one or more other devices. In some embodiments, the content may be the extended reality content 225 described above with respect to FIG. 2A and/or one or more policies generated and/or modified by AI systems 840 as described below. In some embodiments, the content may be other content, such as audio, images, video, graphics, Internet-based content (e.g., webpages and application data), and the like. The content may be received from AI systems 840 through the second communication channel 804. In some embodiments, the content may be received from other communication channels. In some embodiments, the content provided by the content-providing unit 8134 may be content received from AI systems 840 and content received from other sources.

AI systems 840 may be configured to enable the extended reality system 800 to fine-tune an AI platform based on user activities. In some embodiments, the AI systems 840 may be configured as AI systems 140 described above with respect to FIG. 1. The AI systems 840 may be incorporated in a virtual assistant engine, such as virtual assistant engine 110 as described above with respect to FIG. 1. In some embodiments, the AI systems 840 may be incorporated in HMD 814. In some embodiments, the AI systems 840 is configured as a software application. In other embodiments, the AI systems 840 is configured with hardware and software that enable the AI systems 840 to enable the extended reality system 800 to fine-tune an AI platform based on user activities. In further embodiments, the AI systems 840 include one or more special-purpose or general-purpose processors. Such special-purpose processors may include processors that are specifically designed to perform the functions of the AI systems 840. In other embodiments, processing performed by the AI systems 840 may be distributed across a plurality of computing devices, such as a distributed computing network, a data center, or a cloud computing system.

In some embodiments, the AI systems 840 may be implemented in a computing device, such as any of the devices described above or the portable electronic device 1400 as shown in FIG. 14. In some embodiments, the computing device may be implemented as a wearable device (e.g., a head-mounted device, smart eyeglasses, smart watch, and smart clothing), communication device (e.g., a smart, cellular, mobile, wireless, portable, and/or radio telephone), and/or portable computing device (e.g., a tablet, phablet, notebook, and laptop computer; and a personal digital assistant). The foregoing implementations are not intended to be limiting and the computing device may be any kind of electronic device that is configured to provide an extended reality system using a part of all of the methods disclosed herein.

AI systems 840 includes an AI platform 8140, which is a machine-learning-based system that is configured to be fine-tuned based on user activities. The AI platform 8140 includes an action recognition unit 8142, a control structure management unit 8144, a policy management unit 8146, and a user control unit 8148. The AI platform 8140 may include one or more special-purpose or general-purpose processors. Such special-purpose processors may include processors that are specifically designed to perform the functions of the action recognition unit 8142, the control structure management unit 8144, the policy management unit 8146, and the user control unit 8148. Additionally, each of the action recognition unit 8142, the control structure management unit 8144, the policy management unit 8146, and the user control unit 8148 may include one or more special-purpose or general-purpose processors that are specifically designed to perform the functions of those units. Such special-purpose processors may be application-specific integrated circuits (ASICs) or field-programmable gate arrays (FPGAs) which are general-purpose components that are physically and electrically configured to perform the functions detailed herein. Such general-purpose processors may execute special-purpose software that is stored using one or more non-transitory processor-readable mediums, such as random-access memory (RAM), flash memory, a hard disk drive (HDD), or a solid-state drive (SSD). Further, the functions of the components of the AI platform 8140 can be implemented using a cloud-computing platform, which is operated by a separate cloud-service provider that executes code and provides storage for clients.

The action recognition unit 8142 is configured to recognize actions performed by the user 812 while the user 812 is interacting with and within the environments 810. For example, the user 812 wearing HMD 814 may perform one or more activities (e.g., walking around the house, exercising) in a real-world environment of the environments 810 and may perform one or more activities (e.g., learn a new task, read a book) in a virtual environment of the environments 810. In some embodiments, the action recognition unit 8142 is configured to recognize other events occurring (e.g., ambient sounds, ambient light, other users) in the environments 810. The action recognition unit 8142 is configured to recognize actions and other events using information acquired by HMD 814 and/or one or more sensors, such as the one or more sensors 215 as described with respect to FIG. 2A. For example, HMD 814 and the one or more sensors obtain information about the user 812 and the environments 810 and send that information through the first communication channel 802 to the virtual assistant application 830. The I/O unit 8132 of virtual assistant application 830 is configured to receive that information and format the information into a format suitable for AI systems 840. In some embodiments, the I/O unit 8132 may be configured to format the information into formats for suitable further processing, such as image data for image recognition, audio data for natural language processing, and the like. The I/O unit 8132 is further configured to send the formatted information through the second communication channel 804 to AI systems 840.

In some embodiments, in order to recognize actions, the action recognition unit 8142 is configured to collect data that includes characteristics of activities performed by the user 812 and recognize actions corresponding to those activities using one or more action recognition algorithms such as the pre-trained models in the GluonCV toolkit and one or more natural language processing algorithms such as the pre-trained models in the GluonNLP toolkit. In some embodiments, in order to recognize other events, the action recognition unit 8142 is configured to collect data that includes characteristics of other events occurring in the environments 810 and recognize those events using one or more image recognition algorithms such as semantic segmentation and instance segmentation algorithms, one or more audio recognition algorithms such as a speech recognition algorithm, and one or more event detection algorithms.

In some embodiments, the action recognition unit 8142 includes one or more machine learning models (e.g., neural networks, support vector machines, and/or classifiers) that are trained to detect and recognize actions performed by the user 812 while the user 812 is interacting with and within the environments 810 and objects and events occurring in environments 810 while the user 812 is interacting with and within the environments 810. The action recognition unit 8142 can be trained to recognize actions based on training data. The training data can include characteristics of previously recognized actions (e.g., historical actions or policies). In some embodiments, the one or more machine-learning models can be trained by applying supervised learning or semi-supervised learning using training data that includes labeled observations, where each labeled observation includes an action with various characteristics correlated to other actions with similar characteristics. In some embodiments, the one or more machine learning models may be fine-tuned based on activities performed by the user 812 while interacting with and within environments 810.

The action recognition unit 8142 is configured to recognize actions performed by the user 812 and group those actions into one or more activity groups. Each of the one or more activity groups may be stored in a respective activity group data structure that includes the actions of the respective activity group. Each activity group data structure may be stored in one or more memories (not shown) or storage devices (not shown) for the AI systems 840. In some embodiments, the action recognition unit 812 groups actions using one or more clustering algorithms such as a k-means clustering algorithm and a mean-shift clustering algorithm. For example, the user 812 in environments 810 may wake up in their bedroom every day at 6:30 AM after sleeping and put on HMD 814. Subsequently, the user 812 may perform a sequence of actions while wearing HMD 814. For example, the user 812 may get dressed in their bedroom immediately after waking, walk from the bedroom to the kitchen immediately after getting dressed, and stay there until their commute to work (e.g., at 8 AM). Upon entering the kitchen, the user 812 may turn on the lights, make coffee, and turn on a media playback device (e.g., a stereo receiver, a smart speaker, a television). While drinking coffee, the user 812 may check email, and read the news. Upon leaving the kitchen, the user 812 may check traffic for the commute to work. The action recognition unit 8142 is configured to detect, recognize, and learn this sequence of actions and group the actions of this sequence of actions into a group such as morning activity group. In some embodiments, the action recognition unit 8142 is configured to learn and adjust model parameters based on the learned sequence of actions and corresponding group.

The control structure management unit 8144 is configured to predict control structures based on the learned and adjusted model parameters. A control structure includes one or more actions selected from a group of actions (e.g., actions in the activity group) and one or more conditional statements for executing the one or more actions. The control structure management unit 8144 is configured to predict a control structure for each activity group determined by the action recognition unit 8142. In some embodiments, the control structure management unit 8144 includes one or more machine learning models (e.g., neural networks, support vector machines, and/or classifiers) that are trained to predict control structures. The control structure management unit 8144 can be trained to predict control structures based on training data that includes characteristics of previously determined activity groups (e.g., historical activity groups) and previously predicted control structures (e.g., historical control structures). In some embodiments, the one or more machine-learning models can be trained by applying supervised learning or semi-supervised learning using training data that includes labeled observations, where each labeled observation includes a control structure having conditional statements for executing various actions. In some embodiments, the one or more machine learning models may be fine-tuned based on activities performed by the user 812 while interacting with and within environments 810.

In order to predict a control structure, the control structure management unit 8144 is configured to select an activity group determined by the action recognition unit 8142 and analyze the characteristics of the actions (e.g., historical actions or policies) of the selected activity group and/or the characteristics of other events occurring in environments 810 while the actions were being performed to determine conditions in which those actions were executed. For example, and continuing with the example described above, for a morning activity group that includes actions such as putting on the HMD 814, getting dressed, walking to a different room, turning on the lights, making coffee, turning on a media playback device, checking email, reading the news, and checking traffic, the control structure management unit 8144 may analyze the characteristics of these actions and/or the characteristics of other environmental events occurring while these actions are being performed to determine the conditions in which these actions are performed. In this example, the control structure management unit 8144 can determine that the conditions include the user being in the user's bedroom and kitchen every day between the hours of 6:30-8 AM; dressing in the bedroom before entering the kitchen; turning on the lights, playing music, and making coffee upon entering the kitchen; drinking coffee while checking email and reading the news; and checking traffic upon exiting the kitchen.

The control structure management unit 8144 is further configured to predict one or more conditional statements for executing the one or more actions by associating respective actions with the determined conditions and generating one or more conditional statements for the determined associations. For example, and continuing with the example described above, the control structure management unit 8144 can associate the user being in the user's bedroom between the 6:30-7 AM with the user getting dressed to go to work and generate a corresponding conditional statement (e.g., conditional statement: if the user is in the user's bedroom between 6:30-7 AM, then clothes for getting dressed in should be determined). The control structure management unit 8144 can associate the user entering the user's kitchen between 6:45-7:30 AM after the user is dressed with setting the mood and generate a corresponding conditional statement (e.g., conditional statement: if the user enters the user's kitchen between 6:45-7:30 AM and turns on the lights, then music should be selected and played and a coffee recipe should be identified). The control structure management unit 8144 can associate the user drinking coffee in the user's kitchen between 7:15-8 AM with being informed and generate a corresponding conditional statement (e.g., conditional statement: if the user drinks coffee in the user's kitchen between 7:15-8 AM, then present email and today's news). The control structure management unit 8144 can associate the user exiting the user's kitchen between 7:45-8:15 AM with leaving for work and generate a corresponding conditional statement (e.g., conditional statement: if the user exits the user's kitchen between 7:45-8:15 AM, then present traffic along the user's route, an expected time of arrival at the office, and expected weather during the commute).

The control structure management unit 8144 is further configured to group the one or more conditional statements for each activity group into a control structure for that activity group. The control structure may be stored in a respective control structure data structure that includes one or more actions and one or more conditional statements for executing the one or more actions. Each control structure data structure may be stored in one or more memories (not shown) or storage devices (not shown) for the AI systems 840.

The policy management unit 8146 is configured to generate and execute new policies and/or modify pre-existing policies based on predicted control structures. A policy refers to a set of actions executed by extended reality system 800 in response to satisfaction of one or more conditions. In order to generate a new policy and/or modify a pre-existing policy, the policy management unit 8146 is configured to select one or more control structures (i.e., a subset of control structures) from the control structures predicted by the control structure management unit 8144 and generate a new policy and/or modify a pre-existing policy for each selected control structure. In some embodiments, the policy management unit 8146 may select the one or more control structures based on certain criteria (e.g., selecting control structures that are generated within a particular period of time such as the last two weeks, selecting every other control structure, etc.). In some embodiments, the policy management unit 8146 may randomly select the one or more control structures. In other embodiments, the user 812 may select the one or more control structures.

The policy management unit 8146 is further configured to select one or more conditional statements from each selected control structure. In some embodiments, the policy management unit 8146 may select the one or more conditional statements based on certain criteria (e.g., selecting the first three conditional statements included in the selected control structure, selecting the last three conditional statements included in the selected control structure, selecting every other conditional statement included in the selected control structure, etc.). In some embodiments, the policy management unit 8146 may randomly select the one or more conditional statements. In other embodiments, the user 812 may select the one or more conditional statements. For example, and continuing with the example described above, in order to generate a new policy, the control structure for the morning activity group may be selected and a first conditional statement (e.g., if the user is in the user's bedroom between 6:30-7 AM, then clothes for getting dressed in should be determined) and a second conditional statement (e.g., if the user enters the user's kitchen between 6:45-7:30 AM and turns on the lights in the kitchen, then music should be selected and played and a coffee recipe should be identified) may be selected from the selected control structure.

The policy management unit 8146 is further configured to determine which action or actions should be taken in response to one or more conditions of the selected one or more conditional statements being satisfied. For example, and continuing with the example described above, for the first conditional statement, the policy management unit 8146 is configured to determine the action or actions that should be taken in response to the conditions of the first conditional statement being satisfied (e.g., the user being in the user's bedroom between 6:30-7 AM). Similarly, the policy management unit 8146 is configured to determine the action or actions that should be taken in response to the conditions of the second statement being satisfied (e.g., the user entering the user's kitchen between 6:45-7:30 AM and turning on the lights in the kitchen).

In some embodiments, the policy management unit 8146 is configured to determine which action or actions should be taken in response to one or more conditions of the selected one or more conditional statements based on one or more machine learning models. In some embodiments, the policy management unit 8146 includes one or more machine learning models (e.g., neural networks, support vector machines, and/or classifiers) that are trained to determine actions for generating and/or modifying pre-existing policies. The one or more machine learning models can be trained to determine actions based on training data that includes characteristics of previously determined policies (i.e., historical policies). For examples, the training data can include data representing historical policies, including data representing the conditional statements of the historical policies, data representing the conditions of the conditional statements, and data representing the actions that were taken in response to the conditions of the conditional statements being satisfied. In some embodiments, the one or more machine-learning models can be trained by applying supervised learning or semi-supervised learning using training data that includes labeled observations, where each labeled observation includes a policy having one or more selected conditional statements, one or more conditions for each of the one or more selected conditional statements, and or more actions that were taken in response to each condition of the one or more conditions being satisfied. In some embodiments, the one or more machine learning models may be fine-tuned based on activities performed by the user 812 while interacting with and within environments 810.

For example, and continuing with the example described above, for the first conditional statement, the one or more machine learning models of the policy management unit 8146 may be configured to determine that the action that is to be taken in response to the user being in the user's bedroom between 6:30-7 AM is to present a visual style guide with the latest fashions to the user 812 on a display of the HMD 814. Similarly, the one or more machine learning models of the policy management unit 8146 may be configured to determine that the actions that are to be taken in response the user entering the user's kitchen between 6:45-7:30 AM and turning on the lights in the kitchen are to present a music playlist to the user 812 on the display of the HMD 814, play music from the music playlist through speakers of the HMD 814, and present a recipe for making coffee on the display of the HMD 814.

In some embodiments, the policy management unit 8146 generates the policy and/or modifies the pre-existing policy when a control structure is predicted. For example, the control structure management unit 8144 may alert the policy management unit 8146 that a control structure has been predicted and the policy management unit 8146 may then generate a policy and/or modify a pre-existing policy based on the predicted control structure. In some embodiments, the policy management unit 8146 generates the policy and/or modifies the pre-existing policy upon request by the user 812. In some embodiments, using one or more natural language statements, gazes, and/or gestures, the user 812 may interact with HMD 814 and request for one or more policies to be generated. For example, after the user 812 performs actions in the environments 810, the user 812 may request for the HMD 814 to determine if enough actions have been performed to predict a control structure and to generate a policy and/or modify the pre-existing policy from the control structure. In some embodiments, policy management unit 8146 is configured to generate a policy and/or modify a pre-existing policy from more than one control structure. For example, the policy management unit 8146 may select conditional statements from different control structures and generate a policy and/or modify a pre-existing policy having conditional statements and corresponding actions from those different control structures. In this way, a new policy may be generated and/or a pre-existing policy may be modified based on various sequences of actions performed by the user 812 interacting with and within the environments 810.

The policy management unit 8146 is further configured to execute a generated policy and/or a modified pre-existing policy when the user 812 wears HMD 814 and interacts with and within environments 810. In some embodiments, the policy management unit 8146 executes one or more policies when a user, such as the user 812, puts on a device, such as HMD 814. In some embodiments, the policy management unit 8146 executes one or more policies when the policy management unit 8146 generates the one or more policies and/or modifies the one or more policies. For example, the policy management unit 8146 may execute a policy when the interactions of the user 812 wearing HMD 814 with and within environments 810 prompts the control structure management unit 8144 to predict a control structure and/or modify a control structure. In some embodiments, the policy management unit 8146 may execute a policy upon request by the user 812. For example, using one or more natural language statements, gazes, and/or gestures, the user 812 may interact with HMD 814 and request for one or more policies to be executed. In this case, upon user request, HMD 814 may present the user 812 with a list of policies that have been generated and/or modified and the user 812 may interact with HMD 814 to select one or more policies for execution. In some embodiments, the policy management unit 8146 is configured to execute more than one policy at a time. For example, the policy management unit 8146 may select multiple policies from generated and/or modified policies and execute those policies concurrently and/or sequentially.

In some embodiments, the policy management unit 8146 is configured to execute a generated and/or modified pre-existing policy by obtaining recognized actions and other events from the action recognition unit 8142 while the user 812 is interacting with and within environments 810, determining whether any of the recognized actions and other events satisfy any conditions of any conditional statements in any stored policy, and executing the actions that correspond to the one or more conditional statements in which a condition has been satisfied. For example, and continuing with the example described above, the user 812 in environments 810 may wake up in their bedroom at 6:30 AM and put on HMD 814. Subsequently, the user 812 may perform a sequence of actions while wearing HMD 814 such as get dressed in their bedroom and go to the kitchen to make coffee and catch up on email and the news. Upon determining that the user 812 is wearing the HMD 814 in their bedroom between 6:30-7 AM, the policy management unit 8146 may execute one or more corresponding actions such as present a visual style guide with the latest fashions to the user 812 on a display of the HMD 814. Similarly, upon determining that the user 812 is dressed and enters the kitchen between 6:45-7:30 AM, the policy management unit 8146 may execute one or more corresponding actions such as present a music playlist to the user 812 on the display of the HMD 814, play music from the music playlist through speakers of the HMD 814, and present a recipe for making coffee on the display of the HMD 814. In this way, when a policy is executed, an action corresponding to a conditional statement is taken only if the condition associated with that conditional statement is satisfied and previous, if any, conditions are satisfied.

In some embodiments, a condition may be satisfied when any of the recognized actions and other events match any actions or events associated with the condition. In some embodiments, a recognized action and/or other event matches an action and/or event associated with the condition when a similarity measure that corresponds to a similarity between the recognized action and/or the recognized event and the action and/or event associated with the condition equals or exceeds a predetermined amount. In some embodiments, the similarity measure may be expressed as a numerical value within a range of values from zero to one and the predetermined amount may correspond to a numerical value within a range of values from 0.5 to one. In some embodiments, the recognized action and/or the recognized event can be expressed as a first vector and the action and/or the event associated with the condition can be expressed as a second vector and the similarity measure may measure how similar the first vector is to the second vector and if the similarity measure between the first and second vectors equals or exceeds a predetermined amount (e.g., 0.5), then the recognized action and/or recognized event can be considered as matching the action and/or event associated with the condition. The foregoing is not intended to be limiting and other methods may be used to determine whether the recognized action and/or the recognized event matches the action and/or event associated with the condition. For example, one or more explicit matching and implicit matching algorithms may be used.

In some embodiments, policy management unit 8146 is configured to execute actions of a policy by generating content and sending that content to the virtual assistant application 830 through the second communication channel 804. In some embodiments, the content-providing unit 8134 of the virtual assistant application 830 is configured to provide the content to the HMD 814 for presentation to the user 812 while the user 812 is interacting with and within the environments 810. The content may be the extended reality content 225 described above with respect to FIG. 2A. In some embodiments, the content may be other content, such as audio, images, video, graphics, Internet-based content (e.g., webpages and application data), and the like.

In some embodiments, policies generated and/or modified by the policy management unit 8146 may be stored in a respective policy data structure that includes the selected one or more conditional statements along with the corresponding actions. Each policy data structure may be stored in one or more memories (not shown) or storage devices (not shown) for the AI systems 840.

The user control unit 8148 is configured to interface with the AI platform 8140 to provide user control over the generation of new policies and/or modification of pre-existing policies. Prior to the action recognition unit 8142 recognizing actions performed by the user 812 while the user 812 is interacting with and within the environments 810, the user control unit 8148 is configured to receive requests from the user 812 to generate a new policy and/or modify a pre-existing policy. In some embodiments, the user control unit 8148 is configured to monitor the HMD 814 for one or more natural language statements, gazes, and/or gestures made by the user 812 while the user 812 is interacting with and within environments 810 that reflect user's 812 desire to generate a new policy and/or modify a pre-existing policy. For example, while the user 812 is interacting with and within environments 810, the user 812 may utter "Please add play music while I'm in the bedroom to my morning activity policy." The user control unit 8148 may recognize this natural language statement as a request to modify a pre-existing policy, alert the control structure management unit 8144 to modify the control structure for the pre-existing policy, and modify the pre-existing policy based on the modified control structure. In some embodiments, user control unit 8148 may present on display of HMD 814 a menu with selectable options including an option to generate a new policy and/or modify a pre-existing policy. In some embodiments, the user 812 may make one or more menu selections using one or more natural language statements, gazes, and/or gestures. In response to the user selecting the option to generate a new policy and/or modify a pre-existing policy, the user control unit 8148 may alert the control structure management unit 8144 to modify the control structure for the pre-existing policy and modify the pre-existing policy based on the modified control structure.

In some embodiments, prior to receiving a request from the user 812 to generate a new policy and/or modify a pre-existing policy, the user control unit 8148 is further configured to determine a user permission status that represents whether or not a user consents to extended reality system 800 collecting data including data that includes characteristics of activities performed by the user 812 while interacting with and within environments 810. In some embodiments, the user control unit 8148 is configured to present a data collection authorization message to the user 812 on HMD 814 and request the user's 812 permission to collect data for generating new policies and/or modifying pre-existing policies. The data collection authorization message may serve to inform the user 812 of what types or kinds of data that may be collected by the extended reality system 800, how and when that data will be collected, and how that data will be used by the extended reality system 800 and/or third parties. In some embodiments, the user 812 may authorize and/or may not authorize data collection using one or more natural language statements, gazes, and/or gestures made by the user 812. In some embodiments, if the user 812 consents to data collection, new policies may be generated and/or pre-existing policies may be modified. In some embodiments, if the user 812 does not consent to data collection, new policies may not be generated and/or pre-existing policies may not be modified. In some embodiments, user control unit 8148 may request user's 812 authorization on a periodic basis (e.g., one a month, whenever software is updated, and the like).

In some embodiments, after a new policy is generated and/or a pre-existing policy is modified, the user control unit 8148 is further configured to obtain the user's approval and/or disapproval of the new policy and/or modified policy. In some embodiments, after a new policy is generated and/or after a pre-existing policy is modified, the user control unit 8148 is configured to present, on the display of HMD 814, a menu that includes an option for the user to view, on the display of HMD 814, a preview of the new policy and/or modified pre-existing policy and approve the new policy and/or modified pre-existing policy. In some embodiments, the preview includes presenting a written or verbal explanation of each conditional statement and action to be taken of the new policy and/or modified pre-existing policy to the user 812. In some embodiments, the preview includes presenting a visual simulation of the new policy and/or modified pre-existing policy to the user 812. For example, HMD 814 may present virtual content including one or more animations that represent the actions to be taken during execution of the new policy and/or modified pre-existing policy. In some embodiments, after viewing the preview, the user 812 may approve and/or disapprove of the new policy and/or modified pre-existing policy. The user 812 may approve and/or disapprove using one or more natural language statements, gazes, and/or gestures. In some embodiments, the user 812 may interrupt the preview to approve and/or disapprove of the new policy and/or modified pre-existing policy. In some embodiments, if the user 812 disapproves of the new policy and/or modified pre-existing policy, the user control unit 8148 may present user selectable options for modifying the new policy and/or modified pre-existing policy to the user 812 and receive a selection of an option from the user 812. In response to receiving the selected option, the user control unit 8148 is configured to modify the control structure of the new policy and/or modified pre-existing policy. In some embodiments, the user 812 may select an option using one or more natural language statements, gazes, and/or gestures.

In some embodiments, after a new policy is generated and/or a pre-existing policy is modified, the user control unit 8148 is further configured to receive a request from the user 812 to test the newly generated policy and/or the recently modified pre-existing policy. In some embodiments, the user 812 may request to enter the test mode before the new policy and/or modified pre-existing policy is executed and/or while the new policy and/or pre-existing policy is executing. In some embodiments, the user 812 may request to enter the test mode with one or more natural language statements, gazes, and/or gestures. In some embodiments, user control unit 8148 is configured to present the user 812 with a list of new policies generated and/or a list of pre-existing policies that have been modified since the test mode was last entered into and the user 812 may select a new policy and/or a modified pre-existing policy from the lists for testing using one or more one or more natural language statements, gazes, and/or gestures. Upon entering the test mode, the user control unit 8148 is configured to instruct the policy management unit 8146 to execute the selected new policy and/or the selected modified pre-existing policy. During execution of the selected generated policy and/or the selected modified pre-existing policy, the action recognition unit 8142 is configured to recognize actions performed by the user 812 while the user 812 is interacting with and within the environments 810, the control structure management unit 8144 is configured to predict a revised control structure based on the model parameters that were learned and adjusted while generating the new policy and/or modifying the pre-existing policy, and the policy management unit 8146 is configured to generate a revised new policy and/or a revised modified pre-existing policy based on the revised control structure. In some embodiments, the selected new policy and/or modified pre-existing policy may continue to be revised until a confidence score for the selected new policy and/or modified pre-existing policy reaches a predetermined threshold (e.g., 80% confidence score). As the new policy and/or modified pre-existing policy is revised, the user control unit 8148 may adjust the confidence score for the new policy and/or the modified pre-existing policy higher or lower and model parameters may be adjusted based on a difference between the adjusted confidence and the predetermined threshold. In this way, model parameters can be fine-tuned based on the revisions to the new policy and/or modified pre-existing policy.

In some embodiments, the user control unit 8148 includes one or more machine learning models (e.g., neural networks, support vector machines, and/or classifiers) that are trained to provide user control over the generation of new policies and/or modification of pre-existing policies. The user control unit 8148 can be trained to provide user control based on training data that includes characteristics of user interactions with AI systems 840 (e.g., historical consent, approval/disapproval, feedback received during the test mode, and the like). In some embodiments, the one or more machine-learning models can be trained by applying supervised learning or semi-supervised learning using training data that includes positive and negative labeled observations, where each positive labeled observation includes a control structure, a policy, and one or more conditional statements that have received positive feedback (e.g., user approval) and each negative labeled observation includes a control structure, a policy, and one or more conditional statements that have received negative feedback (e.g., user disapproval). In some embodiments, the one or more machine learning models may be fine-tuned based on feedback received from the user 812.

The foregoing modifications are not intended to be limiting and the user control unit 8148 may modify the control structure, policy, and/or one or more conditional statements in other ways based on user interactions with AI systems 840. For the example, the user control unit 8148 may delete a control structure and/or policy. In this case, the control structure and/or policy would be deleted from one or more memories (not shown) or storage devices (not shown) for the AI systems 840. In some embodiments, the control structure management unit 8144, the policy management unit 8146, and the user control unit 8148 may use user approval/disapproval to improve control structure prediction and policy generation and modification. In this way, the AI platform 8140 can generate and modify policies based on user activities.

Illustrative Method for Generating and Modifying Policies

Figure 9:
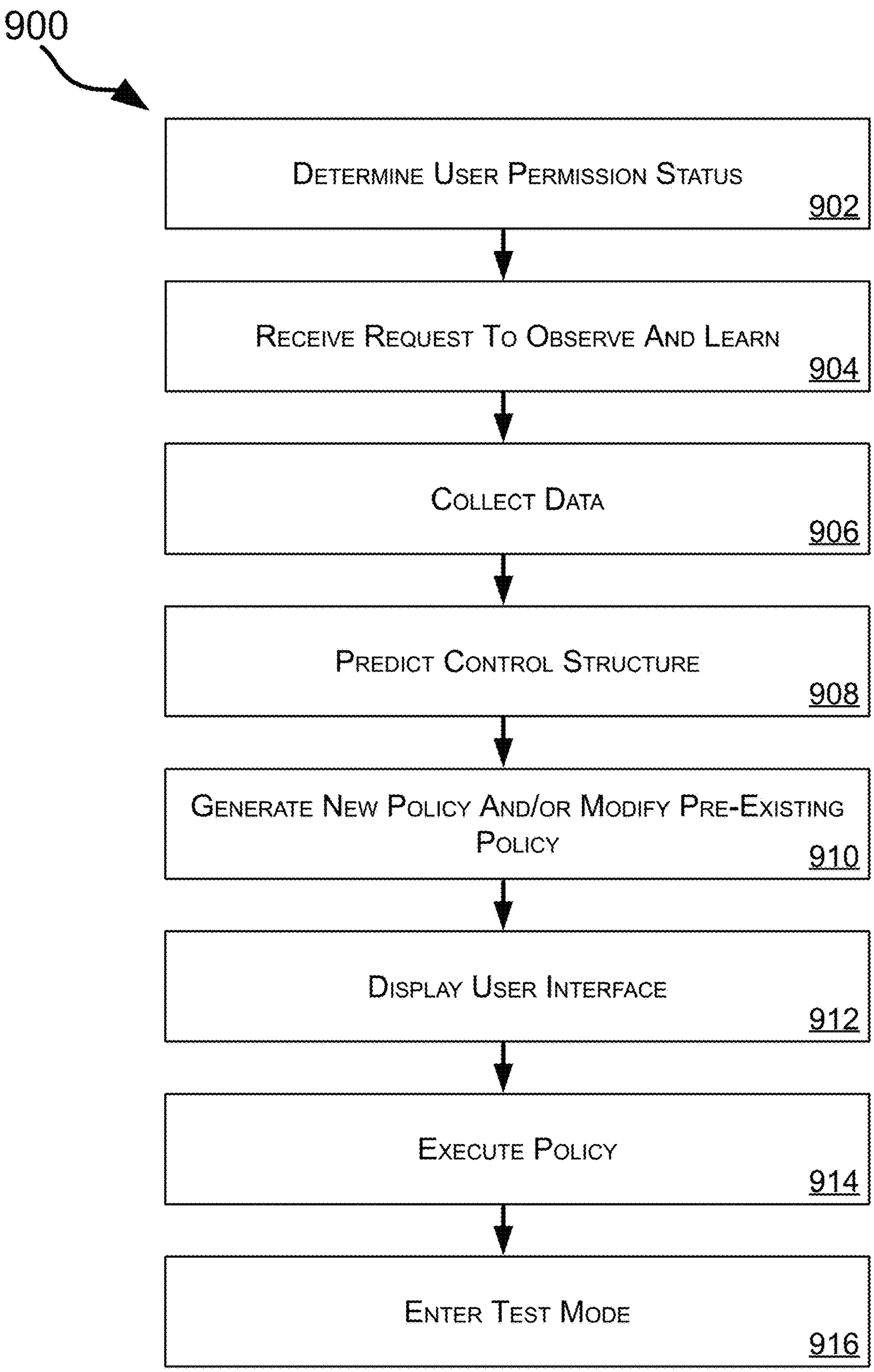
FIG. 9 is an illustration of a flowchart of an example process for generating and modifying policies with an AI platform based on user activities in accordance with various embodiments.

FIG. 9 is an illustration of a flowchart of an example process 900 for generating and modifying policies with an AI platform based on user activities in accordance with various embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In some examples, the process is implemented by client system 200 described above, extended reality system 800 described above, or a portable electronic device, such as portable electronic device 1400 as shown in FIG. 14.

At block 902, a user permission status is determined. In some embodiments, the user permission status represents whether or not the user has consented to collecting data that includes characteristics of activities performed by the user in real-world and/or virtual environments.

At block 904, a request for the AI platform to observe and learn from the activities performed by the user in the real-world and virtual environments is received from the user. In some embodiments, the user's request includes one or more natural language statements, one or more gestures, and/or one or more selections from a menu presented on a user interface.

At block 906, the data is collected. In some embodiments, the data is collected at least using one or more cameras.

At block 908, a control structure is predicted. In some embodiments, the control structure is predicted based on model parameters learned from historical policies and includes at least one action and at least one conditional statement for executing the at least one action. In some embodiments, the one or more actions and one or more conditions are determined from the characteristics of the activities.

At block 910, a new policy is generated and/or a pre-existing policy is modified based on the control structure. In some embodiments, the new policy and/or the modified pre-existing policy includes one or more conditional statements for executing the one or more actions based on an evaluation of the one or more conditions.

At block 912, a user interface is displayed. In some embodiments, the user interface includes the new policy and/or the modified pre-existing policy and a selectable option for the user to approve or disapprove the new policy and/or the modified pre-existing policy. In some embodiments, in response to receiving a selection that the user approves of the new policy or the modified pre-existing policy is stored in one or more memories and/or or storage devices for storing policies.

At block 914, at least part of the policy is executed. In some embodiment, the at least part of the policy is executed in response to determining that at least one conditional statement has been satisfied.

At block 916, a request to enter a test mode is received from the user. In some embodiments, the test mode is configured to test the new policy and/or or the modified pre-existing policy. In some embodiments, in the test mode, at least part of the new policy and/or the modified pre-existing policy is executed, additional data that includes characteristics of activities performed by the user in real-world and/or virtual environments during the test mode is collected at least using the one or more cameras, a revised control structure is predicted based on the additional data and model parameters learned from historical policies, and a revised policy is generated based on the revised control structure. In some embodiments, the revised control structure includes one or more actions and one or more conditions for executing the one or more actions. In some embodiments, the one or more actions and one or more conditions are determined from the characteristics of the activities collected during the test mode. In some embodiments, the revised policy includes one or more conditional statements for executing the one or more actions based on evaluation of the one or more conditions. In some embodiments, model parameters can be fine-tuned based on the revised policy.

Mixed-Initiative Authoring System

In some embodiments, a mixed-initiative authoring system (e.g., implemented via network environment 100, policy authoring and execution system 600, and extended reality system 800 described herein with respect to FIGS. 1, 6, and 8) is configured to provide users with low-friction authoring capabilities, thus enabling them to define and personalize AI behavior in extended reality environments. The mixed-initiative authoring system is a data-driven computational approach that uses a decision tree model to generate feasible and high-quality policies and a head mounted display-based authoring interface that provides users with interactive suggestions that they could further edit and refine towards defining personalized policies. Once a user defines a policy, the mixed-initiative authoring system would infer user context using on-device sensors and contextual AI models and launch actions when the current context matches context triggers (one or more conditions) defined in a policy.

The following workflow illustrates the process of authoring a policy (e.g., a CAP) with the mixed-initiative authoring system, deployed in a network environment comprising a head mounted display:

1. The user initiates authoring and launches the mixed-initiative authoring system—the authoring UI appears with one tab showing the list of currently authored policies (if any) and another to create a new policy.
2. The user selects the 'Create' tab to define a new policy. The UI displays a set of policy suggestions and additionally a button to create a new policy from scratch.
3. The user selects one of the suggested policies as a starting point and continues to edit it further. The UI updates to show details of the selected policy and additionally some new suggestions to refine the policy.
4. The user may select one of the actions in the policy and makes an edit to it based on the suggestions.
5. Similarly, the user may make an edit to one of the context triggers in the policy based on the suggestions.
6. The user saves the policy. The system registers this and begins matching observed user context with the context triggers in the new policy.
7. At run time, when the user's current context matches the context triggers in the authored policy, the specified actions are launched by the system.

This computational approach generates context aware policy (CAP) suggestions that are presented to the user to facilitate their authoring task. In some instances, the AI platform utilizes a decision tree based classification model that can take as input the current context, and optionally a partially authored policy, and output a unique set of policies as suggestions. The decision tree model is pretrained on synthetic data. At run-time, the mixed-initiative authoring system uses the decision tree model to predict actions and corresponding context triggers (conditions), to be presented to the user in the authoring UI. Follows is a description of training the decision tree model and generating real-time suggestions using the trained decision tree model.

Figure 10:
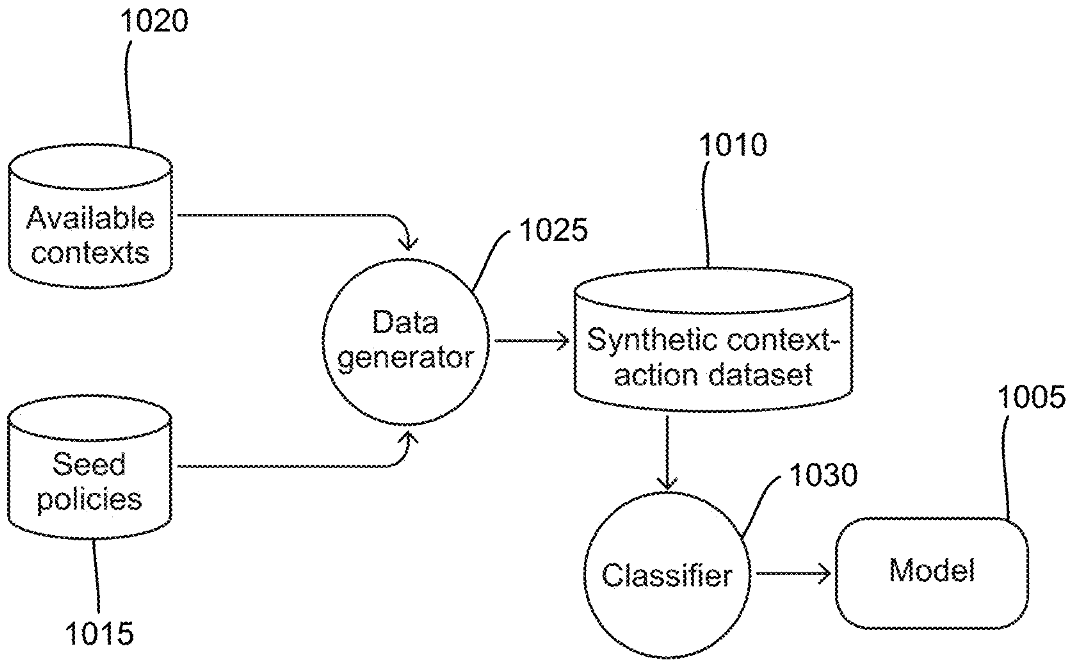
FIG. 10 is a simplified block diagram of a mixed-initiative authoring system for training machine learning models to predict policy suggestions in accordance with various embodiments.

As shown in FIG. 10, a decision tree model 1005 is pre-trained using a synthetic dataset 1010. This dataset 1010 is synthesized using a list of seed policies 1015 and an entire set of available contexts 1020. Seed policies 1015 are representative of those policies that might occur during realistic usage of the extended reality system by users (e.g., could be retrieved/generated from historical data as described in detail herein). Available contexts 1020 are common attributes that might occur during realistic usage of the extended reality system by users such as objects seen or held by the user, their inferred location, current time and day, conversation taking place in the surrounding, and presence of other people (e.g., could also be retrieved/generated from historical data as described in detail herein). A data generator 1025 is implemented to take the seed policies 1015 and available contexts 1020 as inputs, add some random noise to them, and generate data entries containing a set of contexts and a corresponding system action. For example, one row of data entry can contain the following information:

Time: Morning;
Alone: True,
Seen: Keyboard, Plant;
Holding: Cup;
Action: Show calendar The dataset 1010 is then used to pre-train a decision tree classifier algorithm 1030 such that all context values are considered as attributes and the action is considered as the target variable. The output of the pre-training is the decision tree model 1005, which may then be fine-tuned in downstream training processes for users, systems, or tasks (e.g., the decision tree model 1005 may be fine-tuned for a particular user using historical data for that user as described in detail herein).

Figure 11:
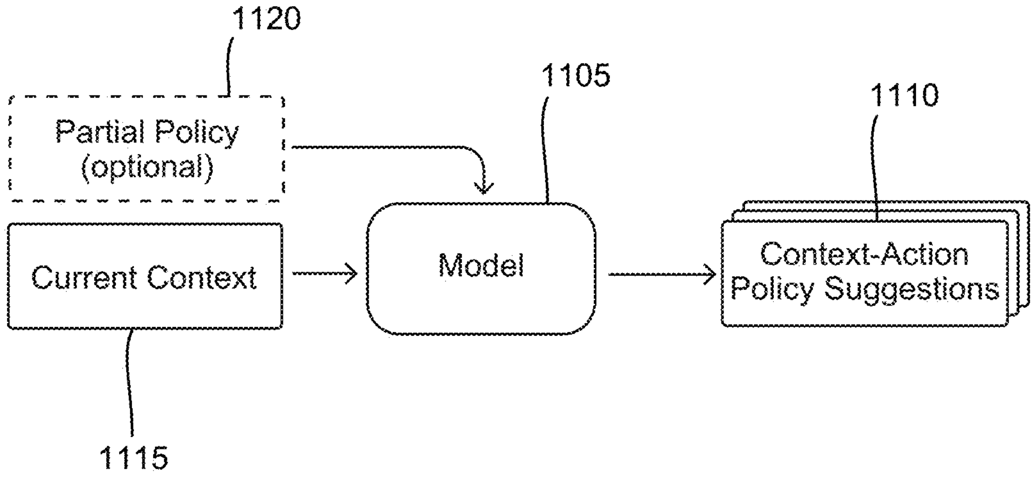
FIG. 11 is a simplified block diagram of a mixed-initiative authoring system for deploying and using machine learning models to predict policy suggestions in accordance with various embodiments.

As shown in FIG. 11, the decision tree model 1105 may then be used to generate policies 1110 (e.g., CAPs) when the user's context 1115 is provided as input. To do so, the mixed-initiative authoring system continually observes the user's context as they interact in the extend reality environment. When the user initiates an authoring session and launches the interface, the mixed-initiative authoring system captures a snapshot of the context and sends it to the backend comprising the decision tree model 1105 to request for policy suggestions. The current context is then passed as input to the decision tree model 1105, which then predicts the most likely action classes for the given context. Once it has predicted likely actions, it also needs to identify suitable contexts. Note that the entire context that was provided as input for the policy suggestions cannot simply be used as context for the policy suggestions, since they might contain contextual information that is not relevant for the desired policy itself, but instead is incidental.

Thus, the decision tree model 1105 next computes correlation coefficients between each available context and the target action, as observed in the entire dataset. For example, if the target action is 'Show calendar', and the correlation coefficient for context are 'seen plant=0.3', 'holding cup=0.8', 'seen keyboard=0.6', 'time=0.2', then the decision tree model 1105 can identify that 'holding cup' and 'seen keyboard' are important contexts whereas 'seen plant' and 'time=morning' are not very relevant. Taking this into account, the mixed-initiative authoring system combines these contexts with predicted actions to generate policy suggestions. Further, if the user is already in the process of authoring a policy and has partially defined it, then the decision tree model 1105 can also take the partial policy 1120 as additional input to generate policy suggestions.

Figure 12:
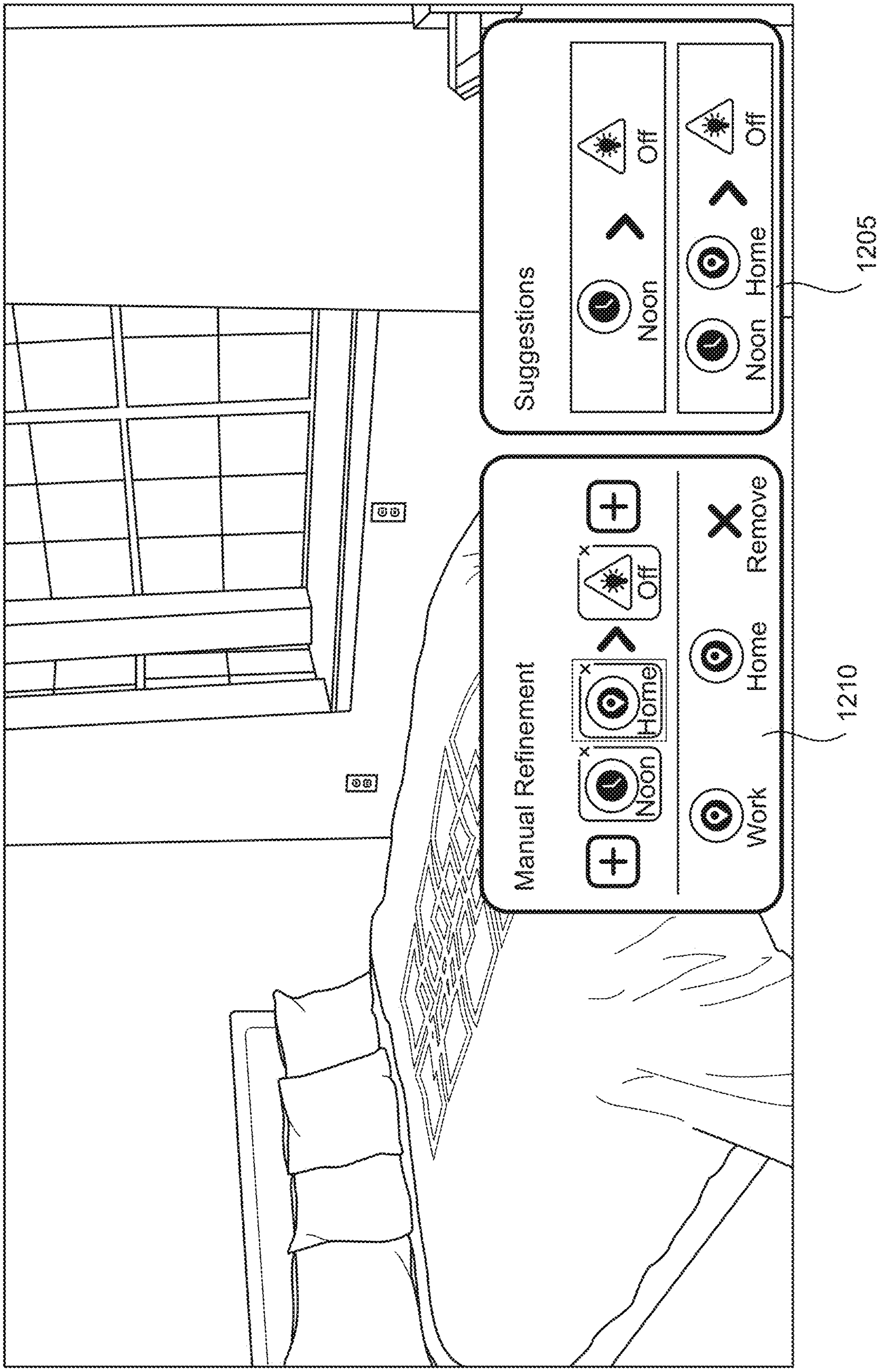
FIG. 12 is an illustration of a graphical user interface comprising policy suggestions in accordance with various embodiments.

As shown in FIG. 12, given that the mixed-initiative authoring system can generate a set of policy suggestions 1205 based on the user's current context, this approach offers users with abilities to interact with these suggestions, and edit and refine 1210 them further towards creating desirable policies. In this approach, the mixed-initiative authoring system continually updates itself based on user input. For example, when the user is initially using the mixed-initiative authoring system, it provides an initial set of suggestions based on the user's current context. Thereafter, when the user selects a suggested policy, the mixed-initiative authoring system updates the list of suggestions to provide a set of refined policies related to the user's selection. Finally, when the user edits a part of the policy, either the context triggers or the actions, the mixed-initiative authoring system further attempts to provide fine-tuning suggestions for each of these components. As such, the system provides the users with the following intelligent capabilities:

1. Exploration: Suggesting a diverse set of good "starting points" that may be adopted and edited by the user to create their policies.
2. Refinement: As the user gets closer to their desired policies, suggesting a set of fine-tuned policies.
3. Auto-completion: Suggesting complete solutions for a user's partial policy once they have started authoring.
4. Partial suggestions: Suggesting only parts of the policy, contexts or actions, which the users wish to edit or modify.

Using these interactive features, the mixed-initiative authoring system provides a usable and low-friction solution for authoring contextual policies in extended reality that can enable personalized and highly accurate AI behavior.

Illustrative Method for Mixed-Initiative Authoring

Figure 13:
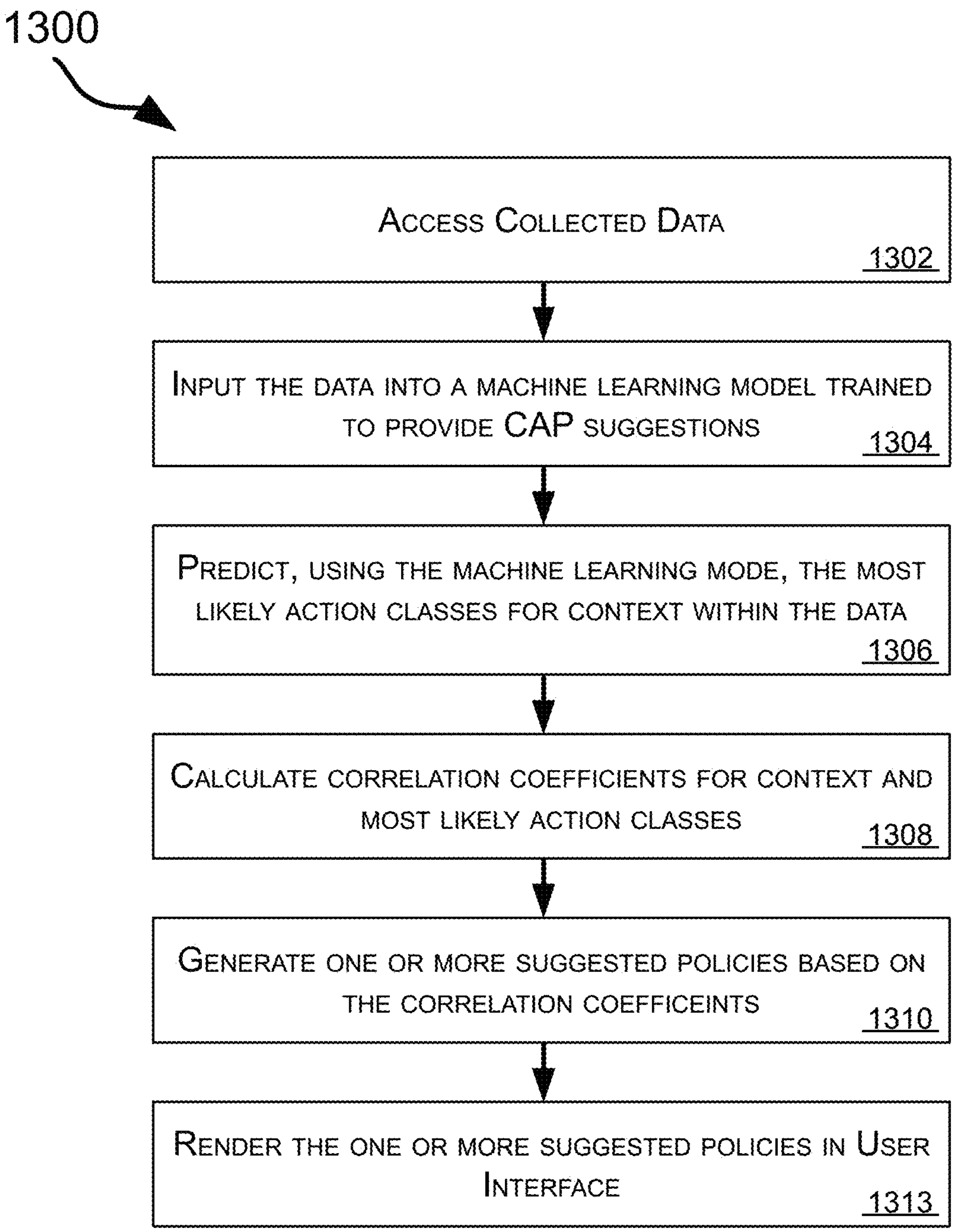
FIG. 13 is an illustration of a flowchart of an example process for generating and modifying policies with an AI platform based on user activities in accordance with various embodiments.

FIG. 13 is an illustration of a flowchart of an example process 1300 for generating and modifying policies with an AI platform based on user activities in accordance with various embodiments. The processing depicted in FIG. 13 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 13 and described below is intended to be illustrative and non-limiting. Although FIG. 13 depicts the various processing steps occurring in a particular sequence or order, this is not intended to be limiting. In some examples, the process is implemented by client system 200 described above, extended reality system 800 described above, or a portable electronic device, such as portable electronic device 1400 as shown in FIG. 14.

At block 1302, data collected from user interactions in extended reality is accessed. In some instances, the data is accessed in response to the user launching an authoring session to generate a context aware policy.

At block 1304, the data is input into a machine learning model trained to provide context aware policy suggestions. Each context aware policy defines an action to be triggered upon satisfaction of one or more context conditions within an extended reality environment. In some instances, the machine learning model is a decision tree model trained as described with respect to FIG. 10.

At block 1306, the machine learning model makes a prediction or inference for the most likely action classes for context within the data. In some instances, this performance of a classification task by the machine learning model such as a decision tree model utilized as described with respect to FIG. 11.

At block 1308, correlation coefficients are calculated by the machine learning model between each portion of the context and each target action of the most likely action classes. For example, if the target action is 'Show calendar', and the correlation coefficient for context are 'seen plant=0.3', 'holding cup=0.8', 'seen keyboard=0.6', 'time=0.2', then the machine learning model can identify that 'holding cup' and 'seen keyboard' are important contexts whereas 'seen plant' and 'time=morning' are not very relevant.

At block 1310, one or more suggested policies for the context aware policy are generated. The generating, for each suggested policy, comprises combining one or more portions of the context with a target action based on the correlation coefficients.

At block 1312, the one or more suggested policies are rendered in a user interface during the authoring session as a suggestion for the context aware policy.

Illustrative Device

FIG. 14 is an illustration of a portable electronic device 1400. The portable electronic device 1400 may be implemented in various configurations in order to provide various functionalities to a user. For example, the portable electronic device 1400 may be implemented as a wearable device (e.g., a head-mounted device, smart eyeglasses, smart watch, and smart clothing), communication device (e.g., a smart, cellular, mobile, wireless, portable, and/or radio telephone), home management device (e.g., a home automation controller, smart home controlling device, and smart appliances), a vehicular device (e.g., autonomous vehicle), and/or computing device (e.g., a tablet, phablet, notebook, and laptop computer; and a personal digital assistant). The foregoing implementations are not intended to be limiting and the portable electronic device 1400 may be implemented as any kind of electronic or computing device that is configured to provide an extended reality system and fine-tune an AI platform using a part of all of the methods disclosed herein.

The portable electronic device 1400 includes processing system 1408, which includes one or more memories 1410, one or more processors 1412, and RAM 1414. The one or more processors 1412 can read one or more programs from the one or more memories 1410 and execute them using RAM 1414. The one or more processors 1412 may be of any type including but not limited to a microprocessor, a microcontroller, a graphical processing unit, a digital signal processor, an ASIC, a FPGA, or any combination thereof. In some embodiments, the one or more processors 1412 may include a plurality of cores, one or more coprocessors, and/or one or more layers of local cache memory. The one or more processors 1412 can execute the one or more programs stored in the one or more memories 1410 to perform operations as described herein including those described with respect to FIG. 1-13.

The one or more memories 1410 can be non-volatile and may include any type of memory device that retains stored information when powered off. Non-limiting examples of memory include electrically erasable and programmable read-only memory (EEPROM), flash memory, or any other type of non-volatile memory. At least one memory of the one or more memories 1410 can include a non-transitory computer-readable storage medium from which the one or more processors 1412 can read instructions. A computer-readable storage medium can include electronic, optical, magnetic, or other storage devices capable of providing the one or more processors 1412 with computer-readable instructions or other program code. Non-limiting examples of a computer-readable storage medium include magnetic disks, memory chips, read-only memory (ROM), RAM, an ASIC, a configured processor, optical storage, or any other medium from which a computer processor can read the instructions.

The portable electronic device 1400 also includes one or more storage devices 1418 configured to store data received by and/or generated by the portable electronic device 1400. The one or more storage devices 1418 may be removable storage devices, non-removable storage devices, or a combination thereof. Examples of removable storage and non-removable storage devices include magnetic disk devices such as flexible disk drives and HDDs, optical disk drives such as compact disk (CD) drives or digital versatile disk (DVD) drives, SSDs, and tape drives.

The portable electronic device 1400 may also include other components that provide additional functionality. For example, camera circuitry 1402 may be configured to capture images and video of a surrounding environment of the portable electronic device 1400. Examples of camera circuitry 1402 include digital or electronic cameras, light field cameras, 3D cameras, image sensors, imaging arrays, and the like. Similarly, audio circuitry 1422 may be configured to record sounds from a surrounding environment of the portable electronic device 1400 and output sounds to a user of the portable electronic device 1400. Examples of audio circuitry 1422 include microphones, speakers, and other audio/sound transducers for receiving and outputting audio signals and other sounds. Display circuitry 1406 may be configured to display images, video, and other content to a user of the portable electronic device 1400 and receive input from the user of the portable electronic device 1400. Examples of the display circuitry 1406 may include an LCD, a LED display, an OLED display, and a touchscreen display. Communications circuitry 1404 may be configured to enable the portable electronic device 1400 to communicate with various wired or wireless networks and other systems and devices. Examples of communications circuitry 1404 include wireless communication modules and chips, wired communication modules and chips, chips for communicating over local area networks, wide area networks, cellular networks, satellite networks, fiber optic networks, and the like, systems on chips, and other circuitry that enables the portable electronic device 1400 to send and receive data. Orientation detection circuitry 1420 may be configured to determine an orientation and a posture for the portable electronic device 1400 and/or a user of the portable electronic device 1400. Examples of orientation detection circuitry 1420 include GPS receivers, ultra-wideband (UWB) positioning devices, accelerometers, gyroscopes, motion sensors, tilt sensors, inclinometers, angular velocity sensors, gravity sensors, and inertial measurement units. Haptic circuitry 1426 may be configured to provide haptic feedback to and receive haptic feedback from a user of the portable electronic device 1400. Examples of haptic circuitry 1426 include vibrators, actuators, haptic feedback devices, and other devices that generate vibrations and provide other haptic feedback to a user of the portable electronic device 1400. Power circuitry 1424 may be configured to provide power to the portable electronic device 1400. Examples of power circuitry 1424 include batteries, power supplies, charging circuits, solar panels, and other devices configured to receive power from a source external to the portable electronic device 1400 and power the portable electronic device 1400 with the received power.

The portable electronic device 1400 may also include other I/O components. Examples of such input components can include a mouse, a keyboard, a trackball, a touch pad, a touchscreen display, a stylus, data gloves, and the like. Examples of such output components can include holographic displays, 3D displays, projectors, and the like.

Additional Considerations

Although specific examples have been described, various modifications, alterations, alternative constructions, and equivalents are possible. Examples are not restricted to operation within certain specific data processing environments but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. An extended reality system comprising:

a head-mounted device comprising a display that displays content to a user and one or more cameras;

one or more processors; and one or more memories accessible to the one or more processors, the one or more memories storing a plurality of instructions executable by the one or more processors, the plurality of instructions comprising instructions that, when executed by the one or more processors, cause the one or more processors to perform operations comprising:

collecting, at the one or more cameras, data comprising characteristics of activities performed by the user in a real-world environment, a virtual environment, or a combination thereof;

at a first point in time:

generating a policy based on the data and model parameters learned from historical policies, wherein the policy comprises one or more actions and one or more conditions for executing the one or more actions via the head-mounted device, and wherein the one or more actions and the one or more conditions are determined from the characteristics of the activities;

presenting, at the display of the head-mounted device, a user interface that includes a representation of the policy; and in response to receiving a user input indicating that the user approves of the policy, saving the policy; and at a second point in time, after the first point in time:

generating a modified policy based on, at least, user interactions via the head-mounted device with respective actions executed in accordance with the policy, wherein the modified policy comprises one or more modified actions and one or more modified conditions for executing the one or more modified actions via the head-mounted device;

presenting, at the display of the head-mounted device, another user interface that includes a representation of the modified policy; and in response to receiving another user input indicating that the user approves of the modified policy, using the modified policy to determine when to execute the one or more modified actions via the head-mounted device.

2. The extended reality system of claim 1, wherein the operations further comprise:

after the first point in time:

determining that at least one condition of the one or more conditions has been satisfied; and in response to determining that the at least one condition has been satisfied, executing at least one of the one or more actions at the head-mounted device.

3. The extended reality system of claim 1, wherein:

the user interface further includes a selectable option for the user to approve or disapprove of the policy; and the user input indicating that the user approves of the policy is directed at the selectable option for the user to approve or disapprove of the policy.

4. The extended reality system of claim 1, wherein the operations further comprise:

after the second point in time:

determining that at least one modified condition of the one or more modified conditions has been satisfied; and in response to determining that the at least one modified condition has been satisfied, executing at least one of the one or more modified actions at the head-mounted device.

5. The extended reality system of claim 1, wherein the operations further comprise:

prior to the collecting the data:

acquiring a user permission status, the user permission status representing whether or not the user has consented to collecting the data; and determining, based on the user permission status, that the user has consented to collecting the data.

6. The extended reality system of claim 1, wherein the operations further comprise:

prior to the collecting the data, receiving a request to observe and learn from user activity in the real-world environment, the virtual environment, or the combination thereof from the user.

7. The extended reality system of claim 6, wherein the request is a natural language request, a gesture, a selection from a menu on a user interface, or any combination thereof.

8. The extended reality system of claim 1, wherein the operations further comprise:

after the first point in time:

initiating a test mode for testing the policy;

executing, in the test mode, at least one of the one or more actions at the head-mounted device;

collecting, at least using the one or more cameras, additional data comprising additional characteristics of additional activities performed by the user in the real-world environment, the virtual environment, or the combination thereof; and generating a revised policy based on the additional data and the model parameters learned from historical policies, wherein the revised policy comprises one or more revised actions and one or more revised conditions for executing the one or more revised actions via the head-mounted device, and wherein the one or more revised actions and one or more revised conditions are determined from the additional characteristics of the additional activities;

presenting, at the display of the head-mounted device, an additional user interface that includes a representation of the revised policy; and in response to receiving an additional user input indicating that the user approves of the revised policy, saving the revised policy.

9. The extended reality system of claim 8, wherein the operations further comprise:

before initiating the test mode for testing the policy, receiving a request from the user to enter the test mode to test the policy.

10. The extended reality system of claim 8, wherein the operations further comprise:

after generating the revised policy, updating the model parameters based on the revised policy.

11. A computer-implemented method comprising:

collecting, using at least one or more cameras of a head-mounted device, data comprising characteristics of activities performed by a user in a real-world environment, a virtual environment, or a combination thereof;

at a first point in time:

generating a policy based on the data and model parameters learned from historical policies, wherein the policy comprises one or more actions and one or more conditions for executing the one or more actions via the head-mounted device, and wherein the one or more actions and the one or more conditions are determined from the characteristics of the activities;

presenting, at a display of the head-mounted device, a user interface that includes a representation of the policy; and in response to receiving a user input indicating that the user approves of the policy, saving the policy; and at a second point in time, after the first point in time:

generating a modified policy based on, at least, user interactions via the head-mounted device with respective actions executed in accordance with the policy, wherein the modified policy comprises one or more modified actions and one or more modified conditions for executing the one or more modified actions via the head-mounted device;

presenting, at the display of the head-mounted device, another user interface that includes a representation of the modified policy; and in response to receiving another user input indicating that the user approves of the modified policy, using the modified policy to determine when to execute the one or more modified actions via the head-mounted device.

12. The computer-implemented method of claim 11, further comprising:

after the first point in time:

determining that at least one condition of the one or more conditions has been satisfied; and in response to determining that the at least one condition has been satisfied, executing at least one of the one or more actions at the head-mounted device.

13. The computer-implemented method of claim 11, wherein:

the user interface further includes a selectable option for the user to approve or disapprove of the policy; and the user input indicating that the user approves of the policy is directed at the selectable option for the user to approve or disapprove of the policy.

* * * * *